(12) United States Patent
Kim et al.

(10) Patent No.: US 11,991,685 B2
(45) Date of Patent: May 21, 2024

(54) METHOD AND APPARATUS FOR V2X COMMUNICATION IN NEXT GENERATION MOBILE COMMUNICATION SYSTEM

(71) Applicant: Samsung Electronics Co., Ltd., Suwon-si (KR)

(72) Inventors: Sangbum Kim, Suwon-si (KR); Sangyeob Jung, Suwon-si (KR); Hyunjeong Kang, Suwon-si (KR); Soenghun Kim, Suwon-si (KR); Seungri Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 266 days.

(21) Appl. No.: 17/310,130

(22) PCT Filed: Feb. 12, 2020

(86) PCT No.: PCT/KR2020/001950
§ 371 (c)(1),
(2) Date: Jul. 19, 2021

(87) PCT Pub. No.: WO2020/166957
PCT Pub. Date: Aug. 20, 2020

(65) Prior Publication Data
US 2022/0053517 A1 Feb. 17, 2022

(30) Foreign Application Priority Data
Feb. 13, 2019 (KR) .................. 10-2019-0016743

(51) Int. Cl.
*H04W 72/1263* (2023.01)
*H04L 1/1812* (2023.01)
(Continued)

(52) U.S. Cl.
CPC ....... *H04W 72/1263* (2013.01); *H04L 1/1812* (2013.01); *H04W 72/02* (2013.01);
(Continued)

(58) Field of Classification Search
CPC .................. H04W 76/28; H04W 4/46
(Continued)

(56) References Cited

U.S. PATENT DOCUMENTS 8,750,154 B2   6/2014  Kim et al.
2018/0227973 A1  8/2018  Tsuboi et al.
(Continued)

FOREIGN PATENT DOCUMENTS

EP   3836686 A1   6/2021
KR   10-1720334 B1   4/2017

OTHER PUBLICATIONS

European Patent Office, "Supplementary European Search Report" dated Dec. 7, 2021, in connection with European Patent Application No. 20755838.8, 11 pages.
(Continued)

*Primary Examiner* — Kiet M Doan

(57) ABSTRACT

The present disclosure relates to a communication technique and a system for integrating IoT technology with a 5G communication system which supports a higher data transfer rate than does a 4G system. The present disclosure can be applied to intelligent services (for example, smart homes, smart buildings, smart cities, smart cars or connected cars, health care, digital education, retail businesses, security and safety related services, etc.) on the basis of 5G communication technology and IoT-related technology. According to the present disclosure, a method and a UE for performing same, a base station communicating with the UE, and a method performed by the base station can be provided, the method comprising the steps of: transmitting sidelink UE
(Continued)

information including information related to new radio (NR) sidelink communication to the base station; receiving an RRC message including configuration information related to the NR sidelink communication from the base station; and performing the sidelink communication on the basis of the configuration information related to the sidelink communication, wherein the configuration information includes a list of sidelink grant configuration information for each bandwidth part (BWP), the list of the sidelink grant configuration information includes at least one sidelink grant information, and the sidelink grant information includes a sidelink grant information identifier, the number of hybrid automatic repeat request (HARQ) processes, sidelink time resource information, or sidelink frequency resource information.

20 Claims, 22 Drawing Sheets

(51) Int. Cl.
  *H04W 72/02* (2009.01)
  *H04W 72/23* (2023.01)
  *H04W 72/52* (2023.01)
  *H04W 72/542* (2023.01)
  *H04W 92/18* (2009.01)

(52) U.S. Cl.
  CPC .......... *H04W 72/23* (2023.01); *H04W 72/52* (2023.01); *H04W 72/542* (2023.01); *H04W 92/18* (2013.01)

(58) Field of Classification Search
  USPC ....................................................... 370/252
  See application file for complete search history.

(56) References Cited

U.S. PATENT DOCUMENTS

| 2021/0204301 A1* | 7/2021 | Lee ..................... H04W 72/566 |
| 2021/0321348 A1* | 10/2021 | Ohara ................... H04W 72/30 |
| 2022/0053439 A1* | 2/2022 | Hu ..................... H04W 56/0015 |

OTHER PUBLICATIONS

ITRI, "NR Uu Enhancement for Sidelink Resource Management", 3GPP TSG RAN WG1 Ad-Hoc Meeting 1901; R1-1900464, Taipei, Taiwan, Jan. 21-25, 2019, 8 pages.
3GPP TS 36.331 V15.4.0 (Dec. 2018); Technical Specification; 3rd Generation Partnership Project; Technical Specification Group Radio Access Network; Evolved Universal Terrestrial Radio Access (E-UTRA);Radio Resource Control (RRC);Protocol specification (Release 15); 938 pages.
International Search Report and Written Opinion of the International Searching Authority in connection with International Application No. PCT/KR2020/001950 dated May 25, 2020, 8 pages.
VIVO, "SPS for periodic deterministic traffic", 3GPP TSG-RAN WG2 Meeting #104, R2-1816940, Spokane, USA, Nov. 12-16, 2018, 3 pages.
CATT, "Multiple Configured Grant Configurations", 3GPP TSG-RAN WG2 Meeting 104, R2-1816365, Spokane, U.S.A, Nov. 12-16, 2018, 2 pages.
Huawei, et al. "Transmission with configured grant in NR unlicensed band", 3GPP TSG RAN WG1 Meeting #95, R1-1812197, Spokane, USA, Nov. 12-16, 2018, 9 pages.
ETSI TS 138 331, V15.4.0, "5G; NR; Radio Resource Control (RRC); Protocol specification" 3GPP TS 38.331, version 15.4.0 Release 15) Apr. 2019, 471 pages.

* cited by examiner

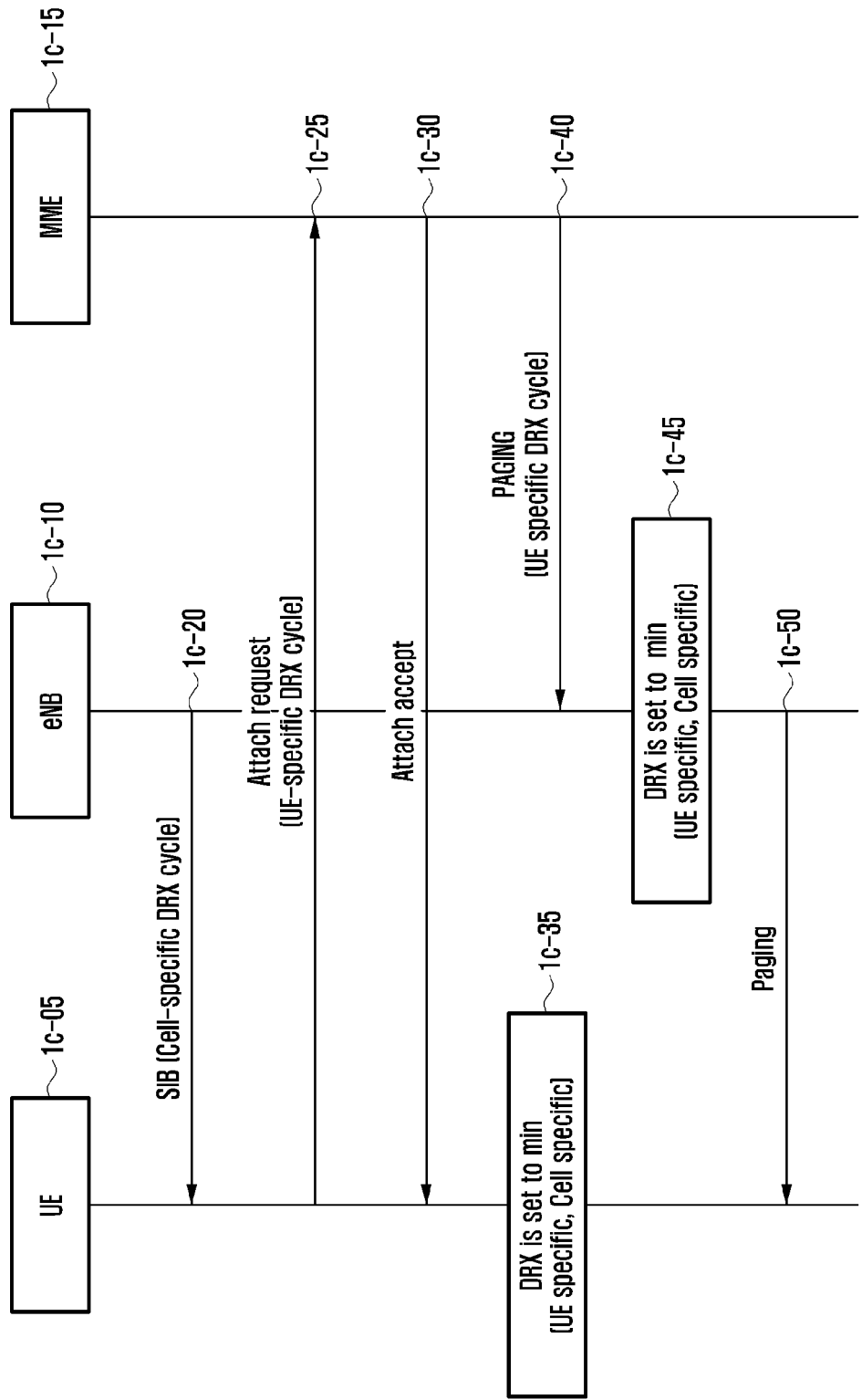

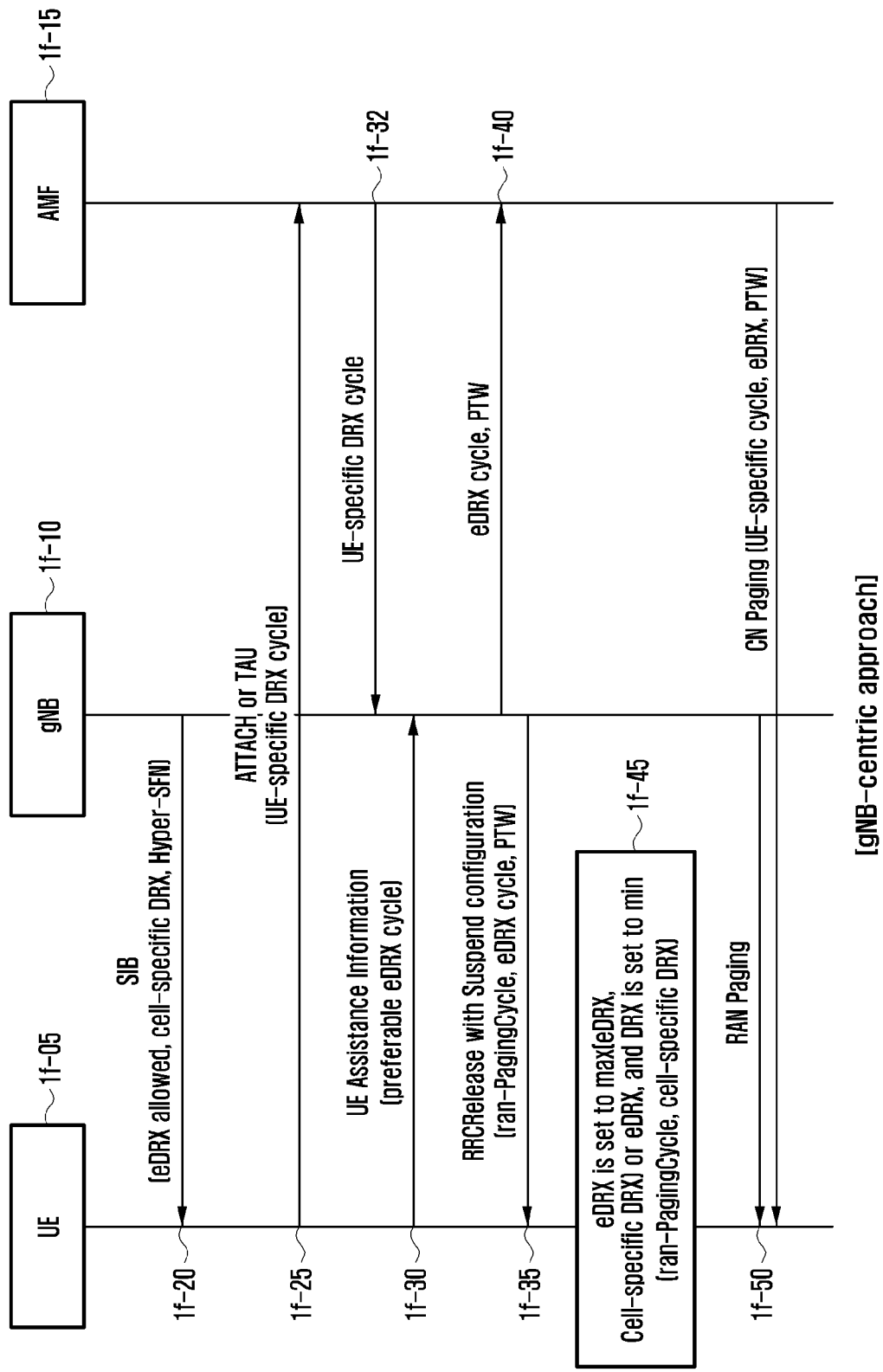

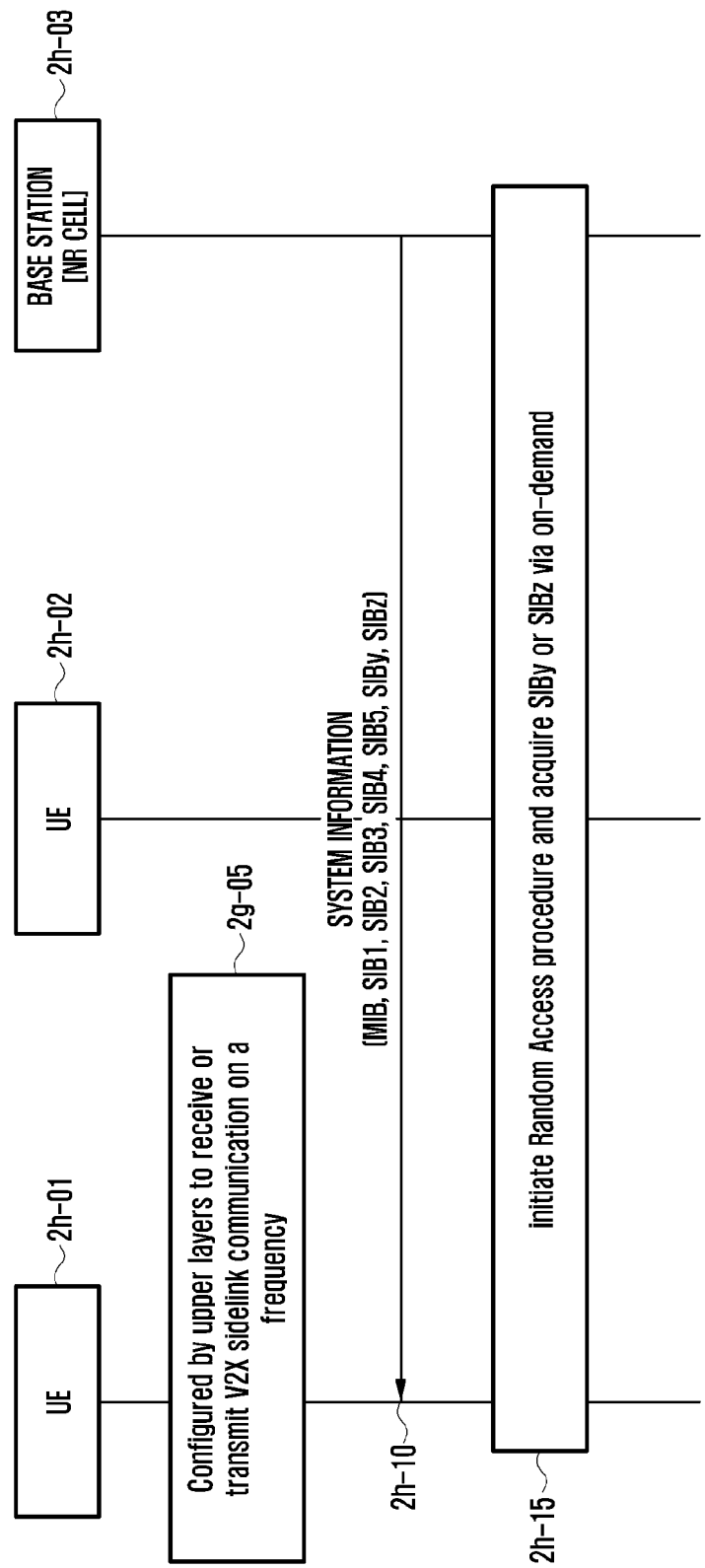

METHOD AND APPARATUS FOR V2X COMMUNICATION IN NEXT GENERATION MOBILE COMMUNICATION SYSTEM

CROSS-REFERENCE TO RELATED APPLICATIONS

This application is a 371 of International Application No. PCT/KR2020/001950, filed Feb. 12, 2020, which claims priority to Korean Patent Application No. 10-2019-0016743, filed Feb. 13, 2019, the disclosures of which are herein incorporated by reference in their entirety.

BACKGROUND

1. Field

The disclosure relates to user equipment (UE) and base station operations in a mobile communication system. The disclosure relates to an operation for supporting vehicle communication in a next-generation mobile communication system. The disclosure relates to a discontinuous reception mode operation in an inactive mode in a next-generation mobile communication system.

2. Description of Related Art

In order to satisfy wireless data traffic demands that tend to increase after 4G communication system commercialization, efforts to develop an enhanced 5G communication system or a pre-5G communication system are being made. For this reason, the 5G communication system or pre-5G communication system is called a beyond 4G network communication system or a post LTE system. In order to achieve a high data transfer rate, an implementation of the 5G communication system in a mmWave band (e.g., 60 Giga (80 GHz) band) is taken into consideration. In order to reduce a path loss of a radio wave and increase the transfer distance of a radio wave in the mmWave band, beamforming, massive MIMO, full dimensional MIMO (FD-MIMO), an array antenna, analog beamforming and large scale antenna technologies are being discussed in the 5G communication system. Furthermore, in order to improve the network of a system, technologies, such as an improved small cell, an advanced small cell, a cloud radio access network (cloud RAN), an ultra-dense network, device to device communication (D2D), wireless backhaul, a moving network, cooperative communication, coordinated multi-points (CoMP), and reception interference cancellation, are being developed in the 5G communication system. In addition, hybrid FSK and QAM modulation (FQAM) and sliding window superposition coding (SWSC) that are advanced coding modulation (ACM) schemes, and filter bank multi-carrier (FBMC), non-orthogonal multiple access (NOMA) and sparse code multiple access (SCMA), that is, advanced access technologies, are being developed in the 5G system.

Meanwhile, the Internet evolves from a human-centered connection network over which human generates and consumes information to Internet of things (IoT) through which information is exchanged and processed between distributed elements, such as things. An Internet of everything (IoE) technology in which a big data processing technology through a connection with a cloud server is combined with the IoT technology is emerging. In order to implement the IoT, technical elements, such as the sensing technology, wired/wireless communication and network infrastructure, service interface technology and security technology, are required. Accordingly, technologies, such as a sensor network, machine to machine (M2M) and machine type communication (MTC) for a connection between things, are recently researched. In the IoT environment, an intelligent Internet technology (IT) service in which a new value is created for human life by collecting and analyzing data generated from connected things may be provided. The IoT may be applied to fields, such as a smart home, a smart building, a smart city, a smart car or a connected car, a smart grid, health care, smart home appliances, and advanced medical services, through convergence and composition between the existing information technology (IT) and various industries.

Accordingly, various attempts to apply the 5G communication system to the IoT are being made. For example, technologies, such as a sensor network, machine to machine (M2M) and machine type communication (MTC), are implemented by schemes, such as beamforming, MIMO, and an array antenna, that is, 5G communication technologies. The application of a cloud radio access network (cloud RAN) as the aforementioned big data processing technology may be said to be an example of convergence between the 5G technology and the IoT technology.

SUMMARY

Various embodiments of the disclosure provide an operation for supporting vehicle communication in a next-generation mobile communication system. Furthermore, various embodiments of the disclosure provide a discontinuous reception mode operation in an inactive mode in a next-generation mobile communication system.

According to an embodiment of the disclosure, there may be provided a method performed by a user equipment (UE) in a wireless communication system, including transmitting, to a base station, sidelink UE information including information related to new radio (NR) sidelink communication, receiving, from the base station, an RRC message including configuration information related to the NR sidelink communication, and performing sidelink communication based on the configuration information related to the sidelink communication. The configuration information includes a sidelink grant configuration information list for each bandwidth part (BWP). The sidelink grant configuration information list includes at least one of sidelink grant information. The sidelink grant information includes a sidelink grant information identifier, the number of hybrid automatic repeat request (HARQ) processes, sidelink time resource information, or sidelink frequency resource information.

Furthermore, according to an embodiment of the disclosure, there may be provided a method performed by a base station in a wireless communication system, including receiving, from a user equipment (UE), sidelink UE information including information related to new radio (NR) sidelink communication and transmitting, to the UE, an RRC message including configuration information related to the NR sidelink communication. The configuration information includes a sidelink grant configuration information list for each bandwidth part (BWP). The sidelink grant configuration information list includes at least one of sidelink grant information. The sidelink grant information includes a sidelink grant information identifier, the number of hybrid automatic repeat request (HARQ) processes, sidelink time resource information, or sidelink frequency resource information.

Furthermore, according to an embodiment of the disclosure, there is provided a user equipment (UE) of a wireless communication system, including a transceiver and a controller configured to control to transmit, to a base station, sidelink UE information including information related to new radio (NR) sidelink communication through the transceiver, receive, from the base station, an RRC message including configuration information related to the NR sidelink communication through the transceiver, and perform sidelink communication based on the configuration information related to the sidelink communication. The configuration information includes a sidelink grant configuration information list for each bandwidth part (BWP). The sidelink grant configuration information list includes at least one of sidelink grant information. The sidelink grant information includes a sidelink grant information identifier, the number of hybrid automatic repeat request (HARQ) processes, sidelink time resource information, or sidelink frequency resource information.

Furthermore, according to an embodiment of the disclosure, there is provided a base station of a wireless communication system, including a transceiver and a controller configured to control to receive, from a user equipment (UE), sidelink UE information including information related to new radio (NR) sidelink communication through the transceiver and to transmit, to the UE, an RRC message including configuration information related to the NR sidelink communication through the transceiver. The configuration information includes a sidelink grant configuration information list for each bandwidth part (BWP). The sidelink grant configuration information list includes at least one of sidelink grant information. The sidelink grant information includes a sidelink grant information identifier, the number of hybrid automatic repeat request (HARQ) processes, sidelink time resource information, or sidelink frequency resource information.

According to various embodiments of the disclosure, there can be provided the method and apparatus for a discontinuous reception mode operation in the inactive mode in a next-generation mobile communication system. Furthermore, according to various embodiments of the disclosure, there can be provided the method and apparatus for supporting vehicle communication in a next-generation mobile communication system.

BRIEF DESCRIPTION OF THE DRAWINGS

FIG. 1C is a flowchart of a process of determining a discontinuous reception cycle for a UE idle mode according to an embodiment of the disclosure.

FIG. 1F is a flowchart of a process of determining a discontinuous reception cycle for an inactive mode in a (1-1) embodiment of the disclosure.

FIG. 2H is a diagram describing a method of transmitting and receiving system information for supporting V2X communication in a next-generation mobile communication system according to an embodiment of the disclosure.

DETAILED DESCRIPTION

Figure 1A:
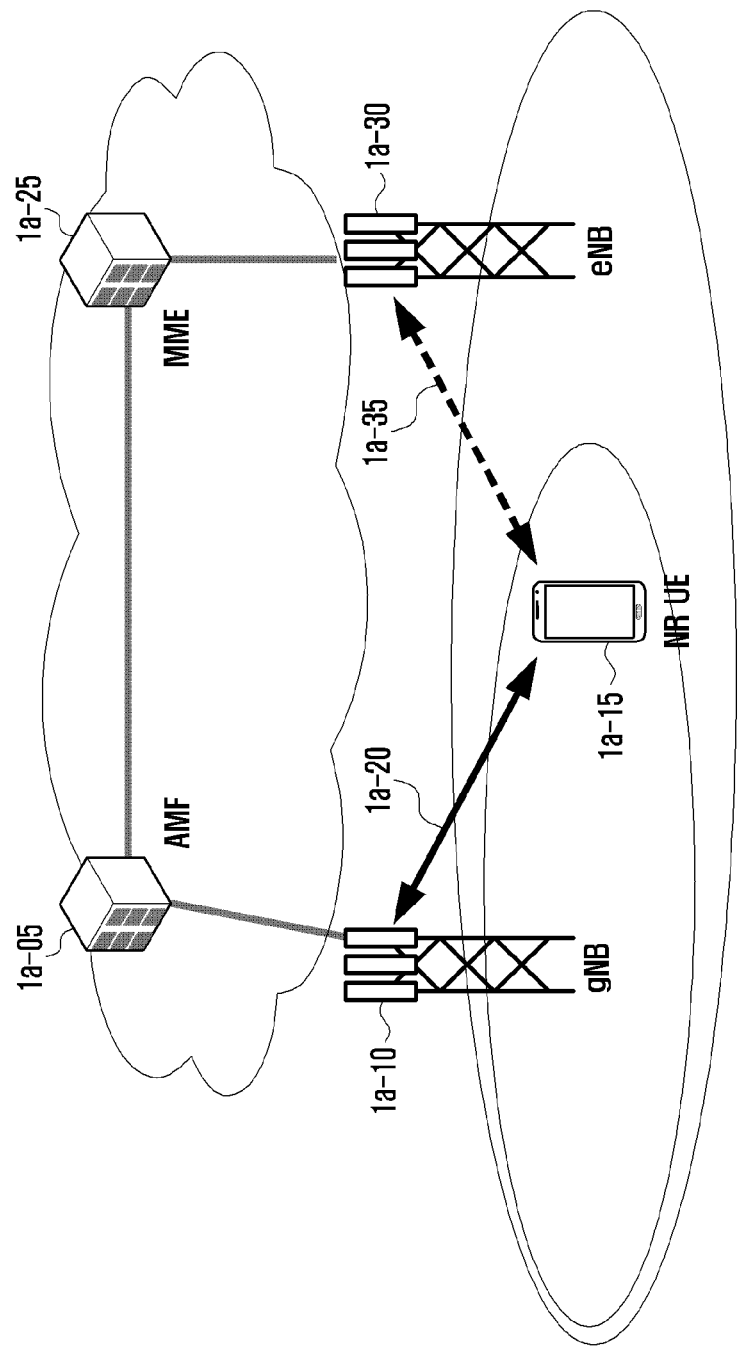
FIG. 1A is a diagram illustrating a configuration of a next-generation mobile communication system according to an embodiment of the disclosure.

Hereinafter, preferred embodiments of the disclosure are described in detail with reference to the accompanying drawings. It is to be noted that the same reference numbers are used to refer to the same elements in the accompanying drawings. Furthermore, a detailed description of known functions or constructions that may make the gist of the disclosure vague will be omitted.

In this specification, in describing the embodiments, a description of technology contents that are well known in the art to which the disclosure pertains and that are not directly related to the disclosure is omitted in order to clearly deliver the gist of the disclosure without obscuring the gist of the disclosure by omitting an unnecessary description.

For the same reason, in the accompanying drawings, some elements are enlarged, omitted or schematically depicted. Furthermore, the size of each element does not accurately reflect its real size. In the drawings, the same or similar elements are assigned the same reference numerals.

Advantages and characteristics of the disclosure and a method for achieving the advantages and characteristics will become apparent from the embodiments described in detail in conjunction with the accompanying drawings. However, the disclosure is not limited to the disclosed embodiments, but may be implemented in various different forms. The embodiments are provided to only complete the disclosure and to fully notify a person having ordinary knowledge in the art to which the disclosure pertains of the category of the disclosure. The disclosure is defined by the category of the claims. Throughout the specification, the same reference numerals denote the same elements.

The disclosure has been described by considering a next-generation mobile communication system, but may also be applied to an LTE mobile communication system. For example, an access and mobility management function (AMF), that is, one of network entities in a next-generation mobile communication system, corresponds to the mobility management entity (MME) of an LTE system.

First Embodiment

FIG. 1A is a diagram illustrating a configuration of a next-generation mobile communication system according to an embodiment of the disclosure.

Referring to FIG. 1A, as illustrated, a radio access network of the next-generation mobile communication system (new radio (NR)) consists of a new radio node B (hereafter referred to as a "gNB") 1a-10 and an AMF 1a-05 (new radio core network). A new radio user equipment (hereinafter referred to as an "NR UE" or a "terminal") 1a-15 accesses an external network through the gNB 1a-10 and the AMF 1a-05.

In FIG. 1A, the gNB 1a-10 corresponds to an evolved node B (eNB) of the existing LTE system. The gNB 1a-10 is connected to the NR UE 1a-15 through a wireless channel, and can provide more excellent services than the existing node B (1a-20). In the next-generation mobile communication system, all types of user traffic are served through a shared channel. Accordingly, there is a need for an apparatus for performing scheduling by collecting state information, such as buffer states, available transmission power states, and channel states of UEs, which is handled by the gNB 1a-10. In general, one gNB controls multiple cells. In order to implement ultra-high speed data transmission compared to the existing LTE, the existing maximum bandwidth or more may be used, and a beamforming technology may be additionally grafted using orthogonal frequency division multiplexing (hereinafter referred to as "OFDM") as a radio access technology. Furthermore, an adaptive modulation & coding (hereinafter referred to as "AMC") scheme for determining a modulation scheme and a channel coding rate based on a channel state of a UE is applied. The AMF 1a-05 performs functions, such as mobility support, a bearer configuration, and a quality of service (QoS) configuration. The AMF 1a-05 is an apparatus responsible for various control functions in addition to a mobility management function for a UE, and is connected to multiple base stations. Furthermore, a next-generation mobile communication system may also operate in conjunction with the existing LTE system. The AMF 1a-05 is connected to an MME 1a-25 through a network interface. The MME 1a-25 is connected to an eNB 1a-30, that is, the existing base station. A UE supporting LTE-NR dual connectivity may transmit and receive data while also maintaining a connection with the eNB 1a-30 in addition to the gNB 1a-10 (1a-35).

Figure 1B:
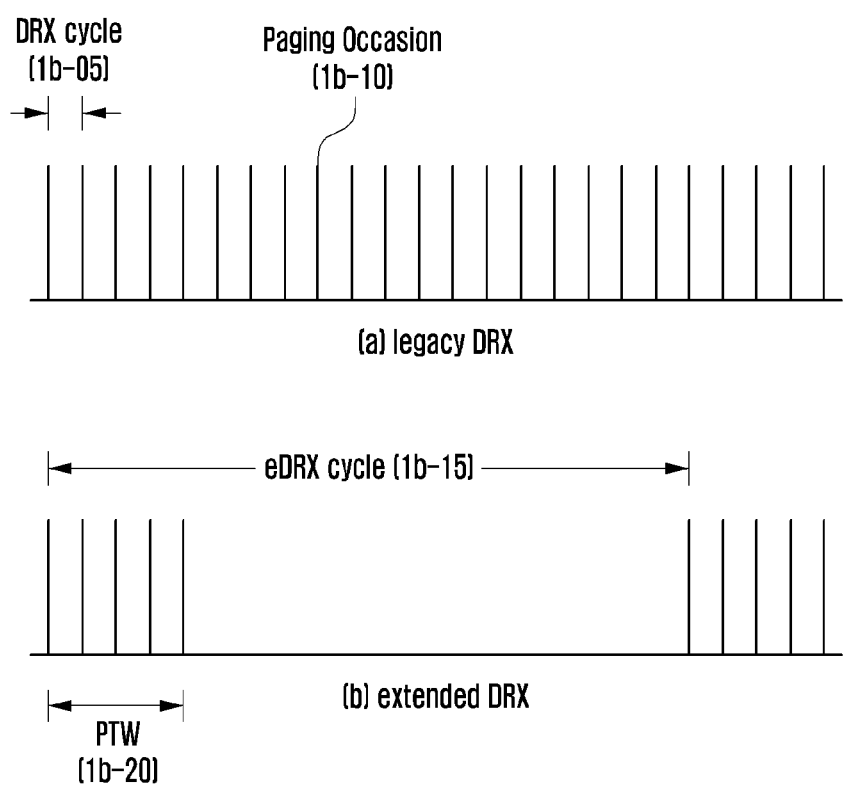
FIG. 1B is a diagram describing a discontinuous reception cycle and an extended discontinuous reception mode according to an embodiment of the disclosure.

FIG. 1B is a diagram describing a discontinuous reception cycle and an extended discontinuous reception mode according to an embodiment of the disclosure.

Discontinuous reception (DRX) is a technology for reducing power consumption of a UE in LTE and a next-generation mobile communication system. A UE performs a reception operation in order to receive a paging signal from a base station. However, since the paging signal is not frequently transmitted, if the UE performs the reception operation up to the time when the paging signal is not received, a power loss is increased. Accordingly, in order to reduce power consumption, the UE may periodically attempt to receive the paging signal only at specific timing, which is called DRX. The paging timing is called a paging occasion (PO) 1b-10. In an LTE system, DRX operations of UEs in an idle mode (radio resource control (RRC) Idle) are performed according to Equation 1 below. A system frame number (SFN) is increased by 1 every radio frame. If a paging signal is delivered in a radio frame that satisfies the corresponding equation, the UE performs a reception operation by DRX. The radio frame is called a paging frame (PF).

$$\text{SFN mod } T = (T \text{ div } N)*(UE\_ID \text{ mod } N) \quad \text{<Equation 1>}$$

Wherein

SFN: System frame Number. 10 bits (most significant bit (MSB) 8 bits explicit, least significant bit (LSB) 2 bits implicit)

T: DRX cycle of the UE. Transmitted on SIB2. ENUMERATED {rf32, rf64, rf128, rf256}

N: min(T,nB)

nB: Transmitted on SIB2. ENUMERATED {4T, 2T, T, T/2, T/4, T/8, T/16, T/32}.

UE_ID: IMSI mod 1024 (IMSI is a unique number assigned to each UE)

A given subframe or time slot in which paging is transmitted in the PF is called a paging occasion (PO).

8 bits in the MIB (Master Information Block) of a physical broadcast channel (PBCH) indicate an SFN. T and nB are values which are included in SIB2 (SystemInformationBlockType2) and provided by a base station. One of a UE preference cycle (UE-specific DRX cycle) and a base station provision cycle (cell-specific DRX cycle, T in the equation) is applied to a DRX cycle 1b-05 according to a predetermined standard.

Extended discontinuous reception (eDRX) is a technology for additionally reducing power consumption of a UE compared to DRX in LTE and a next-generation mobile communication system. Among machine type communication (MTC) devices, tracking-related devices, such as an animal and a vehicle cargo, are supplied with power by using a battery, in general, or by autonomously generating power. Accordingly, it is preferred that such MTC devices efficiently use very small power because they use limited power. In contrast, MTC devices that require communication only several times a day regardless of time have a "time tolerant" characteristic. MTC devices installed at one place and collecting and transmitting specific information without mobility have a "low mobility" characteristic. The eDRX may be applied to the UEs. A network may configure an eDRX cycle (1b-15) and a paging time window (PTW) 1b-20 in response to a UE request. The PTW is reached every eDRX cycle. During the PTW time interval, a UE monitors paging according to a conventional DRX cycle.

A hyper frame (PH, paging hyperframe) in which paging is transmitted is derived from the following equation.

$$H\text{-SFN mod TeDRX,}H = (UE\_ID\_H \text{ mod TeDRX,}H) \quad \text{<Equation 2>}$$

wherein UE_ID_H is defined as follows.

10 most significant bits of the Hashed ID, if P-RNTI is monitored on PDCCH or MPDCCH 12 most significant bits of the Hashed ID, if P-RNTI is monitored on NPDCCH
TeDRX,H is defined as follows.
TeDRX,H: the eDRX cycle of the UE in Hyper-frames, (TeDRX,H=1, 2, . . . , 256 Hyper-frames) (for NB-IoT, TeDRX,H=2, . . . , 1024 Hyper-frames) and configured by upper layers.

The first radio frame in which paging is transmitted within a PH is called PTW_start, and is defined as the following equation.

$$SFN=256*ieDRX \qquad <\text{Equation 3}>$$

wherein ieDRX is defined as follows.
ieDRX=floor(UE_ID_H/TeDRX,H) mod 4

The last radio frame in which paging is transmitted within a PH is called PTW_end, and is defined as the following equation.

$$SFN=(PTW\_start+L*100-1) \bmod 1024 \qquad <\text{Equation 4}>$$

wherein L=Paging Time Window length (in seconds) configured by upper layers

For reference, the Hashed ID is defined as follows.
Hashed ID is Frame Check Sequence (FCS) for the bits b31, b30, . . . , b0 of S-TMSI
S-TMSI=<b39, b38, . . . , b0> as defined in TS 23.003 [35]
The 32-bit FCS shall be the ones complement of the sum (modulo 2) of Y1 and Y2, where
Y1 is the remainder of xk (x31+x30+x29+x28+x27+x26+x25+x24+x23+x22+x21+x20+x19+x18+x17+x16+x15+x14+x13+x12+x11+x10+x9+x8+x7+x6+x5+x4+x3+x2+x1+1) divided (modulo 2) by the generator polynomial x32+x26+x23+x22+x16+x12+x11+x10+x8+x7+x5+x4+x2+x+1, where k is 32; and
Y2 is the remainder of Y3 divided (modulo 2) by the generator polynomial x32+x26+x23+x22+x16+x12+x11+x10+x8+x7+x5+x4+x2+x+1, where Y3 is the product of x32 by "b31, b30, . . . , b0 of S-TMSI", i.e., Y3 is the generator polynomial x32 (b31*x31+b30*x30+ . . . +b0*1).

FIG. 1C is a flowchart of a process of determining a discontinuous reception cycle for a UE idle mode according to an embodiment of the disclosure.

A base station 1c-10 provides a UE 1c-05 with a cell-specific DRX value by using broadcasted system information (1c-20). If the UE 1c-05 wants a DRX cycle shorter than the cell-specific DRX value, the UE 1c-05 provides an MME 1c-15 with a UE-specific DRX value as a desired DRX value through an ATTACH or a tracking area update (TAU) process (1c-25). If paging for the UE 1c-05 is present, the MME 1c-15 transmits, to the base station 1c-10, the UE-specific DRX value provided by the UE 1c-05 along with the paging (1c-40). The UE 1c-05 determines, as a DRX cycle, a shorter value among the UE-specific DRX value transmitted to the MME 1c-15 and the cell-specific DRX value provided by the base station 1c-10 (1c-35). The base station 1c-10 also determines, as a DRX cycle, a shorter value among the UE-specific DRX value received from the MME 1c-15 and the cell-specific DRX value broadcasted by the base station (1c-45). Accordingly, the UE 1c-05 and the base station 1c-10 select the same DRX cycle. After determining a PF based on the DRX cycle, the base station 1c-10 transmits paging to the UE 1c-05 (1c-50).

Figure 1D:
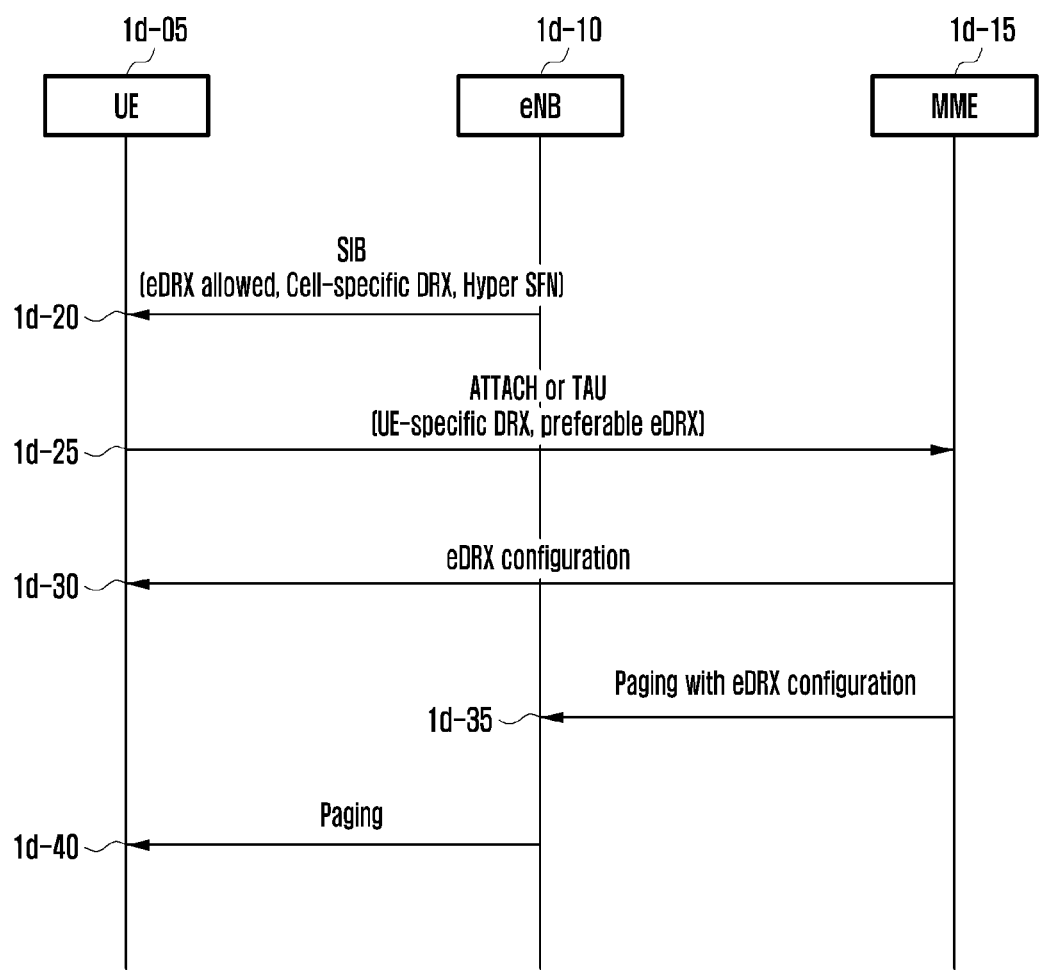
FIG. 1D is a flowchart of a process of determining an extended discontinuous reception cycle for the UE idle mode according to an embodiment of the disclosure.

FIG. 1D is a flowchart of a process of determining an extended discontinuous reception cycle for the UE idle mode according to an embodiment of the disclosure.

If a base station 1d-10 supports eDRX, the base station broadcasts related eDRX capability indication (1d-20). A UE 1d-05 is provided with given system information from the base station 1d-10 (1d-20). The given system information includes a cell-specific DRX value and a hyper SFN value. The hyper SFN is a value increased by 1 whenever an SFN is wrapped around. If the UE 1d-05 wants a DRX cycle shorter than the cell-specific DRX value, the UE provides a cell-specific DRX value to an MME 1d-15. If the UE 1d-05 determines that eDRX needs to be applied, the UE 1d-05 additionally provides a preferred eDRX value to the MME 1d-15. If the MME 1d-15 supports eDRX and accepts the eDRX request, the MME transmits an eDRX cycle and PTW information to the UE 1d-05 by using an ATTACH ACCEPT or TAU ACCEPT message (1d-30). The UE 1d-05 that has received the information determines, as a DRX cycle T, a shorter value among the cell-specific DRX value and the UE-specific DRX, and applies the eDRX cycle and the PTW information. When receiving paging for the UE 1d-05 from an S-GW, the MME 1d-15 transmits, to the base station 1d-10, paging along with the UE-specific DRX, eDRX, and PTW information (1d-35). The base station 1d-10 transmits the paging at a paging occasion of the UE 1d-05 based on a PTW, a PF, or a PO calculated based on the information received from the MME 1d-15 (1d-40).

Figure 1E:
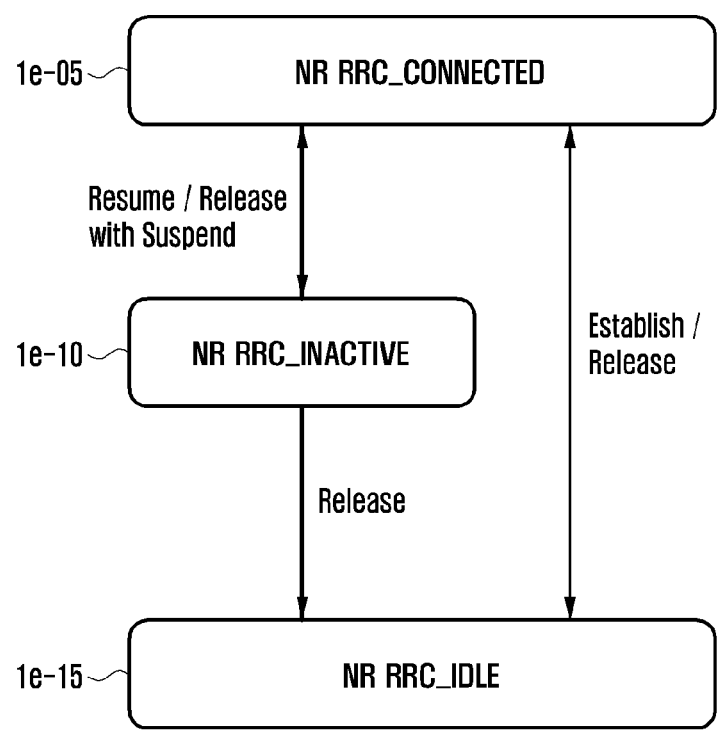
FIG. 1E is a diagram for describing a radio access state transition in a next-generation mobile communication system according to an embodiment of the disclosure.

FIG. 1E is a diagram for describing a radio access state transition in a next-generation mobile communication system according to an embodiment of the disclosure.

The next-generation mobile communication system has three radio access states (RRC states). A connected mode (RRC_CONNECTED) 1e-05 is a radio access state in which a UE may transmit and receive data. An idle mode (RRC_IDLE) 1e-10 is a radio access state in which a UE monitors whether paging is transmitted thereto. The two modes are radio access states also applied to the existing LTE system, and detailed descriptions thereof are the same as those of the existing LTE system. In the next-generation mobile communication system, an inactive (RRC_INACTIVE) radio access state 1e-15 has been newly defined. In the radio access state, UE context is maintained in a base station and a UE, and RAN-based paging is supported. Characteristics of the new radio access state are listed as follows.
  Cell re-selection mobility;
  CN-NR RAN connection (both C/U-planes) has been established for UE;
  The UE AS context is stored in at least one gNB and the UE;
  Paging is initiated by NR RAN;
  RAN-based notification area is managed by NR RAN;
  NR RAN knows the RAN-based notification area which the UE belongs to;

The new INACTIVE radio access state may switch to the connected mode or the idle mode according to a specific procedure. The INACTIVE mode switches to the connected mode according to a Connection Resume process, and the connected mode switches to the INACTIVE mode according to a Connection Release procedure. In the Connection Resume/Release procedure, one or more RRC messages are transmitted and received between a UE and a base station. The Connection Resume/Release procedure is characterized in that it consists of one or more steps. The INACTIVE mode may switch to the idle mode according to a specific procedure. Switch between the connected mode and the idle mode follows the existing LTE technology. That is, switch between the modes is performed according to a connection establishment or release procedure.

An embodiment of the disclosure proposes a method of applying eDRX in the inactive radio access state.

FIG. 1F is a flowchart of a process of determining a discontinuous reception cycle for an inactive mode in a (1-1) embodiment of the disclosure.

The (1-1) embodiment is characterized in that a base station configures eDRX.

If a base station 1*f*-10 supports eDRX, the base station broadcasts related eDRX capability indication (1*f*-20). A UE 1*f*-05 receives given system information from the base station 1*f*-10 (1*f*-20). The given system information includes a cell-specific DRX value and a hyper SFN value. If the UE 1*f*-05 wants a DRX cycle shorter than the cell-specific DRX value in the idle mode and the inactive mode, the UE provides the cell-specific DRX value to a core network (AMF or MME) 1*f*-15 by using ATTACH or a TAU. If the UE 1*f*-05 determines that eDRX needs to be applied in the inactive mode, the UE 1*f*-05 additionally provides a preferred eDRX value to the base station 1*f*-10 by using a given RRC message (1*f*-30). When the base station 1*f*-10 grants the eDRX request, the base station includes ran-PagingCycle, an eDRX cycle and PTW information in an RRC message that instructs the UE 1*f*-05 to switch its mode to the inactive mode, and transmits the RRC message to the UE 1*f*-05. The RRC message is an RRCRelease message. The ran-PagingCycle information has one of values 320, 640, 1280, and 2560 ms as a UE-specific DRX cycle for RAN paging. The ran-PagingCycle value is determined based on the UE-specific DRX cycle information provided by the AMF 1*f*-15. The UE 1*f*-05 that has received the RRCRelease message changes its mode from the connected mode to the inactive mode. The UE 1*f*-05 applies the eDRX cycle information provided as the eDRX cycle or applies a greater value among the cell-specific DRX and the provided eDRX cycle. The UE applies a shorter value among the cell-specific DRX and the ran-PagingCycle as the DRX cycle (1*f*-45). The base station 1*f*-10 also provides the AMF 1*f*-15 with the eDRX cycle and the PTW information provided to the UE 1*f*-05 (1*f*-40). The AMF 1*f*-15 provides the base station 1*f*-10 with UE-specific DRX cycle information of the UE 1*f*-05 (1*f*-32). The UE-specific DRX cycle information is delivered to the base station 1*f*-10 at least before the mode of the UE switches to the inactive mode. This is for synchronizing the RAN paging triggered by the base station 1*f*-10 and CN paging triggered by the AMF. When receiving the paging for the UE 1*f*-05 from an S-GW, the AMF 1*f*-15 transmits the paging to the base station 1*f*-05 along with the UE-specific DRX, eDRX, and PTW information. The base station 1*f*-10 transmits the CN paging at a paging occasion derived using the information received from the AMF 1*f*-15. When the RAN paging is triggered, the base station 1*f*-10 transmits the RAN paging at the paging occasion derived using the stored UE-specific DRX, eDRX, and PTW information (1*d*-50). That is, the base station 1*f*-10 applies the eDRX cycle information provided as the eDRX cycle or applies a greater value among the cell-specific DRX and the provided eDRX cycle. The base station applies a shorter value between the cell-specific DRX and the UE-specific DRX as the DRX cycle.

Figure 1G:
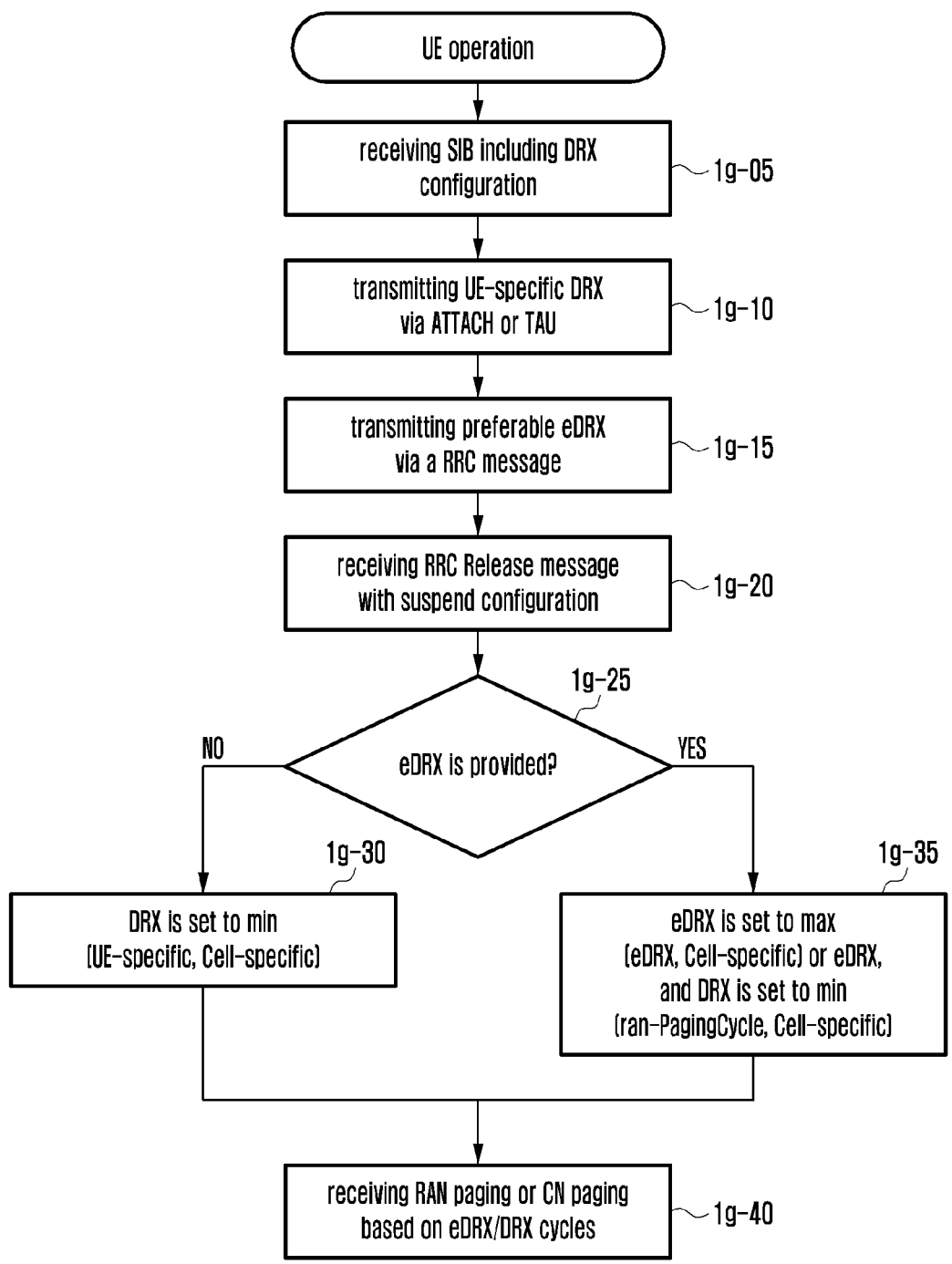
FIG. 1G is a flowchart of a UE operation in the (1-1) embodiment of the disclosure.

FIG. 1G is a flowchart of a UE operation in the (1-1) embodiment of the disclosure.

In step 1*g*-05, the UE is provided with DRX configuration information from the base station. The DRX configuration information includes a capability information indicator indicating whether eDRX is supported, Hyper SFN information, and a cell-specific DRX cycle value.

In step 1*g*-10, if the UE wants a DRX cycle value shorter than a cell-specific DRX cycle, the UE reports its preferred UE-specific DRX value to the core network (AMF or MME) by using a given NAS message.

In step 1*g*-15, the UE transmits its preferred eDRX cycle information to the base station by using a given RRC message.

In step 1*g*-20, the UE receives, from the base station, the given RRC message including ran-PagingCycle information, an eDRX cycle, and PTW information. The RRC message is used to change a mode of the UE to the idle mode or the inactive mode. If the RRC message is transmitted to the UE in order to change the mode of the UE to the inactive mode, the ran-PagingCycle information is necessarily included. After receiving the RRC message including the inactive mode configuration information, the UE changes its mode to the inactive mode.

In step 1*g*-25, the UE determines whether eDRX-related configuration information is included in the RRC message.

When the eDRX-related configuration information is not included, in step 1*g*-30, the UE configures only the DRX cycle as a smaller value among the ran-PagingCycle and the cell-specific DRX.

When the eDRX-related configuration information is included, in step 1*g*-35, the UE configures the DRX cycle as a smaller value of the ran-PagingCycle and the cell-specific DRX. The UE applies the provided eDRX cycle information as the eDRX cycle, or applies a greater value between the cell-specific DRX and the provided eDRX cycle as the eDRX cycle.

In step 1*g*-40, the UE derives paging reception timing, that is, PF, PO, PH, PTW_start, and PTW_end, using the derived DRX cycle and the eDRX cycle information, and monitors RAN paging or CN paging. The ran-PagingCycle information is valid only when the UE is in the inactive mode.

Figure 1H:
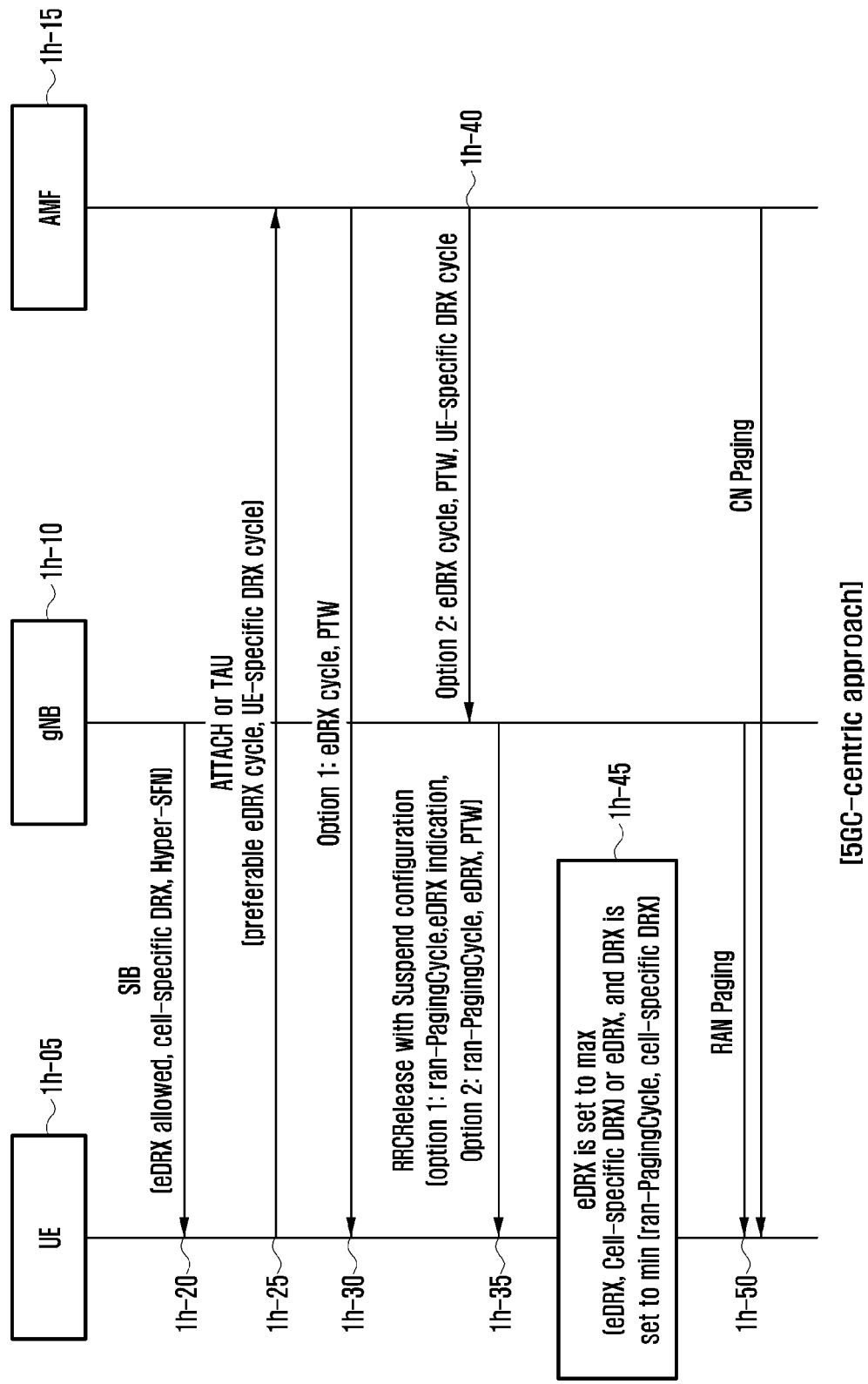
FIG. 1H is a flowchart of a process of determining a discontinuous reception cycle for the inactive mode in a (1-2) embodiment of the disclosure.

FIG. 1H is a flowchart of a process of determining a discontinuous reception cycle for the inactive mode in a (1-2) embodiment of the disclosure.

The (1-2) embodiment is characterized in that a core network (AMF or MME) configures eDRX.

If a base station 1*h*-10 supports eDRX, the base station broadcasts related eDRX capability indication (1*h*-20). A UE 1*h*-05 is provided with given system information from the base station 1*h*-10 (1*h*-20). The given system information includes a cell-specific DRX value and a hyper SFN value. If the UE 1*h*-05 wants a DRX cycle shorter than the cell-specific DRX value in the idle mode and the inactive mode, the UE provides a cell-specific DRX value to a core network (AMF or MME) 1*h*-25 by using ATTACH or TAU. If the UE 1*h*-05 determines that eDRX needs to be applied in the inactive mode, the UE 1*h*-05 additionally provides a preferred eDRX value to the AMF 1*h*-15 (1*h*-25). The AMF 1*h*-15 that has received the information may include two options depending on whether an eDRX cycle and PTW information are transmitted to the UE 1*h*-05 or the base station 1*h*-15.

Option 1: the AMF 1*h*-15 transmits, to the UE 1*h*-05, an NAS message including the eDRX cycle and the PTW information (1*h*-30). The AMF 1*h*-15 transmits the eDRX cycle, PTW, and UE-specific DRX information to the base station 1*h*-10 (1*h*-40). The base station 1*h*-10 includes ran-PagingCycle based on UE-specific DRX in an RRCRelease message, and transmits the message to the UE 1*h*-05 (1*h*-35). In general, the UE-specific DRX and the ran-PagingCycle are identically configured. The RRCRelease message includes an indicator indicating that an eDRX operation is performed. Accordingly, When receiving the eDRX configuration information through the NAS message and the eDRX execution indicator through the RRCRelease message, the UE 1h-05 performs an eDRX operation.

Option 2: the AMF 1h-15 transmits the eDRX cycle, PTW information, and UE-specific DRX to the base station 1h-10 (1h-40). The base station 1h-10 includes the information in a given RRC message and transmits the message to the UE 1h-05 (1h-35).

In order to change a mode of the UE 1h-05 to the inactive mode, the base station 1h-10 transmits the given RRC message (1f-35). In this case, included information is different depending on an option. That is, in Option 1, the ran-PagingCycle information and the indicator indicating that an eDRX operation is executed are included in the RRC message. In Option 2, the eDRX cycle and the PTW information are additionally included in the RRC message in addition to the ran-PagingCycle information.

The RRC message is an RRCRelease message. The ran-PagingCycle information has one of values 320, 640, 1280, and 2560 ms as a UE-specific DRX cycle for RAN paging. The ran-PagingCycle value is determined based on the UE-specific DRX cycle information provided by the AMF 1h-15. The UE 1h-0 that has received the message changes its mode from the connected mode to the inactive mode. In Option 1, when the UE 1h-05 is provided with the eDRX cycle and the PTW information through an NAS message and receives an RRCRelease message indicating a change to the inactive mode (when receiving an RRCRelease message including suspend configuration), the UE 1h-05 applies the eDRX cycle information provided as the eDRX cycle or applies a greater value among the cell-specific DRX and the provided eDRX cycle. The UE applies a shorter value among the cell-specific DRX and the ran-PagingCycle as the DRX cycle (1h-45). In Option 2, when the UE 1h-05 receives an RRCRelease message including the eDRX cycle, PTW, and ran-PagingCycle (when receiving an RRCRelease message including suspend configuration including the information), the UE 1h-05 applies the eDRX cycle information provided as the eDRX cycle or applies a greater value among the cell-specific DRX and the provided eDRX cycle. The UE applies a shorter value between the cell-specific DRX and the ran-PagingCycle as the DRX cycle (1h-45). This is for synchronizing RAN paging triggered by the base station 1h-10 and CN paging triggered by the AMF 1h-15. When receiving paging for the UE 1h-05 from an S-GW, the AMF 1h-15 transmits the paging to the base station 1h-10 along with the UE-specific DRX, eDRX, and PTW information. The base station 1h-10 transmits the CN paging at a paging occasion derived using the information received from the AMF 1h-15. If the RAN paging is triggered, the base station 1h-10 transmits the RAN paging at a paging occasion derived using the stored UE-specific DRX, eDRX, and PTW information (1h-50). That is, the base station 1h-10 applies the eDRX cycle information provided as the eDRX cycle or applies a greater value among the cell-specific DRX and the provided eDRX cycle. The base station applies a shorter value between the cell-specific DRX and the UE-specific DRX as the DRX cycle.

Figure 1I:
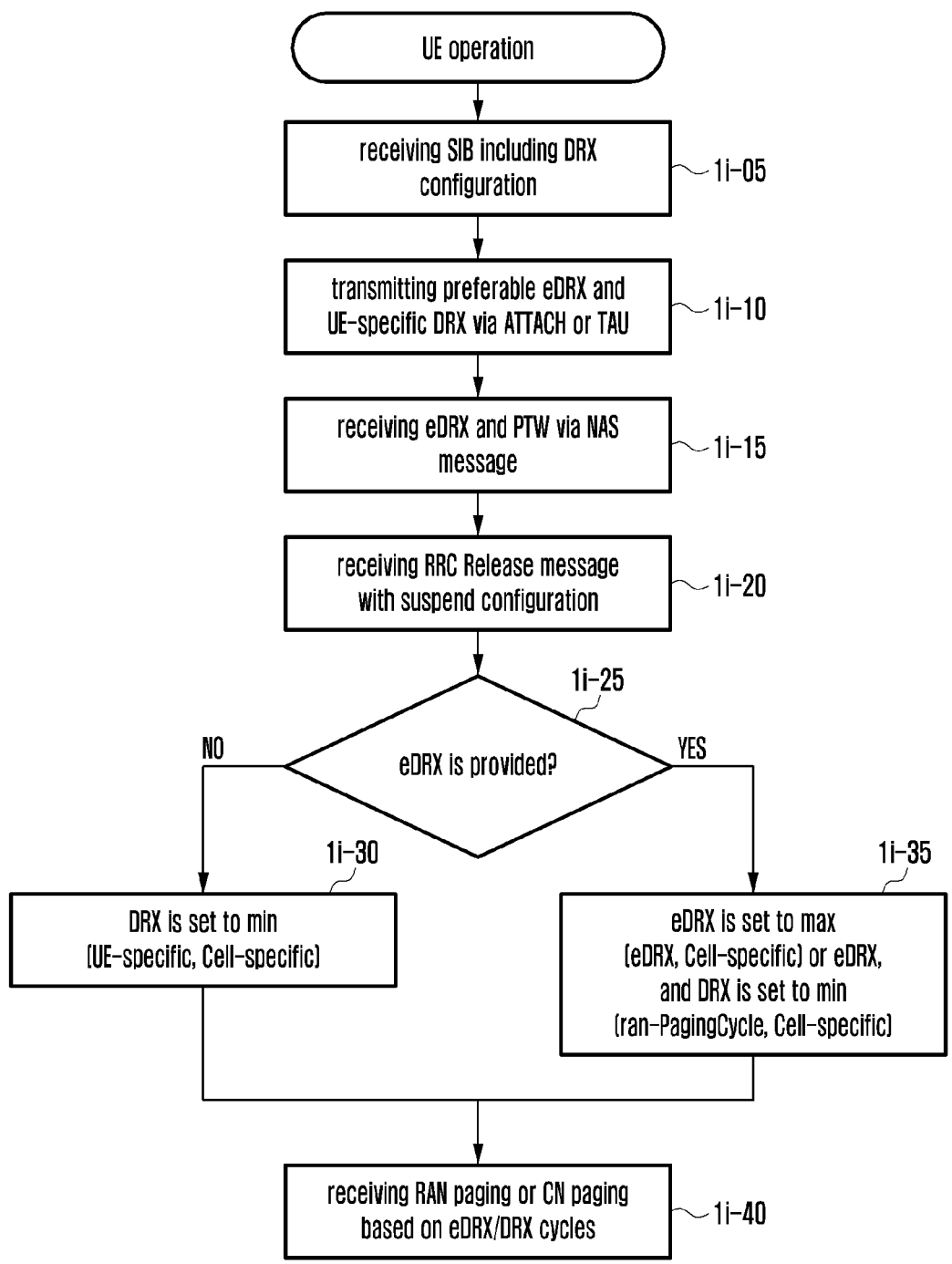
FIG. 1I is a flowchart of a UE operation in the (1-2) embodiment of the disclosure.

FIG. 1I is a flowchart of a UE operation in the (1-2) embodiment of the disclosure.

In step 1i-05, the UE is provided with DRX configuration information from the base station. The DRX configuration information includes a capability information indicator indicating whether eDRX is supported, Hyper SFN information, and a cell-specific DRX cycle value.

In step 1i-10, if the UE wants a DRX cycle value shorter than the cell-specific DRX cycle, the UE reports its preferred UE-specific DRX value to the core network (AMF or MME) by using a given NAS message. The UE transmits its preferred eDRX cycle information to the core network by using the given NAS message. The UE-specific DRX and the preferred eDRX cycle may be provided to the core network through the same NAS message.

In step 1i-15, in the case of Option 1, the UE receives, from the core network, the given NAS message including an eDRX cycle and PTW information.

In step 1i-20, the UE receives, from the base station, the given RRC message having an object for a change to the inactive mode. If the given RRC message has an object for a change to the inactive mode, ran-PagingCycle information is necessarily included in the given RRC message. In Option 1, ran-PagingCycle information is included in the RRC message. In Option 2, the eDRX cycle and the PTW information are additionally included in the RRC message in addition to the ran-PagingCycle information.

In step 1i-25, the UE determined whether eDRX-related configuration information is included in the RRC message.

If the eDRX-related configuration information is not included in the RRC message, in step 1e-30, the UE configures only the DRX cycle as a smaller value of the ran-PagingCycle as the cell-specific DRX.

If the eDRX-related configuration information is included in the RRC message, in step 1e-35, the UE configures the DRX cycle as a smaller value of the ran-PagingCycle and the cell-specific DRX, and applies the provided eDRX cycle information as the eDRX cycle or applies a greater value among the cell-specific DRX and the provided eDRX cycle as the eDRX cycle.

In step 1i-40, the UE derives paging reception timing, that is, PF, PO, PH, PTW_start, and PTW_end by using the derived DRX cycle and the eDRX cycle information, and monitors RAN paging or CN paging. The ran-PagingCycle information is valid only when the UE is in the inactive mode.

Figure 1J:
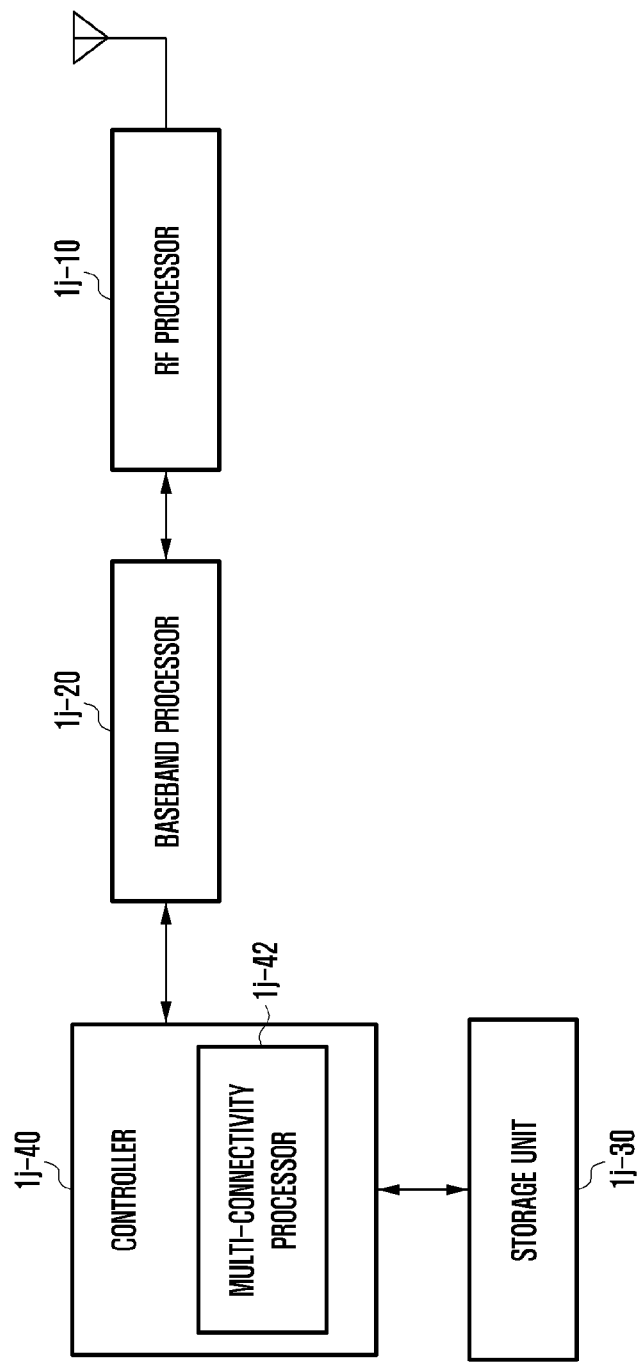
FIG. 1J is a diagram illustrating a configuration of a UE according to an embodiment of the disclosure.

FIG. 1J is a diagram illustrating a configuration of a UE according to an embodiment of the disclosure.

Referring to this drawing, the UE includes a radio frequency (RF) processor 1j-10, a baseband processor 1j-20, a storage unit 1j-30, and a controller 1j-40. The controller 1j-40 may further include a multi-connectivity processor 1j-42.

The RF processor 1j-10 performs a function for transmitting and receiving signals through a wireless channel, such as the band conversion, amplification, etc. of a signal. That is, the RF processor 1j-10 up-converts, into an RF band signal, a baseband signal received from the baseband processor 1j-20, transmits the RF band signal through an antenna, and down-converts, into a baseband signal, an RF band signal received through the antenna. For example, the RF processor 1j-10 may include a transmission filter, a reception filter, an amplifier, a mixer, an oscillator, a digital to analog convertor (DAC), an analog to digital convertor (ADC), etc. In the drawing, only one antenna has been illustrated, but the UE may include multiple antennas. Furthermore, the RF processor 1j-10 may include multiple RF chains. Furthermore, the RF processor 1j-10 may perform beamforming. For the beamforming, the RF processor 1j-10 may adjust the phase and size of each of signals transmitted and received through multiple antennas or antenna elements. Furthermore, the RF processor may perform MIMO. When the RF processor performs an MIMO operation, it may receive multiple layers.

The baseband processor 1*j*-20 performs a conversion function between a baseband signal and a bit stream based on the physical layer standard of a system. For example, when transmitting data, the baseband processor 1*j*-20 generates complex symbols by coding and modulating a transmission bit stream. Furthermore, when receiving data, the baseband processor 1*j*-20 restores a reception bit stream from a baseband signal, received from the RF processor 1*j*-10, through demodulation and decoding. For example, if an orthogonal frequency division multiplexing (OFDM) scheme is applied, when transmitting data, the baseband processor 1*j*-20 generates complex symbols by coding and modulating a transmission bit stream, maps the complex symbols to subcarriers, and then configures OFDM symbols through an inverse fast Fourier transform (IFFT) operation and cyclic prefix (CP) insertion. Furthermore, when receiving data, the baseband processor 1*j*-20 segments a baseband signal received from the RF processor 1*j*-10 in an OFDM symbol unit, restores signals mapped to subcarriers through a fast Fourier transform (FFT) operation, and then restores a reception bit stream through demodulation and decoding.

The baseband processor 1*j*-20 and the RF processor 1*j*-10 transmit and receive signals as described above. Accordingly, the baseband processor 1*j*-20 and the RF processor 1*j*-10 may be called a transmitter, a receiver, a transceiver or a communication unit. Furthermore, at least one of the baseband processor 1*j*-20 and the RF processor 1*j*-10 may include multiple communication modules in order to support multiple different radio access technologies. Furthermore, at least one of the baseband processor 1*j*-20 and the RF processor 1*j*-10 may include different communication modules in order to process signals having different frequency bands. For example, the different radio access technologies may include a wireless LAN (e.g., IEEE 802.11), a cellular network (e.g., LTE), etc. Furthermore, the different frequency bands may include a super high frequency (SHF) (e.g., 2 NRHz, NRhz) band and a millimeter wave (e.g., 60 GHz) band.

The storage unit 1*j*-30 stores data, such as a basic program, an application program, and configuration information for an operation of the UE. In particular, the storage unit 1*j*-30 may store information related to a second access node that performs wireless communication by using a second radio access technology. The storage unit 1*j*-30 provides stored data in response to a request from the controller 1*j*-40.

The controller 1*j*-40 controls overall operations of the UE. For example, the controller 1*j*-40 transmits and receives signals through the baseband processor 1*j*-20 and the RF processor 1*j*-10. Furthermore, the controller 1*j*-40 writes data in the storage unit 1*j*-30 and reads data from the storage unit 1*j*-30. To this end, the controller 1*j*-40 may include at least one processor. For example, the controller 1*j*-40 may include a communication processor (CP) performing control for communication and an application processor (AP) controlling a higher layer, such as an application program.

Figure 1K:
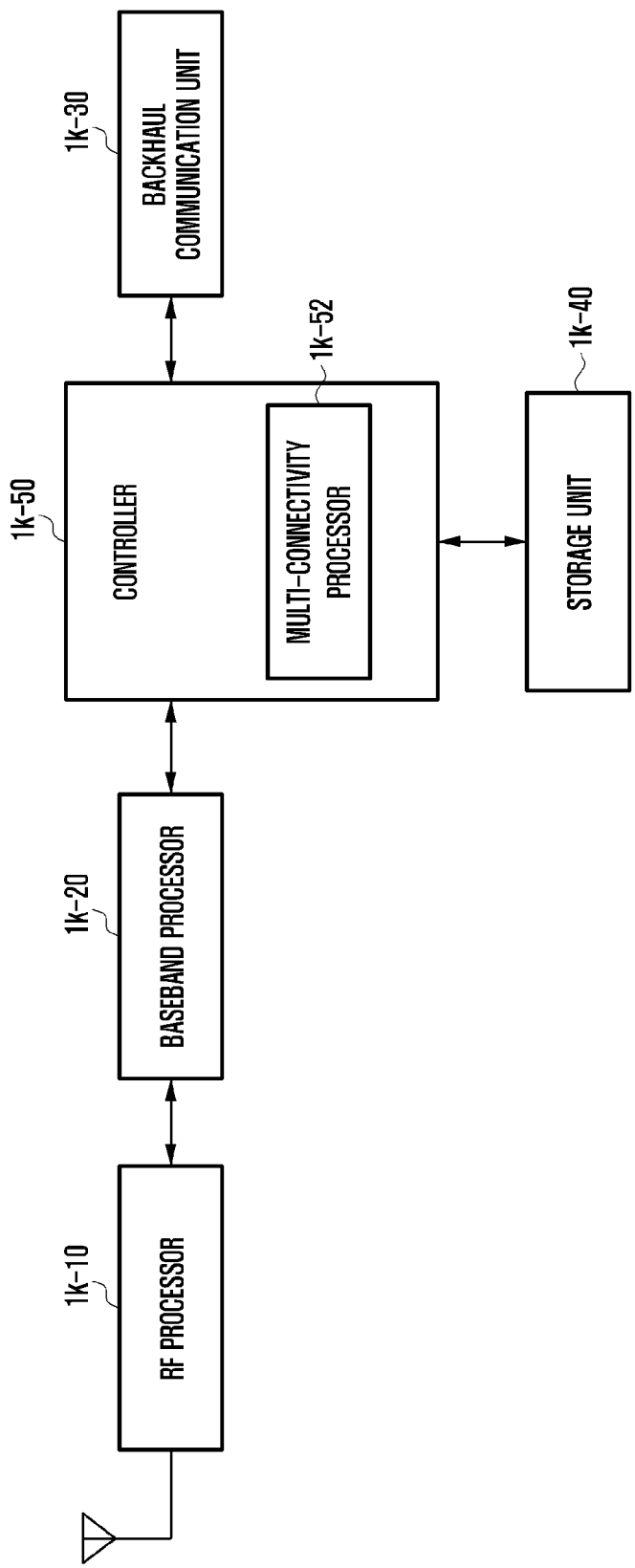
FIG. 1K is a diagram illustrating a configuration of a base station according to an embodiment of the disclosure.

FIG. 1K is a diagram illustrating a configuration of a base station according to an embodiment of the disclosure.

As illustrated in this drawing, the base station is configured to include an RF processor 1*k*-10, a baseband processor 1*k*-20, a backhaul communication unit 1*k*-30, a storage unit 1*k*-40, and a controller 1*k*-50. The controller 1*k*-50 may further include a multi-connectivity processor 1*k*-52.

The RF processor 1*k*-10 performs a function for transmitting and receiving signals through a wireless channel, such as the band conversion, amplification, etc. of a signal. That is, the RF processor 1*k*-10 up-converts, into an RF band signal, a baseband signal received from the baseband processor 1*k*-20, transmits the RF band signal through an antenna, and down-converts, into a baseband signal, an RF band signal received through the antenna. For example, the RF processor 1*k*-10 may include a transmission filter, a reception filter, an amplifier, a mixer, an oscillator, a DAC, an ADC, etc. In the drawing, only one antenna has been illustrated, but the first access node may include multiple antennas. Furthermore, the RF processor 1*k*-10 may include multiple RF chains. Furthermore, the RF processor 1*k*-10 may perform beamforming. For the beamforming, the RF processor 1*k*-10 may adjust the phase and size of each of signals transmitted and received through multiple antennas or antenna elements. The RF processor may perform a downlink MIMO operation by transmitting one or more layers.

The baseband processor 1*k*-20 may perform a conversion function between a baseband signal and a bit stream based on the physical layer standard of a first radio access technology. For example, when transmitting data, the baseband processor 1*k*-20 generates complex symbols by coding and modulating a transmission bit stream. Furthermore, when receiving data, the baseband processor 1*k*-20 restores a reception bit stream from a baseband signal, received from the RF processor 1*k*-10, through demodulation and decoding. For example, if the OFDM scheme is applied, when transmitting data, the baseband processor 1*k*-20 generates complex symbols by coding and modulating a transmission bit stream, maps the complex symbols to subcarriers, and then configures OFDM symbols through an IFFT operation and CP insertion. Furthermore, when receiving data, the baseband processor 1*k*-20 segments a baseband signal received from the RF processor 1*k*-10 in an OFDM symbol unit, restores signals mapped to subcarriers through an FFT operation, and then restores a reception bit stream through demodulation and decoding. The baseband processor 1*k*-20 and the RF processor 1*k*-10 transmit and receive signals as described above. Accordingly, the baseband processor 1*k*-20 and the RF processor 1*k*-10 may be called a transmitter, a receiver, a transceiver, a communication unit or a wireless communication unit.

The backhaul communication unit 1*k*-30 provides an interface for performing communication with other nodes within a network. That is, the backhaul communication unit 1*k*-30 converts, into a physical signal, a bit stream transmitted from a primary base station to another node, for example, a secondary base station, a core network, etc., and converts, into a bit stream, a physical signal received from another node.

The storage unit 1*k*-40 stores data, such as a basic program, an application program, and configuration information for an operation of the primary base station. Specifically, the storage unit 1*k*-40 may store information on a bearer allocated to an accessed UE and measurement results reported by an accessed UE. Furthermore, the storage unit 1*k*-40 may store information, that is, a criterion for determining whether to provide a UE with multiple connections or whether to stop a UE with multiple connections. Furthermore, the storage unit 1*k*-40 provides stored data in response to a request from the controller 1*k*-50.

The controller 1*k*-50 controls overall operations of the primary base station. For example, the controller 1*k*-50 transmits and receives signals through the baseband processor 1*k*-20 and the RF processor 1*k*-10 or through the backhaul communication unit 1*k*-30. Furthermore, the controller 1*k*-50 writes data in the storage unit 1*k*-40 and reads data from the storage unit 1*k*-40. To this end, the controller 1*k*-50 may include at least one processor.

Second Embodiment

Figure 2A:
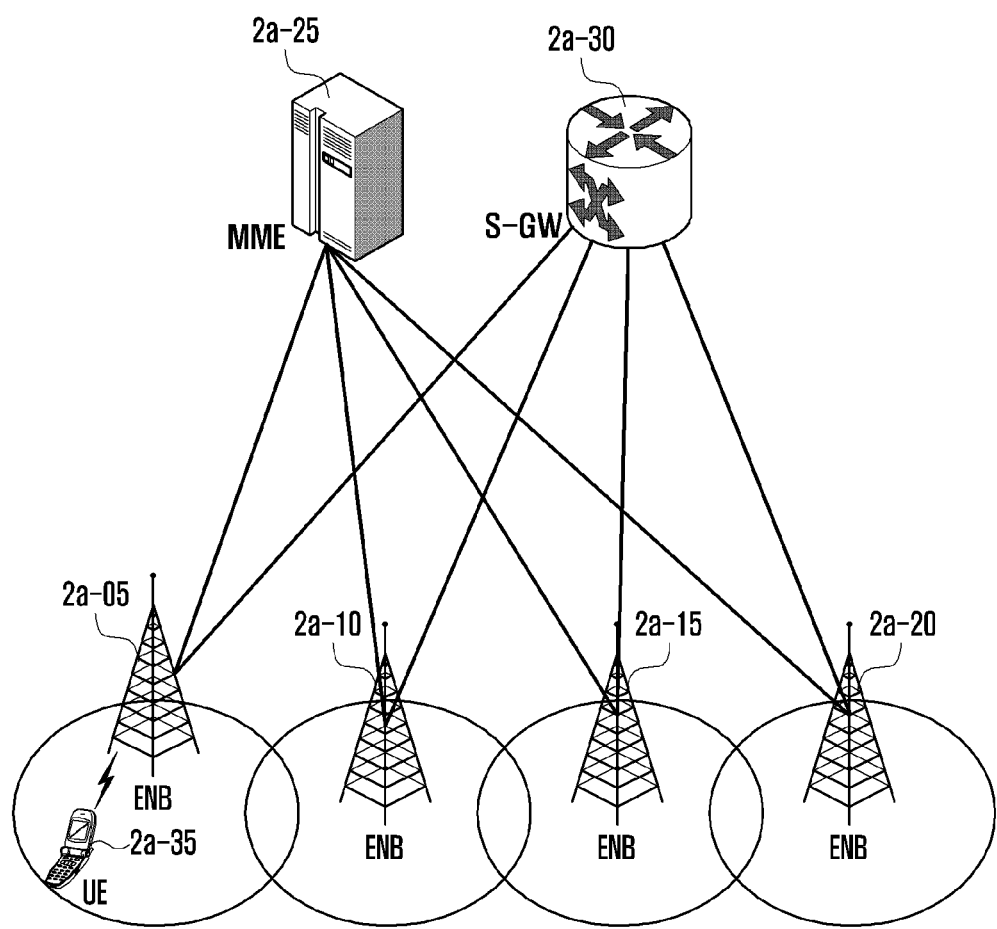
FIG. 2A is a diagram illustrating a configuration of an LTE system according to an embodiment of the disclosure.

FIG. 2A is a diagram illustrating a configuration of an LTE system according to an embodiment of the disclosure.

Referring to FIG. 2A, a radio access network of the LTE system may be configured with evolved node Bs (hereinafter "ENBs", "Node Bs" or "base stations") 2a-05, 2a-10, 2a-15, and 2a-20, a mobility management entity (MME) 2a-25, and a serving-gateway (S-GW) 2a-30. A user equipment (hereinafter a "UE" or a "terminal") 2a-35 may access an external network through the ENBs 2a-05, 2a-10, 2a-15, and 2a-20 and the S-GW 2a-30.

In FIG. 2A, the ENBs 2a-05, 2a-10, 2a-15, and 2a-20 may correspond to the existing Node Bs of a universal mobile telecommunication system (UMTS). The ENB may be connected to the UE 2a-35 through a wireless channel, and may perform a more complex function than the existing Node B. In the LTE system, all of types of user traffic including a real-time service, such as voice over IP (VoIP), through an Internet protocol, may be served through a shared channel. Accordingly, there is a need for an apparatus that performs scheduling by collecting state information, such as buffer states, available transmission power states, channel states, etc. of UEs. The ENBs 2a-05, 2a-10, 2a-15, and 2a-20 may play a role as the apparatus.

In general, one ENB may control multiple cells. For example, in order to implement a transfer rate of 100 Mbps, an LTE system may use orthogonal frequency division multiplexing (OFDM) as a radio access technology in a 20 MHz bandwidth, for example. Furthermore, the LTE system may apply an adaptive modulation & coding (AMC) scheme for determining a modulation scheme and a channel coding rate based on a channel state of the UE. The S-GW 2a-30 is an apparatus that provides a data bearer, and may generate or remove a data bearer under the control of the MME 2a-25. The MME 2a-25 is an apparatus responsible for various control functions in addition to a mobility management function for the UE 2a-35, and may be connected to multiple base stations.

Figure 2B:
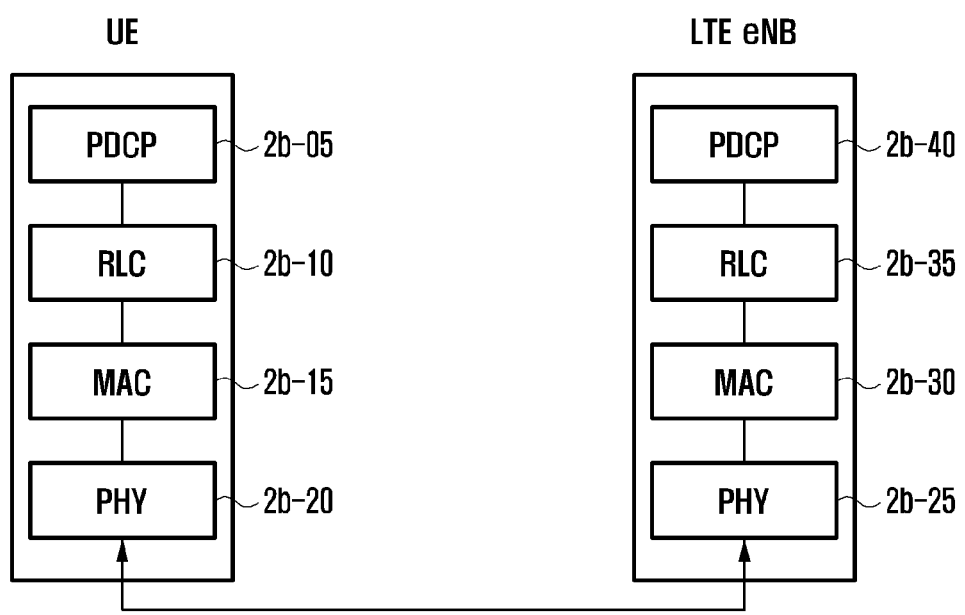
FIG. 2B is a diagram illustrating a radio protocol architecture in an LTE system according to an embodiment of the disclosure.

FIG. 2B is a diagram illustrating a radio protocol architecture in an LTE system according to an embodiment of the disclosure.

Referring to FIG. 2B, the radio protocol of the LTE system may consist of packet data convergence protocols (PDCPs) 2b-05 and 2b-40, radio link controls (RLCs) 2b-10 and 2b-35, and medium access controls (MACs) 2b-15 and 2b-30 in a UE and an ENB, respectively.

The PDCP 2b-05, 2b-040 may be responsible for operations, such as IP header compression/restoration. Major functions of the PDCP 2b-05, 2b-040 may be summarized as follows.
  Header compression and decompression: ROHC only
  Transfer of user data
  In-sequence delivery of upper layer PDUs at PDCP re-establishment procedure for RLC AM
  For split bearers in DC (only support for RLC AM): PDCP PDU routing for transmission and PDCP PDU reordering for reception
  Duplicate detection of lower layer SDUs at PDCP re-establishment procedure for RLC AM
  Retransmission of PDCP SDUs at handover and, for split bearers in DC, of PDCP PDUs at PDCP data-recovery procedure, for RLC AM
  Ciphering and deciphering
  Timer-based SDU discard in uplink.

The radio link control (RLC) 2b-10, 2b-35 may reconfigure a PDCP packet data unit (PDU) in a proper size and perform an ARQ operation. Major functions of the RLC 2b-10, 2b-35 may be summarized as follows.
  Transfer of upper layer PDUs
  Error Correction through ARQ (only for AM data transfer)
  Concatenation, segmentation and reassembly of RLC SDUs (only for UM and AM data transfer)
  Re-segmentation of RLC data PDUs (only for AM data transfer)
  Reordering of RLC data PDUs (only for UM and AM data transfer
  Duplicate detection (only for UM and AM data transfer)
  Protocol error detection (only for AM data transfer)
  RLC SDU discard (only for UM and AM data transfer)
  RLC re-establishment The MAC 2b-15, 2b-30 is connected to several RLC layer entities configured in one UE, and may perform an operation of multiplexing RLC PDUs into a MAC PDU and demultiplexing RLC PDUs from a MAC PDU. Major functions of the MAC 2b-15, 2b-30 may be summarized as follows.
  Mapping between logical channels and transport channels
  Multiplexing/demultiplexing of MAC SDUs belonging to one or different logical channels into/from transport blocks (TB) delivered to/from the physical layer on transport channels)
  Scheduling information reporting
  Error correction through HARQ
  Priority handling between logical channels of one UE
  Priority handling between UEs by means of dynamic scheduling
  MBMS service identification
  Transport format selection
  Padding The physical layer (PHY) 2b-20, 2b-25 may perform an operation of channel-coding and modulating higher layer data, generating the higher layer data into an OFDM symbol, transmitting the OFDM symbol through a wireless channel or demodulating an OFDM symbol received through a wireless channel, channel-decoding the OFDM symbol, and transmitting the OFDM symbol to a higher layer.

Figure 2C:
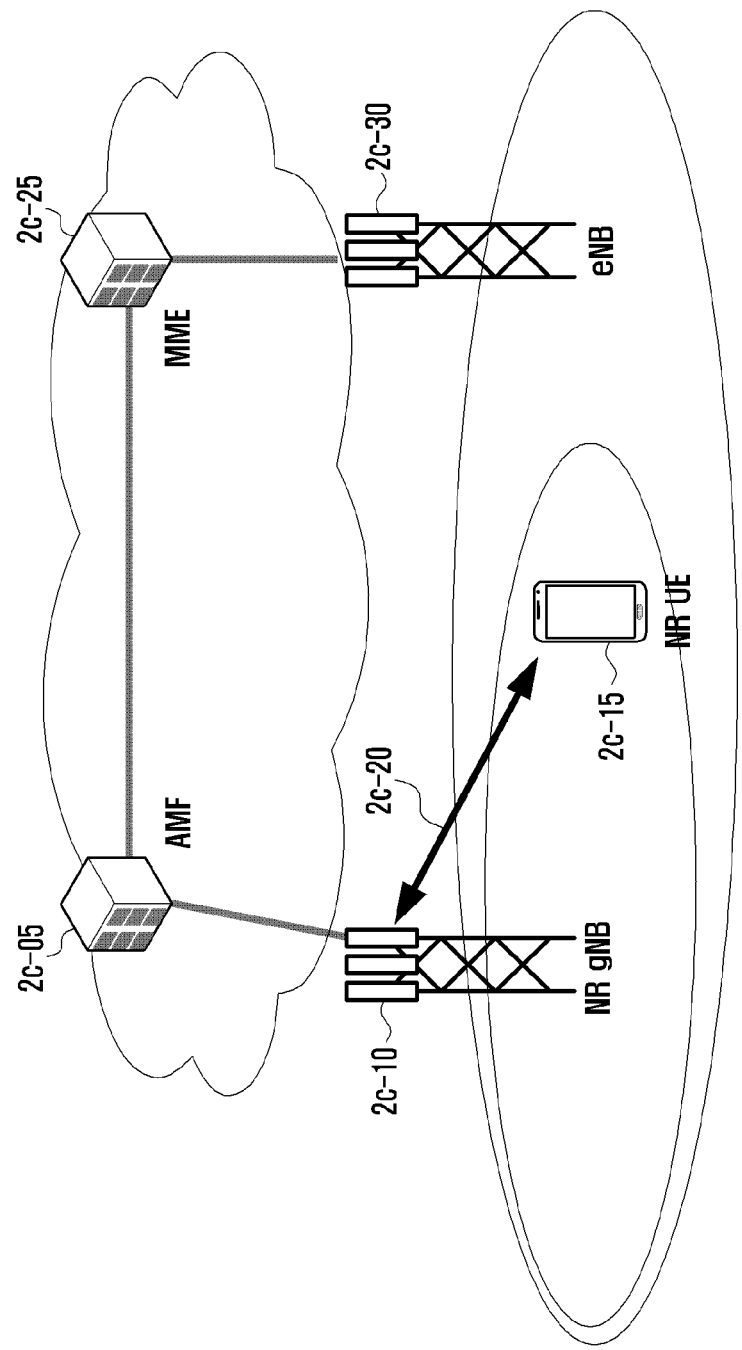
FIG. 2C is a diagram illustrating a configuration of a next-generation mobile communication system according to an embodiment of the disclosure.

FIG. 2C is a diagram illustrating a configuration of a next-generation mobile communication system according to an embodiment of the disclosure.

Referring to FIG. 2C, a radio access network of the next-generation mobile communication system (hereinafter NR or 5g) may be configured with a new radio Node B (hereinafter referred to as an NR gNB or an NR base station) 2c-10 and a new radio core network (NR CN) 2c-05. A new radio user equipment (NR UE or terminal) 2c-15 may access an external network through the NR gNB 2c-10 and the NR CN 2c-05.

In FIG. 2C, the NR gNB 2c-10 may correspond to an evolved Node B (eNB) of the existing LTE system. The NR gNB 2c-10 is connected to the NR UE 2c-15 through a wireless channel, and may provide an excellent service compared to the existing Node B. In the next-generation mobile communication system, all of types of user traffic may be served through a shared channel. Accordingly, there is a need for an apparatus that performs scheduling by collecting state information, such as buffer states, available transmission power states, and channel states of UEs. The NR gNB 2c-10 plays a role as the apparatus. One NR gNB may control a plurality of cells. In the next-generation mobile communication system, in order to implement ultra-high speed data transmission compared to current LTE, a bandwidth equal to or higher than a current maximum bandwidth may be applied. Furthermore, a beamforming technology may be additionally grafted using orthogonal frequency division multiplexing (OFDM) as a radio access technology. Furthermore, an adaptive modulation & coding (hereinafter referred to as "AMC") scheme for determining a modulation scheme and a channel coding rate based on a channel state of a UE may be applied.

The NR CN 2c-05 may perform functions, such as mobility support, a bearer setup, and a QoS configuration. The NR CN 2c-05 is an apparatus responsible for various control functions in addition to a mobility management function for the UE 2c-15, and may be connected to a plurality of base stations. Furthermore, the next-generation mobile communication system may also operate in conjunction with the existing LTE system. The NR CN 2c-05 may be connected to an MME 2c-25 through a network interface. The MME 2c-25 may be connected to an eNB 2c-30, that is, the existing base station.

Figure 2D:
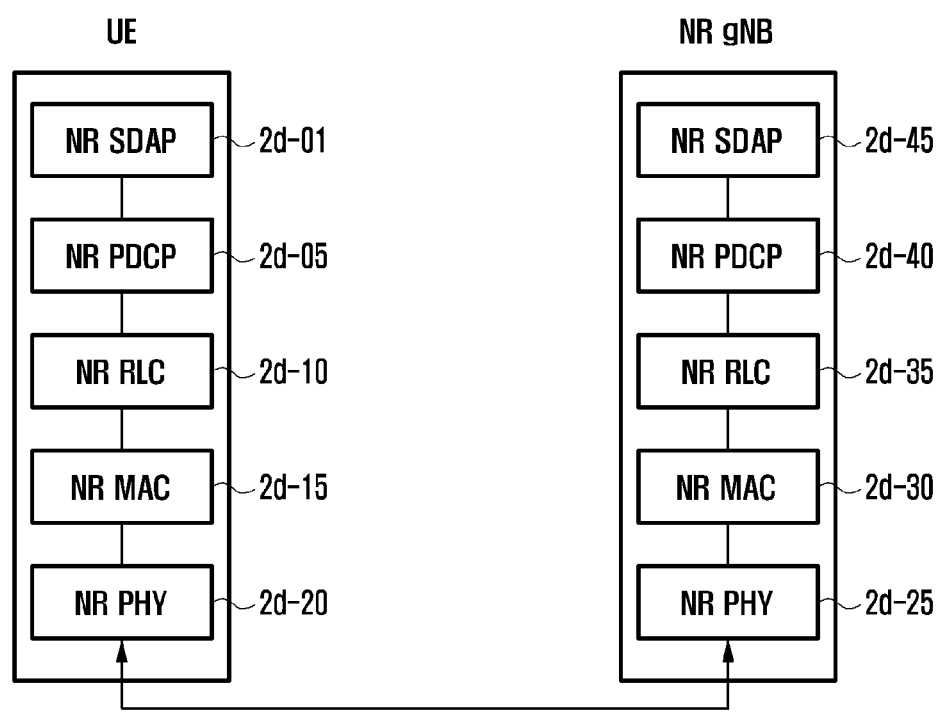
FIG. 2D is a diagram illustrating a radio protocol architecture of a next-generation mobile communication system according to an embodiment of the disclosure.

FIG. 2D is a diagram illustrating a radio protocol architecture of a next-generation mobile communication system according to an embodiment of the disclosure.

Referring to FIG. 2D, the radio protocol of the next-generation mobile communication system consists of NR service data adaptation protocols (SDAPs) 2d-01 and 2d-45, NR PDCPs 2d-05 and 2d-40, NR RLCs 2d-10 and 2d-35, NR MACs 2d-15 and 2d-30, and NR PHYs 2d-20 and 2d-25, in a UE and an NR gNB, respectively.

Major functions of the NR SDAP 2d-01, 2d-45 may include some of the following functions.
  Transfer of user plane data
  Mapping between a QoS flow and a DRB for both DL and UL
  Marking QoS flow ID in both DL and UL packets
  Reflective QoS flow to DRB mapping for the UL SDAP PDUs.

With respect to an SDAP layer apparatus, whether to use the header of the SDAP layer apparatus or whether to use a function of the SDAP layer apparatus for each PDCP layer apparatus or for each bearer or for each logical channel may be configured for the UE through a radio resource control (RRC) message. If an SDAP header has been configured, the UE may be instructed to update or reconfigure a QoS flow of the uplink and the downlink and mapping information for a data bearer through a non-access stratum (NAS) quality of service (QoS) reflective configuration 1-bit indicator (NAS reflective QoS) of the SDAP header and an access stratum (AS) QoS reflective configuration 1-bit indicator (AS reflective QoS). The SDAP header may include QoS flow ID information indicative of QoS. QoS information may be used as data processing priority, scheduling information, etc. for supporting a smooth service.

Major functions of the NR PDCP 2d-05, 2d-40 may include some of the following functions.
  Header compression and decompression: ROHC only
  Transfer of user data
  In-sequence delivery of upper layer PDUs
  Out-of-sequence delivery of upper layer PDUs
  PDCP PDU reordering for reception
  Duplicate detection of lower layer SDUs
  Retransmission of PDCP SDUs
  Ciphering and deciphering
  Timer-based SDU discard in uplink.

In the aforementioned contents, the reordering of the NR PDCP apparatus may mean a function of sequentially reordering PDCP PDUs, received from a lower layer, based on a PDCP sequence number (SN). The reordering of the NR PDCP apparatus may include a function of delivering data to a higher layer in a reordered sequence, may include a function of directly delivering data without considering a sequence, may include a function of reordering sequences of data and recording lost PDCP PDUs, may include a function of transmitting, to the transmission side, a state report for lost PDCP PDUs, and may include a function of requesting the retransmission of lost PDCP PDUs.

Major functions of the NR RLC 2d-10, 2d-35 may include some of the following functions.
  Transfer of upper layer PDUs
  In-sequence delivery of upper layer PDUs
  Out-of-sequence delivery of upper layer PDUs
  Error Correction through ARQ
  Concatenation, segmentation and reassembly of RLC SDUs
  Re-segmentation of RLC data PDUs
  Reordering of RLC data PDUs
  Duplicate detection
  Protocol error detection
  RLC SDU discard
  RLC re-establishment In the aforementioned contents, the In-sequence delivery of the NR RLC apparatus may mean a function of sequentially delivering, to a higher layer, RLC SDUs received from a lower layer. If the original one RLC SDU is spit into several RLC SDUs and received, the In-sequence delivery of the NR RLC apparatus may include a function of reassembling and delivering the RLC SDUs.

The In-sequence delivery of the NR RLC apparatus may include a function of reordering received RLC PDUs based on an RLC sequence number (SN) or a PDCP sequence number (SN), may include a function of reordering sequences of received RLC PDUs and recording lost RLC PDUs, may include a function of transmitting, to the transmission side, a state report for lost RLC PDUs, and may include a function of requesting the retransmission of lost RLC PDUs.

The In-sequence delivery of the NR RLC (2d-10, 2d-35) apparatus may include a function of sequentially delivering, to a higher layer, only RLC SDUs up to a lost RLC SDU when the lost RLC SDU is present. Furthermore, the In-sequence delivery of the NR RLC apparatus may include a function of sequentially delivering, to a higher layer, all RLC SDUs received before a given timer starts if the given timer has expired although a lost RLC SDU is present. Furthermore, the In-sequence delivery of the NR RLC apparatus may include a function of sequentially delivering, to a higher layer, all RLC SDUs received so far if a given timer has expired although a lost RLC SDU is present.

The NR RLC (2d-10, 2d-35) apparatus may sequentially process received RLC PDUs regardless of their sequence numbers (out-of sequence delivery), and may deliver the RLC PDUs to the NR PDCP (2d-05, 2d-40) apparatus. If the NR RLC (2d-10, 2d-35) apparatus receives a segment, the NR RLC apparatus may receive segments stored in a buffer or to be subsequently received, may reconfigure the segments into the entire one RLC PDU, and may then deliver the RLC PDU to the NR PDCP apparatus. The NR RLC layer may not include the concatenation function, and the concatenation function may be performed by the NR MAC layer or may be substituted with a multiplexing function of the NR MAC layer.

In the aforementioned contents, the Out-of-sequence delivery of the NR RLC apparatus may mean a function of directly delivering, to a higher layer, RLC SDUs received from a lower layer regardless of their sequences. The Out-of-sequence delivery of the NR RLC apparatus may include a function of reassembling and delivering several RLC SDUs if the original one RLC SDU has been split into the several RLC SDUs and received. The Out-of-sequence delivery of the NR RLC apparatus may include a function of storing RLC SNs or PDCP SNs of received RLC PDUs, ordering the sequences of the RLC PDUs, and recording lost RLC PDUs.

The NR MAC 2d-15, 2d-30 may be connected to several NR RLC layer apparatuses configured in one UE. Major functions of the NR MAC may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layer 2d-20, 2d-25 may perform an operation of channel-coding and modulating high layer data, generating the data into an OFDM symbol, and transmitting the OFDM symbol through a wireless channel or demodulating an OFDM symbol received through a wireless channel, channel-decoding the OFDM symbol, and delivering the OFDM symbol to a higher layer.

Figure 2E:
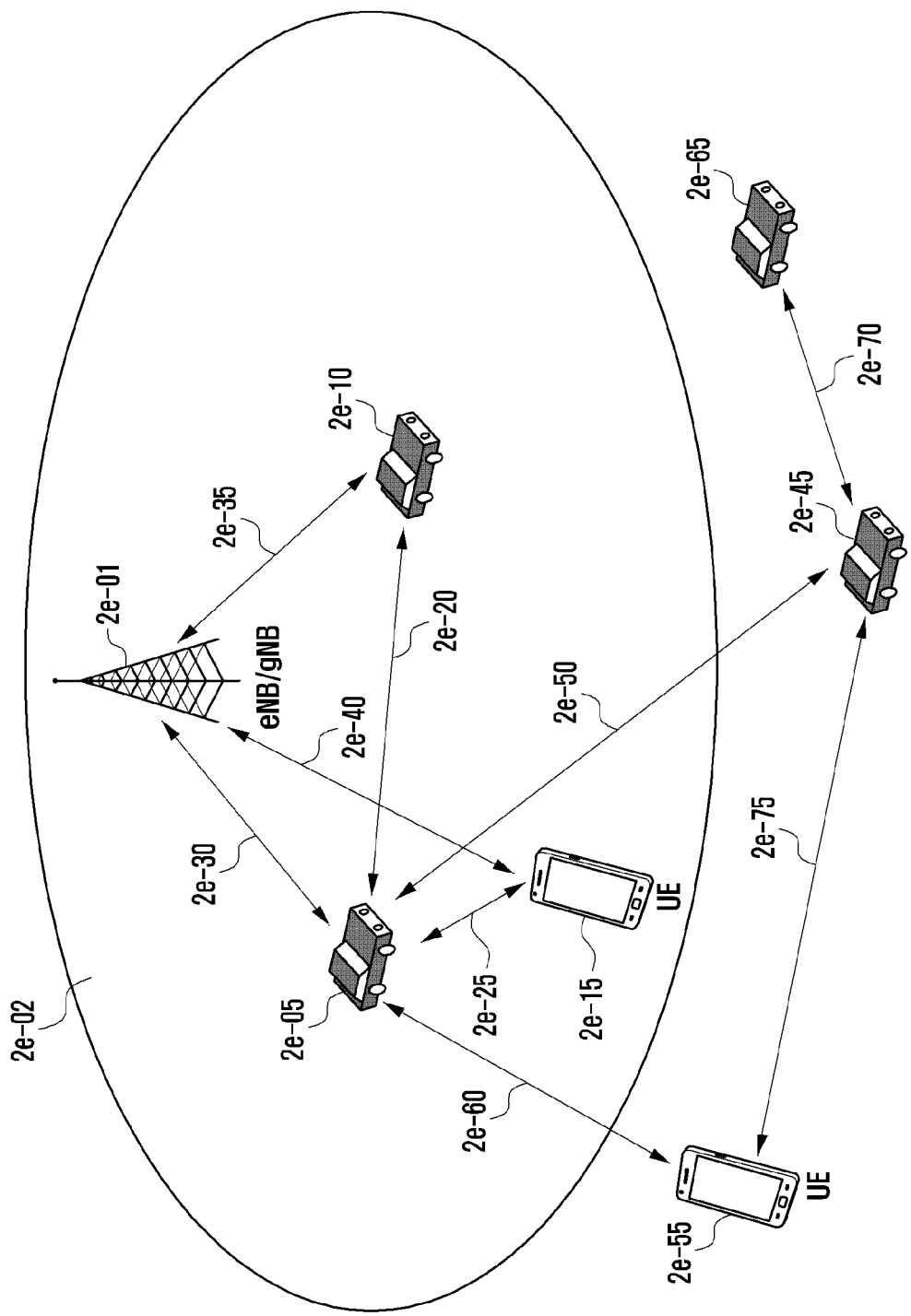
FIG. 2E is a diagram describing V2X communication of a next-generation mobile communication system according to an embodiment of the disclosure.

FIG. 2E is a diagram describing V2X communication of a next-generation mobile communication system according to an embodiment of the disclosure.

Vehicle-to-everything (V2X) according to an embodiment of the disclosure generally refers to a technology for communication with a vehicle through all interfaces, and includes vehicle-to-vehicle (V2V), vehicle-to-infrastructure (V2I), vehicle-to-pedestrian (V2P), vehicle-to-network (V2N), etc. depending on a form thereof and components constituting communication.

Referring to FIG. 2E, a base station 2e-01 may serve at least one vehicle terminal 2e-05 and 2e-10 and a pedestrian mobile terminal 2e-15 which are located within a cell 2e-02 that supports V2X. In this case, V2X may be supported through a Uu interface and/or a PC5 interface. If V2X is supported through the Uu interface, for example, the vehicle terminals 2e-05 and 2e-10 may perform V2X cellular communication by using uplink (UL)/downlink (DL) 2e-30 and 2e-35 between the base station 2e-01 and the vehicle terminals or the pedestrian mobile terminal 2e-15 may perform V2X cellular communication by using UL/DL 2e-40 between the pedestrian terminal and the base station. If V2X is supported through the PC5 interface, V2X sidelink (SL) communication may be performed using sidelinks (SLs) 2e-20 and 2e-25 between the vehicle terminals. For example, the vehicle terminal 2e-05 in coverage of the base station 2e-01 (in coverage of an E-UTRA/NR) may transmit and receive V2X packets to and from other vehicle terminals 2e-10 and 2e-45 and/or the pedestrian mobile terminals 2e-15 and 2e-55 through sidelinks (SLs) 2e-20, 2e-50, 2e-25, and 2e-60, that is, transport channels. The V2X packets may be transmitted and received in a broadcast transmission type and/or unicast and/or groupcast transmission type.

A UE supporting V2X sidelink communication may transmit and receive V2X packets in a resource allocation mode (scheduled resource allocation or UE autonomous resource selection). The scheduled resource allocation (mode 1 and/or mode 3) is a mode in which a base station allocates, to an RRC connected mode UE, resources used for sidelink transmission by using a dedicated scheduling scheme. The mode may be efficient in interference management and/or the management (dynamic allocation, semi-persistence transmission) of a resource pool because the base station can manage sidelink resources. If the RRC connected mode UE has data to be transmitted to another UE(s), the RRC connected mode UE may notify the base station that it has data to be transmitted to another UE(s) by using an RRC message or a MAC control element (hereinafter CE). For example, SidelinkUEInformation, UEAssistanceInformation message, etc. may be used as the RRC message. A buffer state report MAC CE of a new format (including an indicator that provides notification of a buffer state report for at least V2X communication and information on the size of data buffered for sidelink communication), etc. may be used as the MAC CE.

UE autonomous resource selection (mode 2 and/or mode 4) is a mode in which a base station provides sidelink resource information/pool to a UE supporting V2X sidelink communication by using system information and/or an RRC message and the UE selects resources according to a predetermined rule. For example, a base station may provide a UE with sidelink resource information by signaling SIB21, SIB26, SIM which will be newly defined for an NR V2X UE, etc. For example, through the RRC message, a base station may provide sidelink resource information to a UE by signaling an RRC connection reconfiguration message (RRCReconfiguration message) and/or a connection resume message (RRCResume message). Furthermore, in the UE autonomous resource selection, a UE may help another UE(s) to select resources used for a sidelink or may directly or indirectly allocate, to another UE(s), resources used for sidelink transmission through scheduling, through a PC5-RRC message and/or a MAC CE. That is, the UE autonomous resource selection mode may denote one of or a plurality of the followings.

UE autonomously selects sidelink resource for transmission
UE assists sidelink resource selection for other UEs
UE is configured with NR configured grant for sidelink transmission
UE schedules sidelink transmission of other UEs A resource selection method of a UE may include zone mapping, sensing-based resource selection, random selection, configured grant-based resource selection, etc.

A UE supporting V2X sidelink communication may transmit and receive V2X packets based on a resource pool (preconfiguration resources) which is included in SL-V2X-Preconfiguration, that is, an information element (hereinafter referred to as an IE), and is preconfigured. For example, if a UE does not perform V2X sidelink communication based on scheduled resource allocation and/or the UE autonomous resource selection mode for a given reason although the UE is in coverage of a base station, the UE may perform V2X sidelink communication through a sidelink transmission and reception resource pool preconfigured in SL-V2X-Preconfiguration, that is, an IE. Furthermore, a vehicle terminal 2e-45 out of coverage of an E-UTRA/NR may perform V2X sidelink communication with another vehicle terminal 2e-65 or the pedestrian mobile terminal 2e-55 based on the aforementioned sidelink preconfiguration resource through sidelinks (SLs) 2e-70 and 2e-75, that is, transport channels.

LTE V2X SL communication has been designed for a basic safety service as a major target. That is, a UE supporting LTE V2X SL communication has been designed to provide the basic safety service to all of surrounding UEs that support LTE V2X SL communication through a broadcast transmission type. Accordingly, the UE does not need to perform a process of separately establishing a session with another specific UE or perform an SL connection establishment procedure.

However, within next-generation mobile communication (NR), V2X SL communication may be designed to provide various and improved services (e.g., autonomous driving service, platooning service, remote driving service, infotainment within a vehicle) in addition to the basic safety service. Accordingly, NR V2X SL communication may be designed to support a unicast and/or groupcast transmission type in addition to the broadcast transmission type.

Figure 2F:
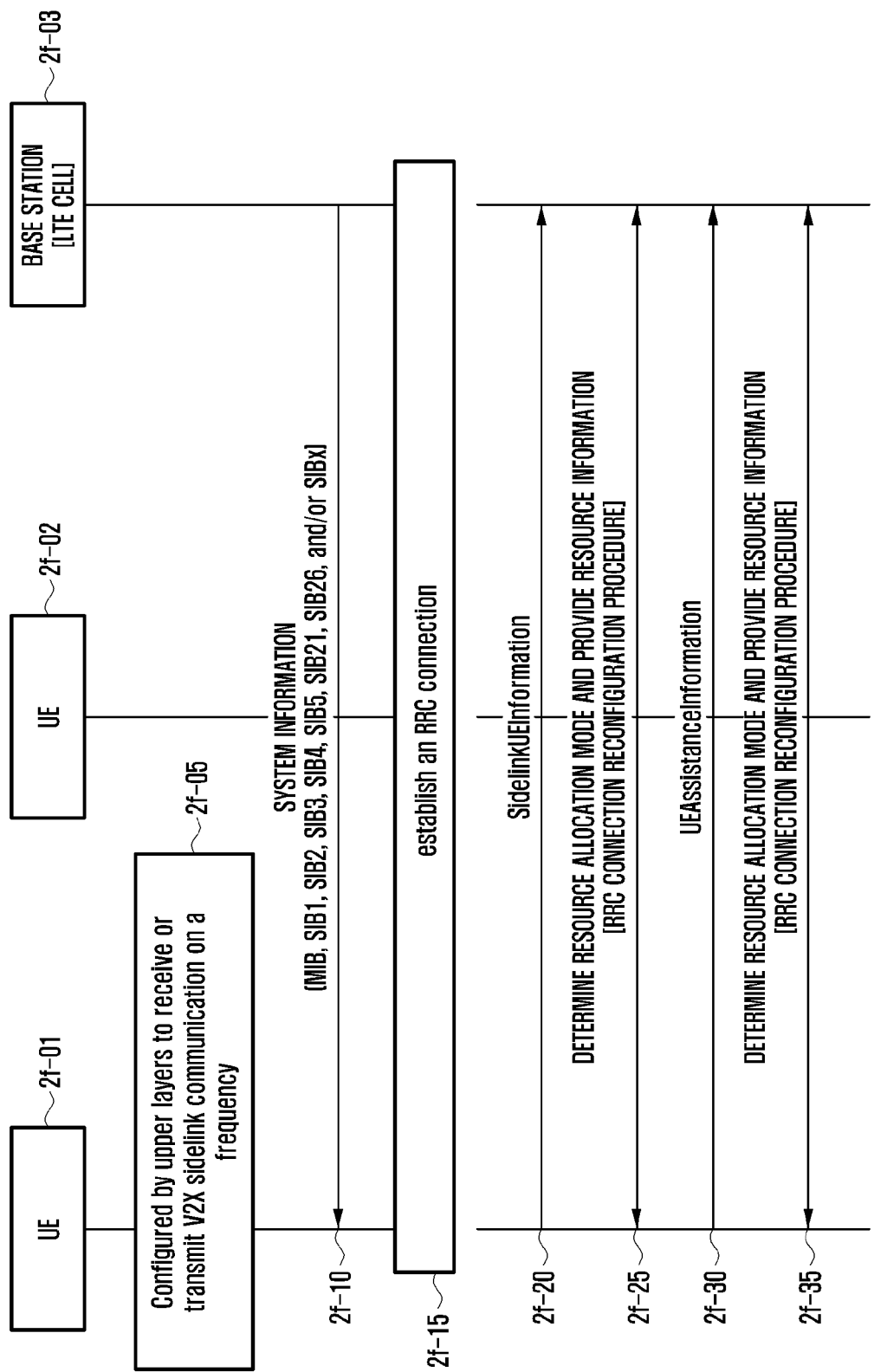
FIG. 2F is a diagram describing a method of transmitting and receiving system information for supporting V2X communication in an LTE system according to an embodiment of the disclosure.

FIG. 2F is a diagram describing a method of transmitting and receiving system information for supporting V2X communication in an LTE system according to an embodiment of the disclosure.

A UE according to an embodiment of the disclosure may be referred to as a vehicle terminal or a pedestrian terminal. The UE may support LTE V2X sidelink communication or may support NR V2X sidelink communication. An LTE base station according to an embodiment of the disclosure may periodically broadcast or signal system information related to LTE V2X sidelink configuration information or system information related to NR V2X sidelink configuration information.

Referring to FIG. 2F, a UE 2*f*-01 capable of V2X sidelink communication may be configured to receive or transmit V2X sidelink communication in a specific frequency from a higher layer (2*f*-05). The higher layer may configure the UE 2*f*-01 to receive or transmit NR V2X sidelink communication in a specific frequency or may configure the UE 2*f*-01 to receive or transmit LTE V2X sidelink communication in a specific frequency. Alternatively, the higher layer may configure the UE 2*f*-01 to receive or transmit LTE V2X sidelink communication in addition to NR V2X sidelink communication in a specific frequency. Accordingly, the UE 2*f*-01 capable of V2X sidelink communication may determine whether to perform LTE NR V2X sidelink communication or whether to perform NR V2X sidelink communication through step 2*f*-05.

In step 2*f*-05, when the UE 2*f*-01 is in the RRC idle mode (RRC_IDLE) or the RRC inactive mode (RRC_INACTIVE) because the UE has not established an RRC connection with a base station 2*f*-03, the UE 2*f*-01 may obtain system information (e.g., MD31, SIB1, SIB2, SIB3, SIB4, SIB5, SIB21, SIB26, or SIBx) by finding and camping on a suitable cell within the specific frequency indicated by a higher layer through a cell selection procedure or a cell reselection procedure (2*f*-10). In this case, the camped-on cell may be referred to as a serving cell.

In step 2*f*-05, when the UE 2*f*-01 is in the RRC connected mode (RRC_CONNECTED) because the UE has established an RRC connection with the base station 2*f*-03 in a cell present in the specific frequency indicated by a higher layer, the UE may obtain system information (e.g., MIB1, SIB1, SIB2, SIB3, SIB4, SIB5, SIB21, SIB26, or SIBx) from a primary cell (hereinafter PCell) (2*f*-10).

In step 2*f*-05, in case that the UE has been configured to receive or transmit LTE sidelink communication, in step 2*f*-10, if a scheduling information list (ShedulingInfoList) is included in SIB1 (SystemInformationBlockType1) received from the cell (serving cell/PCell), SIB21 is indicated to be present in ScheulingInfoList, and SIB21 in a valid state has not been stored, the UE 2*f*-01 may obtain SIB21. Alternatively, if ScheulingInfoList is included in received SIB1, SIB26 is indicated to be present in ScheulingInfoList, and SIB26 in a valid state has not been stored, the UE 2*f*-01 may obtain SIB26.

In step 2*f*-05, when the UE has been configured to receive or transmit NR sidelink communication, in step 2*f*-10, if a scheduling information list (ShedulingInfoList) is included in SIB1 (SystemInformationBlockType1) received from the cell (serving cell/PCell), SIBx (e.g., new system information defined/introduced for NR V2X sidelink communication) is indicated to be present in ScheulingInfoList, and SIBx in a valid state has not been stored, the UE 2*f*-01 may obtain SIBx.

In step 2*f*-05, when the UE 2*f*-01 is in the RRC idle mode (RRC_IDLE) or the RRC inactive mode (RRC_INACTIVE) because the UE has not established an RRC connection with the base station 2*f*-03, the UE 2*f*-01 may obtain system information by finding and camping on a suitable cell within a specific frequency different from the aforementioned specific frequency, in which V2X sidelink communication has been indicated to be received by a higher layer, through a cell selection procedure or a cell reselection procedure (2*f*-10). In this case, the camped-on cell may be referred to as a serving cell.

In step 2*f*-05, when the UE 2*f*-01 is in the RRC connected mode (RRC_CONNECTED) because the UE has established an RRC connection with the base station 2*f*-03 in a cell within a specific frequency different from the aforementioned specific frequency, in which V2X sidelink communication has been indicated to be received by a higher layer, the UE may obtain system information from a primary cell (hereinafter PCell) (2*f*-10).

In step 2*f*-05, in case that the UE has been configured to receive LTE V2X sidelink communication, in step 2*f*-10, if a reception resource pool corresponding to the specific frequency in which LTE V2X sidelink communication has been indicated to be received by a higher layer is not included in SIB21 or SIB26 broadcasted by a cell (serving cell/PCell), and another cell corresponding to the specific frequency satisfies S-criteria (a condition in which the UE needs to be satisfied for cell selection), if a scheduling information list (ShedulingInfoList) is included in SIB1 (SystemInformationBlockType1) broadcasted by the another cell corresponding to the specific frequency, SIB21 is indicated to be present in ScheulingInfoList, and SIB21 in a valid state has not been stored, the UE 2*f*-01 may obtain SIB21 from the another cell corresponding to the specific frequency. In the above condition, if ScheulingInfoList is included in received SIB1, SIB26 is indicated to be present in ScheulingInfoList, and SIB26 in a valid state has not been stored, the UE 2*f*-01 may obtain SIB26 from the another cell corresponding to the specific frequency.

In step 2*f*-05, in case that the UE has been configured to receive NR V2X sidelink communication, in step 2*f*-10, when a reception resource pool corresponding to the specific frequency in which NR V2X sidelink communication has been indicated to be received by a higher layer is not included in SIB21 or SIB26 broadcasted by a cell (serving cell/PCell), and another cell corresponding to the specific frequency satisfies S-criteria (a condition in which the UE needs to be satisfied for cell selection), if a scheduling information list (ShedulingInfoList) is included in SIB1 (SystemInformationBlockType1) broadcasted by the another cell corresponding to the specific frequency, SIBx (e.g., new system information defined/introduced for NR V2X sidelink communication) is indicated to be present in ScheulingInfoList, and SIBx in a valid state has not been stored, the UE 2f-01 may obtain SIBx from the another cell corresponding to the specific frequency.

In step 2f-05, when the UE 2f-01 is in the RRC idle mode (RRC_IDLE) or the RRC inactive mode (RRC_INACTIVE) because the UE has not established an RRC connection with the base station 2f-03, the UE 2f-01 may obtain system information by finding and camping on a suitable cell within a specific frequency different from the aforementioned specific frequency in which V2X sidelink communication has been indicated to be transmitted by a higher layer through a cell selection procedure or a cell reselection procedure (2f-10). In this case, the camped-on cell may be referred to as a serving cell.

In step 2f-05, when the UE 2f-01 is in the RRC connected mode (RRC_CONNECTED) because the UE has established an RRC connection with the base station 2f-03 in a cell within a specific frequency different from the aforementioned specific frequency in which V2X sidelink communication has been indicated to be transmitted by a higher layer, the UE may obtain system information from a primary cell (hereinafter PCell) (2f-10).

In step 2f-05, in case that the UE 2f-01 has been configured to transmit LTE sidelink communication, in step 2f-10, when information corresponding to the specific frequency in which LTE V2X sidelink communication has been indicated to be transmitted by a higher layer in SIB21 or SIB26 broadcasted by the cell (serving cell/PCell) is not included in v2x-InterFreqInfoList, another cell corresponding to the specific frequency satisfies S-criteria (a condition in which the UE needs to be satisfied for cell selection), a scheduling information list (ShedulingInfoList) is included in SIB1 (SystemInformationBlockType1) broadcasted by the another cell corresponding to the specific frequency, SIB21 is indicated to be present in SchedulingInfoList, and SIB21 in a valid state has not been stored, the UE 2f-01 may obtain SIB21. In the above condition, if ScheduligInfoList is included in received SIB1, SIB26 is indicated to be present in SchedulingInfoList, and SIB26 in a valid state has not been stored, the UE 2f-01 may obtain SIB26.

In step 2f-05, in case that the UE 2f-01 has been configured to transmit NR sidelink communication, in step 2f-10, when information corresponding to the specific frequency in which NR V2X sidelink communication has been indicated to be transmitted by a higher layer in SIBx broadcasted by the cell (serving cell/PCell) is not included in v2x-InterFreqInfoList and another cell corresponding to the specific frequency satisfies S-criteria (a condition in which the UE needs to be satisfied for cell selection), if a scheduling information list (ShedulingInfoList) is included in SIB1 (SystemInformationBlockType1) broadcasted by the another cell corresponding to the specific frequency, SIBx is indicated to be present in SchedulingInfoList, and SIBx in a valid state has not been stored, the UE 2f-01 may obtain SIBx.

There is proposed that the following information is included in SIB1 when the base station 2f-03 broadcasts SIB1 in step 2f-10.

Information on when SIBx is broadcasted or information on whether SIBx is broadcasted in SchedulingInfoList The corresponding information may refer to information on what system information has been mapped with which cycle. For example, SchedulingInfoList may include information on when SIBx is broadcasted in the following form. Accordingly, a UE may check when SIBx related to NR V2X sidelink communication will be received through the corresponding information.

The corresponding information may indicate whether SIBx is broadcasted in a cell. If SIBx is not included in SIB-Type, a UE attempting to perform NR V2X sidelink communication may camp on a cell that broadcasts SIBx through a cell selection procedure or a cell reselection procedure or may perform NR V2X sidelink communication based on preconfigured parameters. That is, although there is no indicator indicating whether the cell broadcasts SIBx including NR V2X sidelink configuration information through system information, whether SIBx including NR V2X sidelink configuration information is broadcasted can be checked and determined through SIB-Type.

```
SchedulingInfoList ::= SEQUENCE (SIZE (1. . maxSI-Message) ) OF SchedulingInfo
SchedulingInfo : := SEQUENCE {
    si-Periodicity        ENUMERATED (rf8, rf16, rf32, rf64, rf128, rf256, rf512},
    sib-MappingInfo       SIB-MappingInfo
}
SIB-MappingInfo : :=    SEQUENCE (SIZE (0. . maxSIB-1) ) OF SIB-Type
SIB-Type ::=            ENUMERATED {
                        sibType3, sibType4, sibType5, sibType6,
                        sibType7, sibType8, sibType9, sibType10,
                        sibType11, sibType12-v920,
sibType13-v920,
                        sibType14-v1130, sibType15-v1130,
                        sibType16-v1130, sibType17-v1250,
sibType18-v1250,
                        . . . , sibType19-v1250, sibType20-v1310,
sibType21-v1430,
                        sibType24-v1530, sibType25-v1530,
sibType26-v1530, sibTypex}
```

There is proposed that SIBx selectively includes sl-V2X-ConfigCommon when the base station 2f-03 broadcasts SIBx in step 2f-10. sl-V2X-ConfigCommon may include at least one of v2x-CommRxPool, v2x-CommTxPoolNormalCommon, v2x-CommTxPoolExceptional, v2x-SyncConfig, v2x-InterFreqInfoList, v2x-ResourceSelectionConfig, zoneConfig, typeTxSync, threshSS-TxPrioritization, anchorCarrierFreqList, offsetDFN, cbr-CommonTxConfigList, cbr-psssch-TxConfigList, v2x-packetDuplicationConfig, syncFreqList, slss-TxMultiFreq, v2x-FreqSelectionConfigList, and threshS-RSSI-CBR. Additionally, SIBx may include configuration information related to HARQ or sidelink radio bearer (SLRB) configuration information and a mapped QoS flow.

TypeTxSync may include information on a gNB. For example, when TypeTxSync included in SIB21 or SIB26 received by a UE is not signaled/indicated and TypeTxSync is signaled/indicated in SIBx, the UE may apply a synchronization reference source of a gNB or a NR cell.

v2x-CommRxPool, v2x-CommTxPoolNormalCommon, v2x-CommTxPoolExceptional, and v2x-InterFreqInfoList may include a resource pool list for NR sidelink communication. An individual resource pool included in the resource pool list may include syncAllowed. Furthermore, syncAllowed may include gNB-Sync. If gNB-Sync is included in syncAllowed, a UE may use preconfigured resources or configured resources when the UE is directly or indirectly synchronized with a gNB.

v2x-InterFreqInfoList may include the same v2x-CommCarrierFreq as v2x-InterFreqInfoList included in SIB21 or SIB26 or may include another v2x-CommCarrierFreq. However, a resource allocation configuration or a synchronization configuration included in v2x-InterFreqInfoList may include information related to an NR sidelink configuration.

An ASN.1 structure for the aforementioned SIBx is as follows.

SystemInformationBlockTypex

The IE SystemInformationBlockTypex contains NR V2X sidelink communication configuration.

An SystemInformationBlockTypex Information Element

```
-- ASN1START
SystemInformationBlockTypex    ::= SEQUENCE {
    sl-V2X-ConfigCommon            SL-V2X-ConfigCommon             OPTIONAL,
    lateNonCriticalExtension       OCTET STRING                    OPTIONAL,
    ...
}
SL-V2X-ConfigCommon ::=        SEQUENCE {
    v2x-CommRxPool                 SL-CommRxPoolListV2X            OPTIONAL,
    v2x-CommTx PoolNormalCommon        SL-CommTxPoolListV2X            OPTIONAL,
    p2x-CommTx PoolNormalCommon        SL-CommTxPoolListV2X            OPTIONAL,
    v2x-CommTxPoolExceptional          SL-CommResource PoolV2X         OPTIONAL,
    v2x-SyncConfig                 SL-SyncConfigListV2X            OPTIONAL,
    v2x-InterFreqInfoList              SL-InterFreqInfoListV2X         OPTIONAL,
    v2x-ResourceSelectionConfig        SL-CommTxPoolSensingConfig
    OPTIONAL,
    zoneConfig                     SL-ZoneConfig                   OPTIONAL,
    type TxSync                    SL-TypeTxSync                   OPTIONAL,
    thresSL-TxPrioritization           SL-Priority                     OPTIONAL,
    anchorCarrierFreqList              SL-AnchorCarrierFreqList-V2X    OPTIONAL,
    offsetDFN          INTEGER (0 .. 1000)                         OPTIONAL,
    cbr-CommonTxConfigList             SL-CBR-CommonTxConfigList           OPTIONAL
    cbr-pssch-TxConfigList             SL-CBR-PPPP-TxConfigList        OPTIONAL,
    v2x-Packet DuplicationConfig       SL-V2X-PacketDuplicationConfig
    OPTIONAL,    sync FreqList           SL-V2X-SyncFreqList
    OPTIONAL,
    slss-TxMultiFreq               ENUMERATED { true }             OPTIONAL,
    v2x-FreqSelectionConfigList        SL-V2X-FreqSelectionConfigList
    OPTIONAL,
    threshS-RSSI-CBR               INTEGER (0 .. 45)               OPTIONAL,
}
-- ASN1STOP
```

In step 2f-10, if the UE 2f-01 receives SIB21 and sl-V2X-ConfigCommon is included in SIB21, the UE may perform a series of the following processes.

1> If the UE has been configured to receive LTE V2X sidelink communication in step 2f-05, 2> the UE may use a resource pool indicated in v2x-CommRxPool included in sl-V2X-ConfigCommon in order to monitor V2X sidelink communication.

1> If the UE has been configured to transmit LTE V2X sidelink communication in step 2f-05, 2> the UE may use a resource pool indicated in v2x-CommTxPoolNormalCommon, p2x-CommTxPoolNormalCommon, v2x-CommTxPoolNormal, p2x-CommTxPoolNormal or v2x-CommTxPoolExceptional in order to transmit V2X sidelink communication.

2> The UE may perform channel busy ratio (CBR) measurement in a transmission resource pool indicated in v2x-CommTxPoolNormalCommon, v2x-CommTxPool-Normal and v2x-CommTxPoolExceptional.

When the UE receives SIB26 in step 2f-10, the UE may perform a series of the following processes.

1> If the UE has been configured to receive LTE V2X sidelink communication in step 2f-05, 2> The UE may use a resource pool indicated in v2x-CommRxPool in order to monitor LTE V2X sidelink communication.

1> If the UE has been configured to transmit LTE V2X sidelink communication in step 2f-05, 2> the UE may use a resource pool indicated in v2x-CommTxPoolNormal, p2x-CommTxPoolNormal or v2x-CommTxPoolExceptional in order to transmit LTE V2X sidelink communication.

2> The UE may perform channel busy ratio (CBR) measurement in a transmission resource pool indicated in v2x-CommTxPoolNormal and v2x-CommTxPoolExceptional.

In step 2f-10, if the UE receives SIBx and sl-V2X-ConfigCommon is included in SIBx, the UE may perform a series of the following processes.

1> If the UE has been configured to receive NR V2X sidelink communication in step 2f-05, 2> the UE may use a resource pool indicated in v2x-CommRxPool included in sl-V2X-ConfigCommon in order to monitor NR V2X sidelink communication.

1> If the UE has been configured to transmit NR V2X sidelink communication in step 2f-05, 2> the UE may use a resource pool indicated in v2x-CommTxPoolNormalCommon, p2x-CommTxPoolNormalCommon, v2x-CommTxPoolNormal, p2x-CommTxPoolNormal or v2x-CommTxPoolExceptional in order to transmit NR V2X sidelink communication.

2> The UE may perform channel busy ratio (CBR) measurement in a transmission resource pool indicated in v2x-CommTxPoolNormalCommon, v2x-CommTxPool-Normal, and v2x-CommTxPoolExceptional.

In step 2f-05, if the UE has been configured to transmit V2X sidelink communication related to non-P2X from a higher layer and related data which may be transmitted is present, when at least one of the following conditions is satisfied, in step 2f-15, the UE may establish an RRC connection with the base station 2f-03.

If the UE camps on a frequency configured to transmit LTE V2X sidelink communication related to non-P2X (camped frequency), a cell on which the UE camps broadcasts SIB21, the UE has a valid version of SIB21 including sl-V2X-ConfigCommon, and v2x-Common-TxPoolNormalCommon is not included in the sl-V2X-ConfigCommon If the UE camps on a frequency configured to transmit NR V2X sidelink communication related to non-P2X (camped frequency), a cell on which the UE camps broadcasts SIBx, the UE has a valid version of SIBx including sl-V2X-ConfigCommon, and v2x-Common-TxPoolNormalCommon is not included in the sl-V2X-ConfigCommon If a frequency configured to transmit LTE V2X sidelink communication related to non-P2X is included in v2x-InterFreqInfoList included in SIB21 or SIB26 broadcasted by a cell on which the UE camps, and v2x-CommTxPoolNormal for the frequency is not included in a valid version of SIB21 or SIB26

If a frequency configured to transmit NR V2X sidelink communication related to non-P2X is included in v2x-InterFreqInfoList included in SIBx broadcasted by a cell on which the UE camps, and v2x-CommTxPool-Normal for the frequency is not included in a valid version of SIBx.

In step 2f-05, if the UE has been configured by a higher layer to transmit V2X sidelink communication related to P2X and related data which may be transmitted is present, when at least one of the following conditions is satisfied, in step 2f-15, the UE may establish an RRC connection with the base station 2f-03.

If the UE camps on a frequency configured to transmit LTE V2X sidelink communication related to P2X (camped frequency), a cell on which the UE camps broadcasts SIB21, the UE has a valid version of SIB21 including sl-V2X-ConfigCommon, and p2x-Common-TxPoolNormalCommon is not included in the sl-V2X-ConfigCommon If the UE camps on a frequency configured to transmit NR V2X sidelink communication related to P2X (camped frequency), a cell on which the UE camps broadcasts SIBx, the UE has a valid version of SIBx including sl-V2X-ConfigCommon, and p2x-CommonTxPool-NormalCommon is not included in the sl-V2X-ConfigCommon If a frequency configured to transmit LTE V2X sidelink communication related to P2X is included in v2x-InterFreqInfoList included in SIB21 or SIB26 broadcasted by a cell on which the UE camps, and p2x-CommTxPoolNormal for the frequency is not included in a valid version of SIB21 or SIB26

If a frequency configured to transmit NR V2X sidelink communication related to P2X is included in v2x-InterFreqInfoList included in SIBx broadcasted by a cell on which the UE camps, and p2x-CommTxPool-Normal for the frequency is not included in a valid version of SIBx The UE 2f-01 that is in the RRC connected mode (RRC_CONNECTED) through the RRC connection established with the base station 2f-03 in step 2f-15 may request V2X transmission resources (pool) or V2X reception resources (pool) by transmitting a SidelinkUEInformation message to the base station 2f-03 (2f-20). The SidelinkUEInformation message may include a frequency list (v2x-CommRxInterestedFreqList) in which the UE 2f-01 has an interest in order to receive V2X SL communication, an indicator p2x-CommTxType) indicating whether to perform P2X communication, a frequency list (v2x-CommTxResourceReq) requested to be dedicatedly allocated by the base station 2f-03 in order to transmit V2X SL communication, or information (e.g., A ProSe per-packet priority (PPPP) and/or a ProSe per-packet reliability (PPPR) list related to QoS. An ASN.1 structure for the aforementioned SidelinkUEInformation message is as follows.

SidelinkUEInformation

The SidelinkUEInformation message is used for the indication of sidelink information to the eNB.

Signalling radio bearer: SRB1
RLC-SAP: AM
Logical channel: DCCH
Direction: UE to E-UTRAN

```
SidelinkUEInformation-IEs      ::= SEQUENCE {
    v2x-CommRxInterestedFreqList        SL-V2X-CommFreqList
    OPTIONAL,
    p2x-CommTxType             ENUMERATED { true }                OPTIONAL,
    v2x-CommTxResourceReq               SL-V2X-CommTxFreqList
    OPTIONAL,
    nonCriticalExtension                SidelinkUEInformation-IEs
    OPTIONAL
}
SidelinkUEInformation- IEs     ::= SEQUENCE {
    reliabilityInfoListSL               SL-ReliabilityList
    OPTIONAL,
    nonCriticalExtension                SEQUENCE { }
    OPTIONAL
}
SL-V2X-CommFreqList : :=    SEQUENCE (SIZE (1 . .maxFreqV2X) ) OF INTEGER
(0 . .maxFreqV2X-1)
SL-V2X-CommTxFreqList : :=          SEQUENCE (SIZE (1 . .maxFreqV2X) ) OF
SL-V2X-CommTxResourceReq
SL-V2X-CommTxResourceReq : :=           SEQUENCE {
    carrierFreqCommTx                   INTEGER (0 . . maxFreqV2X-1)
    OPTIONAL,
    v2x-TypeTxSync                SL-TypeTxSync              OPTIONAL,
    v2x-DestinationInfoList             SL-DestinationInfoList
    OPTIONAL
```

Additionally, a Container may be added to the aforementioned SidelinkUEInformation message. The SidelinkUEInformation message including configuration information related to NR sidelink communication may be transmitted. For example, the SidelinkUEInformation message may include an indicator or IE indicating whether the UE 2f-01 will perform V2X SL communication with another UE 2f-02 in a broadcast manner and/or will perform V2X SL communication with another UE 2f-02 in a unicast manner and/or will perform V2X communication with another UE 2f-02 in a groupcast manner. Alternatively, the SidelinkUE-Information message may include information related to QoS (a 5G QoS indicator (5QI) or V2X QoS indicator (VQI) list or a set or range/minimum coverage for NR V2X sidelink communication). The base station 2f-03 may differently allocate a transmission and reception resource pool to the UE 2f-01 based on the SidelinkUEInformation message.

In step 2f-25, the base station 2f-03 may perform an RRC connection reconfiguration procedure along with the UE 2f-01 as a response thereto. Specifically, the base station 2f-03 may transmit an RRC connection reconfiguration message (RRCConnectionReconfiguration) to the UE 2f-01. The UE 2f-01 may perform an RRC connection reconfiguration procedure by transmitting an RRC connection reconfiguration complete message (RRCConnectionReconfigurationComplete) to the base station 2f-03. Through the RRC connection reconfiguration procedure, the UE 2f-01 may perform V2X sidelink communication with another UE 2f-02 in a scheduled resource allocation (mode 1 and/or mode 3) mode or a UE autonomous resource selection (mode 2 and/or mode 4) mode.

In step 2f-20, when configuration information related to NR sidelink communication is included in SidelinkUEInformation to which a container is added by the UE 2f-01, in step 2f-25, the base station 2f-03 may add the container to an RRC connection reconfiguration message, and may transmit, to the UE 2f-01, the RRC connection reconfiguration message including the configuration information related to NR sidelink communication. For example, the base station 2f-03 may include a sidelink grant configuration information list (SL-ConfiguredGrantConfigList) in the RRC connection reconfiguration message or may configure the RRC connection reconfiguration message so that the UE 2f-01 can periodically perform sidelink communication, without dynamically providing a sidelink grant to the UE 2f-01 through the RRC message. Scheduling information (SL-ConfiguredGrantConfigList) of resources for use in an NR-based sidelink scheduled to the UE 2f-01 connected to the LTE base station 2f-03 may be delivered from an NR base station to an LTE base station through an Xn interface or through signaling transmitted through an Xn interface. For example, the signaling may include a radio configuration CG-Config including resource information for use in an NR-based sidelink exchanged between an NR base station and an LTE base station. SL-ConfiguredConfigList may be included or configured for each SL-BWP for performing NR V2X sidelink communication. For example, one or a plurality of sidelink grants may be configured in the SL-ConfigGrantConfigList included in each SL-BWP. In order to identify the configuration, an indicator (SL-ConfigGrantConfigIndex) may be included. Alternatively, for example, each sidelink grant configuration may include the number of configurable HARQ processes, periodicity, time or frequency resource information (frequencyDomainAllocation or timeDomainAllocation), etc. An ASN.1 structure of the SL-ConfiguredGrantConfig is as follows.

SL-onfiguredGrantConfigList

The IE SL-onfiguredGrantConfigList is used to configure V2X sidelink transmission without dynamic grant according to two possible schemes. The actual uplink grant may either be configured via RRC (type1) or provided via the PDCCH (addressed to CS-RNTI) (type2).

```
-- ASN1START
-- TAG-CONFIGUREDGRANTCONFIG-START
SL-ConfiguredGrantConfigList : :=     SEQUENCE {
    sl-ConfigIndex-r14          SL-Configured-ConfigIndex
    sl-ConfiguredGrantConfig    SL-ConfiguredGrantConfig
}|
SL-ConfiguredGrantConfig : :=                   SEQUENCE {
    frequencyHopping                            ENUMERATED { intraSlot,
interSlot}                                      OPTIONAL, --
Need S;
    cg-DMRS-Configuration                       DMRS-UplinkConfig,
    mcs-Table                                   ENUMERATED { qam256,
qam64LowSE }                                                OPTIONAL, --
Need S
    mcs-TableTransformPrecoder                  ENUMERATED { qam256,
qam64LowSE }                                                OPTIONAL, --
Need S
    uci -OnPUSCH                                SetupRelease
{ CG-UCI-OnPUSCH }                                                      OPTIONAL,
-- Need M
    resourceAllocation                          ENUMERATED
{ resourceAllocationType0, resourceAllocationType1, dynamicSwitch },
    rbg-Size                                    ENUMERATED { config2 }
OPTIONAL, -- Need S
    powerControlLoopToUse                       ENUMERATED { n0, n1 },
    p0-PUSCH-Alpha                              P0-PUSCH-AlphaSetId,
    transformPrecoder                           ENUMERATED { enabled,
disabled}                                                   OPTIONAL, --
Need S
    nrofHARQ-Processes                          INTEGER (1 . . 16),
    repK                                        ENUMERATED { n1, n2, n4, n8 },
    repK-RV                                     ENUMERATED { s1-0231,
s2-0303, s3-0000}                                           OPTIONAL, --
Need R
    periodicity                                 ENUMERATED {
                                                sym2, sym7, sym1x14,
sym2x14, sym4x14, sym5x14, sym8x14, sym10x14, sym16x14, sym20x14,
                                                sym32x14, sym40x14,,
sym64x14, sym80x14, sym128x14, sym160x14, sym256x14, sym320x14,
```

-continued

```
sym512x14,
                                  sym640x14,
sym1024x14, sym1280x14, sym2560x14, sym5120x14,
                                  sym6, sym1x12,
sym2x12, sym4x12, sym5x12, sym8x12, sym10x12, sym16x12, sym20x12,
sym32x12,
                                  sym40x12, sym64x12,
sym80x12, sym128x12, sym160x12, sym256x12, sym320x12, sym512x12,
sym640x12,
                                  sym1280x12,
sym2560x12
        },
        configuredGrantTimer              INTEGER (1..64)
OPTIONAL, -- Need R
        rrc-ConfiguredUplinkGrant         SEQUENCE {
            time DomainOffset             INTEGER (0..5119) ,
            timeDomainAllocation          INTEGER (0..15) ,
            frequencyDomainAllocation     BIT STRING
(SIZE(18)),
            antenna Port                  INTEGER (0..31),
            dmrs-SeqInitialization        INTEGER (0..1)
OPTIONAL, -- Need R
            precodingAndNumberOfLayers    INTEGER (0..63),
            srs-ResourceIndicator         INTEGER (0..15)
OPTIONAL, -- Need R
            mcsAndTBS                     INTEGER (0..31),
            frequencyHoppingOffset        INTEGER (1..
maxNrofPhysicalResourceBlocks-1)          OPTIONAL, --
Need R
            pathlossReferenceIndex        INTEGER
(0..maxNrofPUSCH-PathlossReferenceRSs-1),
            ...
        }
OPTIONAL, -- Need R
        ...
}
CG-UCI-OnPUSCH ::= CHOICE {
        dynamic                           SEQUENCE (SIZE (1..4) )
OF BetaOffsets,
        semiStatic                        BetaOffsets
}
```

In step 2f-30, when a traffic pattern for NR V2X sidelink communication is changed, the UE 2f-01 may add a container and transmit, to the base station 2f-03, an UEAssistanceInformation message including the container and configuration information related to NR sidelink communication (2f-30). The message may include a traffic pattern information list suitable for NR V2X sidelink communication. For example, the traffic pattern information list may include one or a plurality of pieces of traffic pattern information. Each of the pieces of traffic pattern information may include traffic periodicity (trafficPeriodicity) or expected timing (timingOffset) at which a packet will arrive at sidelink logical channel, destination information (trafficDestination) related to V2X sidelink communication, etc. Alternatively, the message may include at least one of parameters included in the aforementioned SL-ConfigGrantConfigList.

In step 2f-35, the base station 2f-03 may perform the aforementioned RRC connection reconfiguration procedure along with the UE 2f-01.

Figure 2G:
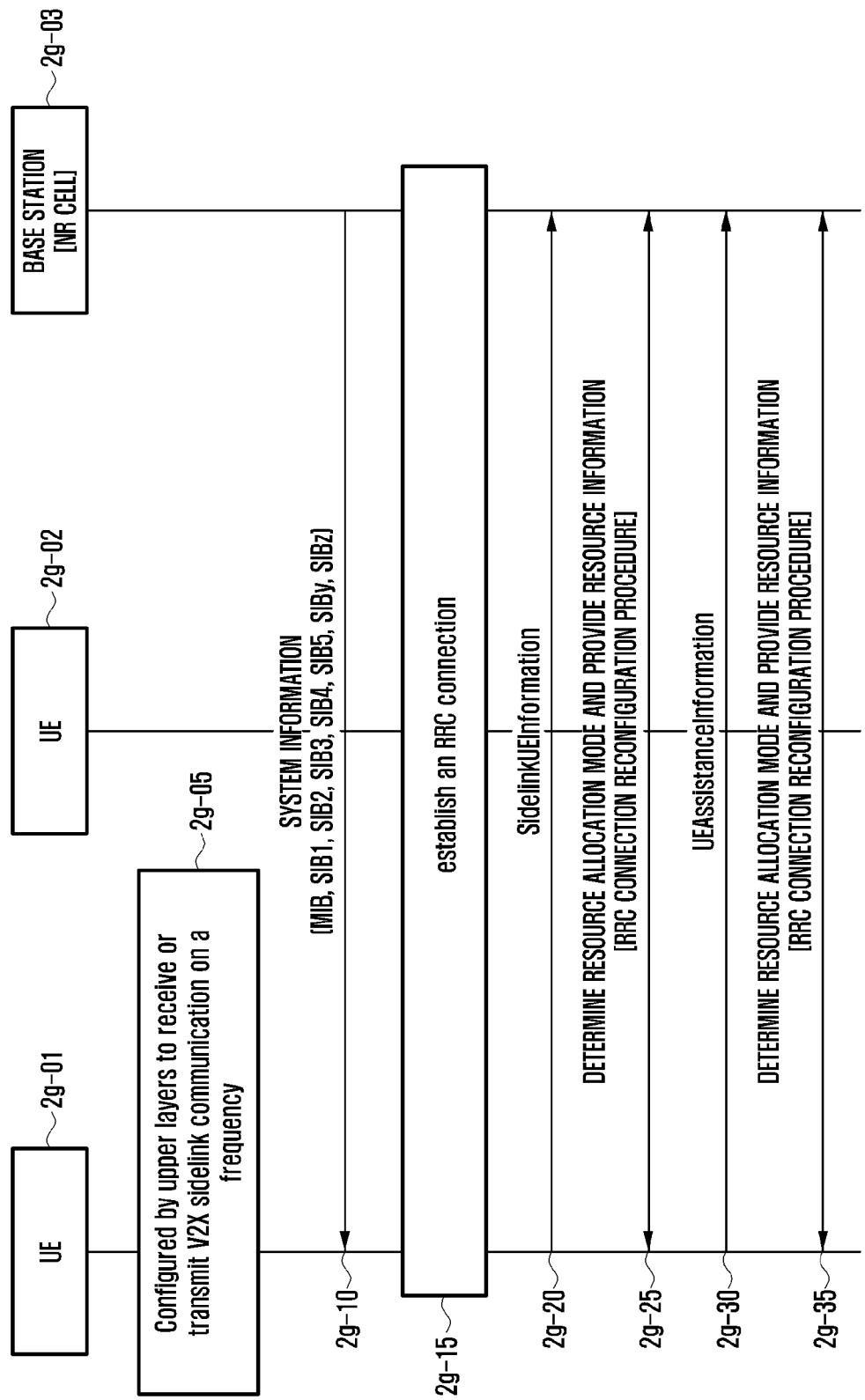
FIG. 2G is a diagram describing a method of transmitting and receiving system information for supporting V2X communication in a next-generation mobile communication system according to an embodiment of the disclosure.

FIG. 2G is a diagram describing a method of transmitting and receiving system information for supporting V2X communication in a next-generation mobile communication system according to an embodiment of the disclosure.

A UE according to an embodiment of the disclosure may be referred to as a vehicle terminal or a pedestrian terminal. The UE may support LTE V2X sidelink communication or NR V2X sidelink communication. An NR base station according to an embodiment of the disclosure may periodically broadcast or signal system information related to LTE V2X sidelink configuration information or system information related to NR V2X sidelink configuration information. The reason why the system information is not broadcasted or signaled in an on-demand form is that V2X sidelink communication may be sensitive to latency.

Referring to FIG. 2G, a UE 2g-01 capable of V2X sidelink communication may be configured, by a higher layer, to receive or transmit V2X sidelink communication in a specific frequency (2g-05). The higher layer may configure the UE to receive or transmit NR V2X sidelink communication or may configure the UE to receive or transmit LTE V2X sidelink communication in a specific frequency. Alternatively, the higher layer may configure the UE 2g-01 to receive or transmit LTE V2X sidelink communication in addition to NR V2X sidelink communication in a specific frequency. Accordingly, the UE 2g-01 capable of V2X sidelink communication may determine whether to perform LTE NR V2X sidelink communication or whether to perform NR V2X sidelink communication through step 2g-05.

In step 2g-05, when the UE 2g-01 is in the RRC idle mode (RRC_IDLE) or the RRC inactive mode (RRC_INACIVE) because the UE has not established an RRC connection with a base station 2g-03, the UE 2g-01 may obtain system information (e.g., MIB1, SIB1, SIB2, SIB3, SIB4, SIB4, SIB6, SIBy or SIBz) by finding and camping on a suitable cell in specific frequency indicated by a higher layer through a cell selection procedure or a cell reselection procedure (2g-10). In this case, the camped-on cell may be referred to as a serving cell.

In step 2g-05, when the UE 2g-01 is in the RRC connected mode (RRC_CONNECTED) because the UE has established an RRC connection with the base station 2g-03 in a cell within the specific frequency indicated by a higher layer, the UE may obtain system information (e.g., MIB1, SIB1, SIB2, SIB3, SIB4, SIB5, SIB6, SIBy or SIBx) from a primary cell (hereinafter PCell) (2g-10).

In step 2g-10, the cell (serving cell/PCell) may periodically broadcast SIBy (system information including configuration information for NR sidelink communication) or SIBz (system information including configuration information for LTE sidelink communication). For example, in step 2g-10, if scheduling information (si-SchedulingInfo) related to system information is included in SIB1 (SystemInformationBlockType1) received from the cell (serving cell/PCell), SIBy and SIBz have been indicated to be broadcasted in si-BroadcastStatus, and SIBy or SIBz is indicated to be present in schedulingInfoList included in si-SchedulingInfo, this means that the cell according to the present embodiment periodically broadcasts SIBy or SIBz.

In step 2g-05, in case that the UE 2g-01 has been configured to receive or transmit NR V2X sidelink communication, if scheduling information (si-SchedulingInfo) related to system information is included in SIB1 (SystemInformationBlockType1) received from the cell (serving cell/PCell), SIBy is indicated to be broadcasted in si-BroadcastStatus, SIBy is indicated to be present in schedulingInfoList included in si-SchedulingInfo, and SIBy in a valid state has not been stored, the UE 2g-01 may obtain SIBy.

In step 2g-05, in case that the UE 2g-01 has been configured to receive or transmit LTE V2X sidelink communication, if scheduling information (si-SchedulingInfo) related to system information is included in SIB1 (SystemInformationBlockType1) received from the cell (serving cell/PCell), SIBz is indicated to be broadcasted in si-BroadcastStatus, SIBz is indicated to be present in schedulingInfoList included in si-SchedulingInfo, and SIBz in a valid state has not been stored, the UE 2g-01 may obtain SIBz.

In step 2g-05, when the UE 2g-01 is in the RRC idle mode (RRC_IDLE) or the RRC inactive mode (RRC_INACTIVE) because the UE has not established an RRC connection with the base station 2g-03, the UE 2g-01 may obtain system information (e.g., MIB1, SIB1, SIB2, SIB3, SIB4, SIB4, SIB6, SIBy or SIBz) by finding and camping on a suitable cell within a specific frequency different from the aforementioned specific frequency in which V2X sidelink communication has been indicated to be received by a higher layer, through a cell selection procedure or a cell reselection procedure (2g-10). In this case, the camped-on cell may be referred to as a serving cell.

In step 2g-05, when the UE 2g-01 is in the RRC connected mode (RRC_CONNECTED) because the UE has established an RRC connection with the base station 2g-03 in a cell within a specific frequency different from the aforementioned specific frequency in which V2X sidelink communication has been indicated to be received by a higher layer, the UE may obtain system information (e.g., MD31, SIB1, SIB2, SIB3, SIB4, SIB4, SIB6, SIBy or SIBz) from a primary cell (hereinafter PCell) (2g-10).

In step 2g-10, the cell (serving cell/PCell) may periodically broadcast SIBy (system information including configuration information for NR sidelink communication) or SIBz (system information including configuration information for LTE sidelink communication). For example, in step 2g-10, if scheduling information (si-SchedulingInfo) related to system information is included in SIB1 (SystemInformationBlockType1) received from the cell (serving cell/PCell), SIBy or SIBz is indicated to be broadcasted in si-BroadcastStatus, and SIBy or SIBz is indicated to be present in schedulingInfoList included in si-SchedulingInfo, this may mean that the cell periodically broadcasts SIBy or SIBz.

In case where the UE has been configured to receive NR V2X sidelink communication in step 2g-05, in step 2g-10, when a reception resource pool corresponding to the specific frequency in which NR V2X sidelink communication has been indicated to be received by a higher layer is not included in SIBy broadcasted by the cell (serving cell/PCell) and another cell corresponding to the specific frequency satisfies S-criteria (a condition in which the UE needs to be satisfied for cell selection), if scheduling information (si-SchedulingInfo) related to system information is included in SIB1 (SystemInformationBlockType1) broadcasted by the another cell corresponding to the specific frequency, SIBy is indicated to be broadcasted in si-BroadcastStatus, SIBy is indicated to be present in schedulingInfoList included in si-SchedulingInfo, and SIBy in a valid state has not been stored, the UE may obtain SIBy from the another cell corresponding to the specific frequency.

In case where the UE has been configured to receive LTE V2X sidelink communication in step 2g-05, in step 2g-10, when a reception resource pool corresponding to the specific frequency in which LTE V2X sidelink communication has been indicated to be received by a higher layer is not included in SIBz broadcasted by the cell (serving cell/PCell) and another cell corresponding to the specific frequency satisfies S-criteria (a condition in which the UE needs to be satisfied for cell selection), if scheduling information (si-SchedulingInfo) related to system information is included in SIB1 (SystemInformationBlockType1) broadcasted by the another cell corresponding to the specific frequency, SIBx is indicated to be broadcasted in si-BroadcastStatus, SIBx is indicated to be present in schedulingInfoList included in si-SchedulingInfo, and SIBx in a valid state has not been stored, the UE may obtain SIBx from the another cell corresponding to the specific frequency.

In step 2g-05, when the UE 2g-01 is in the RRC idle mode (RRC_IDLE) or the RRC inactive mode (RRC_INACIVE) because the UE has not established an RRC connection with the base station 2g-03, the UE 2g-01 may obtain system information (e.g., MIB1, SIB1, SIB2, SIB3, SIB4, SIB4, SIB6, SIBy or SIBz) by finding and camping on a suitable cell within a specific frequency different from the aforementioned specific frequency in which V2X sidelink communication has been indicated to be transmitted by a higher layer through a cell selection procedure or a cell reselection procedure (2g-10). In this case, the camped-on cell may be referred to as a serving cell.

In step 2g-05, when the UE 2g-01 is in the RRC connected mode (RRC_CONNECTED) because the UE has established an RRC connection with the base station 2g-03 in a cell within a specific frequency different from the aforementioned specific frequency in which V2X sidelink communication has been indicated to be transmitted by a higher layer, the UE may obtain system information (e.g., MD31, SIB1, SIB2, SIB3, SIB4, SIB4, SIB6, SIBy or SIBz) from a primary cell (hereinafter PCell) (2g-10).

In step 2g-10, the cell (serving cell/PCell) may periodically broadcast SIBy (system information including configuration information for NR sidelink communication) or SIBz (system information including configuration information for LTE sidelink communication). For example, in step 2g-10, if scheduling information (si-SchedulingInfo) related to system information is included in SIB1 (SystemInformationBlockType1) received from the cell (serving cell/PCell), SIBy or SIBz is indicated to be broadcasted in si-BroadcastStatus, and SIBy or SIBz is indicated to be present in schedulingInfoList included in si-SchedulingInfo, this may mean that the cell periodically broadcasts SIBy or SIBz.

In case where the UE 2g-01 has been configured to transmit NR V2X sidelink communication in step 2g-05, in step 2g-10, when information corresponding to the specific frequency in which NR V2X sidelink communication has been indicated to be transmitted by a higher layer in SIBy broadcasted by the cell (serving cell/PCell) is not included in v2x-InterFreqInfoList and another cell corresponding to the specific frequency satisfies S-criteria (a condition in which the UE needs to be satisfied for cell selection), if scheduling information (si-SchedulingInfo) related to system information is included in SIB1 (SystemInformationBlockType1) broadcasted by the another cell corresponding to the specific frequency, SIBy is indicated to be broadcasted in si-BroadcastStatus, SIBy is indicated to be present in schedulingInfoList included in si-SchedulingInfo, and SIBy in a valid state has not been stored, the UE 2g-01 may obtain SIBy from the another cell corresponding to the specific frequency.

In case where the UE 2g-01 has been configured to transmit LTE V2X sidelink communication in step 2g-05, in step 2g-10, when information corresponding to the specific frequency in which LTE V2X sidelink communication has been indicated to be transmitted by a higher layer in SIBz broadcasted by the cell (serving cell/PCell) is not included in v2x-InterFreqInfoList and another cell corresponding to the specific frequency satisfies S-criteria (a condition in which the UE needs to be satisfied for cell selection), if scheduling information (si-SchedulingInfo) related to system information is included in SIB1 (SystemInformationBlockType1) broadcasted by the another cell corresponding to the specific frequency, SIBz is indicated to be broadcasted in si-BroadcastStatus, SIBz is indicated to be present in schedulingInfoList included in si-SchedulingInfo, and SIBz in a valid state has not been stored, the UE 2g-01 may obtain SIBz from the another cell corresponding to the specific frequency.

In step 2g-10, there is proposed that SIBy selectively includes sl-V2X-ConfigCommon when the base station 2g-03 broadcasts SIBy. sl-V2X-ConfigCommon may include at least one of v2x-CommRxPool, v2x-CommTxPoolNormalCommon, v2x-CommTxPoolExceptional, v2x-SyncConfig, v2x-InterFreqInfoList, v2x-ResourceSelectionConfig, zoneConfig, typeTxSync, threshSS-TxPrioritization, anchorCarrierFreqList, offsetDFN, cbr-CommonTxConfigList, cbr-pssch-TxConfigList, v2x-packetDuplicationConfig, syncFreqList, slss-TxMultiFreq, v2x-FreqSelectionConfigList, and threshS-RSSI-CBR. Additionally, SIBy may include configuration information related to an HARQ or a sidelink radio bearer (SLRB) configuration information and a mapped QoS flow.

TypeTxSync may include one of pieces of information on a UE, a gNB, and a GNSS.

v2x-CommRxPool, v2x-CommTxPoolNormalCommon, v2x-CommTxPoolExceptional, v2x-InterFreqInfoList may include a resource pool list for NR sidelink communication. An individual resource pool included in the resource pool list may include syncAllowed. Furthermore, syncAllowed may include one of UE-Sync, gNB-Sync, and GNSS-Sync. If one of UE-Sync, gNB-Sync, and GNSS-Sync is included in syncAllowed, the UE may use preconfigured resources or configured resources if the UE has been directly or indirectly synchronized with an included value (one of UE-Sync, gNB-Sync, and GNSS-Sync).

v2x-InterFreqInfoList may include the same v2x-CommCarrierFreq as v2x-InterFreqInfoList included in SIBz, or may include another v2x-CommCarrierFreq. However, a resource allocation configuration or a synchronization configuration included in v2x-InterFreqInfoList may include information related to an NR sidelink configuration.

An ASN.1 structure of the aforementioned SIBy is illustrated in Table 1 below.

[Table 1]
SystemInformationBlockTypey
The IE SystemInformationBlockTypey contains NR V2X sidelink communication configuration.
SystemInformationBlockTypey information element

```
-- ASN1START
SystemInformationBlockTypey ::= SEQUENCE {
    sl-V2X-ConfigCommon         SL-V2X-ConfigCommon              OPTIONAL,
    lateNonCriticalExtension    OCTET STRING                     OPTIONAL,
    ...
}
SL-V2X-ConfigCommon ::=         SEQUENCE {
    v2x-CommRxPool              SL-CommRxPoolListV2X             OPTIONAL,
    v2x-CommTxPoolNormal Common     SL-CommTxPoolListV2X         OPTIONAL,
    p2x-CommTxPoolNormal Common     SL-CommTxPoolListV2X         OPTIONAL,
    v2x-CommTxPoolExceptional       SL-CommResourcePoolV2X       OPTIONAL,
    v2x-SyncConfig              SL-SyncConfigListV2X             OPTIONAL,
    v2x-InterFreqInfoList           SL-InterFreqInfoListV2X      OPTIONAL,
    v2x-ResourceSelectionConfig     SL-CommTxPoolSensingConfig
    OPTIONAL,
    zoneConfig                  SL-ZoneConfig            OPTIONAL,
    typeTxSync                  SL-TypeTxSync            OPTIONAL,
    thresSL-TxPrioritization        SL-Priority          OPTIONAL,
    anchorCarrierFreqList           SL-AnchorCarrierFreqList-V2X     OPTIONAL,
    offsetDFN       INTEGER (0 .. 1000)                  OPTIONAL,
    cbr-CommonTxConfigList          SL-CBR-CommonTxConfigList        OPTIONAL
    cbr-pssch-TxConfigList          SL-CBR-PPPP-TxConfigList         OPTIONAL,
    v2x-PacketDuplicationConfig     SL-V2X-PacketDuplicationConfig
    OPTIONAL, syncFreqList            SL-V2X-SyncFreqList
    OPTIONAL,
```

```
slss-TxMultiFreq              ENUMERATED { true }           OPTIONAL,
v2x-FreqSelectionConfigList        SL-V2X-FreqSelectionConfigList
  OPTIONAL,
threshS-RSSI-CBR              INTEGER (0 .. 45)             OPTIONAL,
}
-- ASN1STOP
```

There is proposed that SIBz selectively includes sl-V2X-ConfigCommon when the base station 2g-03 broadcasts SIBz in step 2g-10. sl-V2X-ConfigCommon may include at least one of v2x-CommRxPool, v2x-CommTxPoolNormalCommon, v2x-CommTxPoolExceptional, v2x-SyncConfig, v2x-InterFreqInfoList, v2x-ResourceSelectionConfig, zoneConfig, typeTxSync, threshSS-TxPrioritization, anchorCarrierFreqList, offsetDFN, cbr-CommonTxConfigList, cbr-pssch-TxConfigList, v2x-packetDuplicationConfig, syncFreqList, slss-TxMultiFreq, v2x-FreqSelectionConfigList, and thresh S-RSSI-CBR.

chronization configuration included in v2x-InterFreqInfoList may include information related to an LTE sidelink configuration.

An ASN.1 structure of the aforementioned SIBz is illustrated in Table 2.

[Table 2]

SystemInformationBlockTypez

The IE SystemInformationBlockTypez contains LTE V2X sidelink communication configuration.

SystemInformationBlockTypez information element

```
-- ASN1START
SystemInformationBlockTypez : := SEQUENCE {
    sl-V2X-ConfigCommon          SL-V2X-ConfigCommon            OPTIONAL,
    lateNonCriticalExtension     OCTET STRING                   OPTIONAL,
    ...
}
SL-V2X-ConfigCommon : :=  SEQUENCE {
    v2x-CommRxPool               SL-CommRxPoolListV2X           OPTIONAL,
    v2x-CommTxPoolNormal Common  SL-CommTxPoolListV2X           OPTIONAL,
    p2x-CommTxPoolNormal Common  SL-CommTxPoolListV2X           OPTIONAL,
    v2x-CommTxPoolExceptional    SL-CommResourcePoolV2X         OPTIONAL,
    v2x-SyncConfig               SL-SyncConfigListV2X           OPTIONAL,
    v2x-InterFreqInfoList        SL-InterFreqInfoListV2X        OPTIONAL,
    v2x-ResourceSelectionConfig  SL-CommTxPoolSensingConfig
      OPTIONAL,
    zoneConfig                   SL-ZoneConfig                  OPTIONAL,
    typeTxSync                   SL-TypeTxSync                  OPTIONAL,
    thresSL-TxPrioritization     SL-Priority                    OPTIONAL,
    anchorCarrierFreqList        SL-AnchorCarrierFreqList-V2X OPTIONAL,
    offsetDFN           INTEGER (0 .. 1000)                     OPTIONAL,
    cbr-CommonTxConfigList       SL-CBR-CommonTxConfigList       OPTIONAL
    cbr-pssch-TxConfigList       SL-CBR-PPPP-TxConfigList       OPTIONAL,
    v2x-Packet DuplicationConfig  SL-V2X-Packet DuplicationConfig
      OPTIONAL,    syncFreqList          SL-V2X-SyncFreqList
      OPTIONAL,
    slss-TxMultiFreq             ENUMERATED { true }            OPTIONAL,
    v2x-FreqSelectionConfigList       SL-V2X-FreqSelectionConfigList
      OPTIONAL,
    threshS-RSSI-CBR             INTEGER (0 .. 45)              OPTIONAL,
}
-- ASN1STOP
```

TypeTxSync may include one of pieces of information on a UE, an eNB, and a GNSS.

v2x-CommRxPool, v2x-CommTxPoolNormalCommon, v2x-CommTxPoolExceptional, or v2x-InterFreqInfoList may include a resource pool list for LTE sidelink communication. An individual resource pool included in the resource pool list may include syncAllowed. Furthermore, syncAllowed may include one of UE-Sync, eNB-Sync, and GNSS-Sync. If one of UE-Sync, eNB-Sync, and GNSS-Sync is included in syncAllowed, the UE 2g-01 may use preconfigured resources or configured resources if the UE has been directly or indirectly synchronized with an included value (one of UE-Sync, eNB-Sync, and GNSS-Sync).

v2x-InterFreqInfoList may include the same v2x-CommCarrierFreq as v2x-InterFreqInfoList included in SIBy or may include another v2x-CommCarrierFreq. However, a resource allocation configuration or a syn- In step 2g-10, when the UE 2g-01 receives SIBy and sl-V2X-ConfigCommon is included in SIBy, the UE may perform a series of the following processes.

1> If the UE 2g-01 has been configured to receive NR V2X sidelink communication in step 2g-05, 2> In order to monitor NR V2X sidelink communication, the UE may use a resource pool indicated in v2x-CommRxPool included in sl-V2X-ConfigCommon.

1> If the UE 2g-01 has been configured to transmit NR V2X sidelink communication in step 2g-05, 2> In order to transmit NR V2X sidelink communication, the UE may use a resource pool indicated in v2x-CommTxPoolNormalCommon, p2x-CommTxPoolNormalCommon, v2x-CommTxPoolNormal, or p2x-CommTxPoolNormal or v2x-CommTxPoolExceptional.

2> The UE may perform channel busy ratio (CBR) measurement in a transmission resource pool indicated in v2x-CommTxPoolNormalCommon, v2x-CommTxPoolNormal and v2x-CommTxPoolExceptional.

When receiving SIBz in step 2g-10, the UE may perform a series of the following processes if sl-V2X-ConfigCommon is included in SIBz.

1> If the UE has been configured to receive LTE V2X sidelink communication in step 2g-05, 2> In order to monitor LTE V2X sidelink communication, the UE may use a resource pool indicated in v2x-CommRxPool.

1> If the UE has been configured to transmit LTE V2X sidelink communication in step 2g-05, 2> In order to transmit LTE V2X sidelink communication, the UE may use a resource pool indicated in v2x-CommTxPoolNormal, p2x-CommTxPoolNormal or v2x-CommTxPoolExceptional.

2> The UE may perform channel busy ratio (CBR) measurement in a transmission resource pool indicated in v2x-CommTxPoolNormal and v2x-CommTxPoolExceptional.

If the UE has been configured by a higher layer to transmit V2X sidelink communication related to non-P2X in step 2g-05 and related data which may be transmitted is present, when at least one of the following conditions is satisfied, in step 2g-15, the UE 2g-01 may establish an RRC connection with the base station 2g-03.

If the UE camps on a frequency configured to transmit LTE V2X sidelink communication related to non-P2X (camped frequency), a cell on which the UE camps broadcasts SIBz, the UE has a valid version of SIBz including sl-V2X-ConfigCommon, and v2x-CommonTxPoolNormalCommon is not included in the sl-V2X-ConfigCommon If the UE camps on a frequency configured to transmit NR V2X sidelink communication related to non-P2X (camped frequency), a cell broadcasts SIBy on which the UE camps, the UE has a valid version of SIBy including sl-V2X-ConfigCommon, and v2x-CommonTxPoolNormalCommon is not included in the sl-V2X-ConfigCommon If a frequency configured to transmit LTE V2X sidelink communication related to non-P2X is included in v2x-InterFreqInfoList included in SIBz broadcasted by a cell on which the UE camps and v2x-CommTxPoolNormal for the frequency is not included in a valid version of SIBz If a frequency configured to transmit NR V2X sidelink communication related to non-P2X is included in v2x-InterFreqInfoList included in SIBy broadcasted by a cell on which the UE camps and v2x-CommTxPoolNormal for the frequency is not included in a valid version of SIBy If the UE has been configured by a higher layer to transmit V2X sidelink communication related to P2X in step 2g-05 and related data which may be transmitted is present, when at least one of the following conditions is satisfied, in step 2g-15, the UE 2g-01 may establish an RRC connection with the base station 2g-03.

If the UE camps on a frequency configured to transmit LTE V2X sidelink communication related to P2X (camped frequency), a cell on which the UE camps broadcasts SIBz, the UE has a valid version of SIBz including sl-V2X-ConfigCommon, and p2x-CommonTxPoolNormalCommon is not included in the sl-V2X-ConfigCommon If the UE camps on a frequency configured to transmit NR V2X sidelink communication related to P2X (camped frequency), a cell on which the UE camps broadcasts SIBy, the UE has a valid version of SIBy including sl-V2X-ConfigCommon, and p2x-CommonTxPoolNormalCommon is not included in the sl-V2X-ConfigCommon If a frequency configured to transmit LTE V2X sidelink communication related to P2X is included in v2x-InterFreqInfoL included in SIBz broadcasted by a cell on which the UE camps and p2x-CommTxPoolNormal for the frequency is not included in a valid version of SIBz If a frequency configured to transmit NR V2X sidelink communication related to P2X is included in v2x-InterFreqInfoList included in SIBy broadcasted by a cell on which the UE camps and p2x-CommTxPoolNormal for the frequency is not included in a valid version of SIBy The UE 2g-01 in the RRC connected mode (RRC_CONNECTED) through the RRC connection established with the base station 2g-03 in step 2g-15 may request V2X transmission resources (pool) or V2X reception resources (pool) by transmitting a SidelinkUEInformation message to the base station 2g-03 (2g-20). The SidelinkUEInformation message may include a frequency list (v2x-CommRxInterestedFreqList) interested by the UE 2g-01 in order to receive V2X SL communication, an indicator (p2x-CommTxType) indicating whether to perform P2X communication, a frequency list (v2x-CommTxResourceReq) requested to be dedicatedly allocated by the base station 2g-03 in order to transmit V2X SL communication, or information related to QoS (e.g., a ProSe per-packet priority (PPPP) and/or a ProSe per-packet reliability (PPPR) list). An ASN.1 structure of the aforementioned SidelinkUEInformation message is illustrated as in Table 3.

[Table 3]
SidelinkUEInformation
The SidelinkUEInformation message is used for the indication of sidelink information to the eNB.
Signalling radio bearer: SRB1
RLC-SAP: AM
Logical channel: DCCH
Direction: UE to E-UTRAN

```
SidelinkUEInformation-IEs : := SEQUENCE {
    v2x-CommRxInterestedFreqList    SL-V2X-CommFreqList
    OPTIONAL,
    p2x-CommTxType                  ENUMERATED { true }         OPTIONAL,
    v2x-CommTxResourceReq           SL-V2X-CommTxFreqList
    OPTIONAL,
    nonCriticalExtension            SidelinkUEInformation-IEs
    OPTIONAL
}
SidelinkUEInformation- IEs : :=    SEQUENCE {
    reliabilityInfoListSL           SL-ReliabilityList
    OPTIONAL,
```

| | |
|---|---|
| nonCriticalExtension<br>OPTIONAL<br>} | SEQUENCE { } |
| SL-V2X-CommFreqList : := | SEQUENCE (SIZE (1. . maxFreqV2X) ) OF INTEGER |
| (0. . maxFreqV2X-1) | |
| SL-V2X-CommTxFreqList : := | SEQUENCE (SIZE (1. . maxFreqV2X) ) OF |
| SL-V2X-CommTxResourceReq | |
| SL-V2X-CommTxResourceReq : := | SEQUENCE { |
| carrierFreqCommTx<br>OPTIONAL, | INTEGER (0 .. maxFreqV2X-1) |
| v2x-TypeTxSync | SL-TypeTxSync                      OPTIONAL, |
| v2x-DestinationInfoList<br>OPTIONAL | SL-DestinationInfoList |

Additionally, the aforementioned SidelinkUEInformation message including configuration information related to NR sidelink communication may be transmitted. For example, the aforementioned SidelinkUEInformation message may include an indicator or IE indicating whether the UE 2g-01 will perform V2X SL communication with another UE 2g-02 in a broadcast manner and/or will perform V2X SL communication with another UE 2g-02 in a unicast manner and/or will perform V2X communication with another UE 2g-02 in a groupcast manner. Alternatively, the SidelinkUEInformation message may include information related to QoS (a 5G QoS indicator (5QI) or a V2X QoS indicator (VQI) list or a set or range/minimum coverage for NR V2X sidelink communication). The base station 2g-03 may differently allocate transmission and reception resource pools to the UE 2g-01 based on the SidelinkUEInformation message.

In step 2g-25, the base station 2g-03 may perform RRC connection reconfiguration procedure with the UE 2g-01 as a response thereto. Specifically, the base station 2g-03 transmits an RRC connection reconfiguration message (RRCConnectionReconfiguration) to the UE 2g-01. The UE 2g-01 may perform an RRC connection reconfiguration procedure by transmitting an RRC connection reconfiguration complete message (RRCConnectionReconfiguration-Complete) to the base station 2g-03. An RRC connection reconfiguration message may be interchangeably used with an RRC reconfiguration message. An RRC connection reconfiguration complete message may be interchangeably used with an RRC reconfiguration complete message. Through the RRC connection reconfiguration procedure, the UE 2g-01 may perform V2X sidelink communication with another UE 2g-02 in a scheduled resource allocation (mode 1 and/or mode 3) mode or a UE autonomous resource selection (mode 2 and/or mode 4) mode.

If the UE 2g-01 includes configuration information related to NR sidelink communication in SidelinkUEInformation in step 2g-20, in step 2g-25, the base station 2g-03 may transmit, to the UE 2g-01, an RRC connection reconfiguration message including the configuration information related to NR sidelink communication. For example, the base station 2g-03 may include a sidelink grant configuration information list (SL-ConfiguredGrantConfigList) or may configure the sidelink grant configuration information list so that the UE 2g-01 can periodically perform sidelink communication, without dynamically providing a sidelink grant to the UE 2g-01 through the RRC message. SL-ConfiguredConfigList for performing NR V2X sidelink communication may be included or configured for each SL-BWP. For example, one or a plurality of sidelink grant configurations may be included in the SL-ConfigGrantConfigList included for each SL-BWP. In order to identify the configuration, an indicator (SL-ConfigGrantConfigIndex) may be included. Alternatively, for example, each sidelink grant configuration may include the number of configurable HARQ processes, periodicity, time or frequency resource information (frequencyDomainAllocation or timeDomainAllocation), etc. An ASN.1 structure of the SL-ConfiguredGrantConfig is illustrated in Table 4 below.

[Table 4]
SL-onfiguredGrantConfigList
The IE SL-onfiguredGrantConfigList is used to configure V2X sidelink transmission without dynamic grant according to two possible schemes. The actual uplink grant may either be configured via RRC (type1) or provided via the PDCCH (addressed to CS-RNTI) (type2).
ConfiguredGrantConfig information element

```
-- ASN1START
-- TAG-CONFIGUREDGRANTCONFIG- START
SL-ConfiguredGrantConfigList ::= SEQUENCE {
    sl-ConfigIndex-r14         SL-Configured-ConfigIndex
    sl-ConfiguredGrantConfig   SL-ConfiguredGrantConfig
}
SL-ConfiguredGrantConfig : :=                SEQUENCE {
    frequencyHopping                             ENUMERATED { intraSlot,
interSlot }                                       OPTIONAL, --
Need S,
    cg-DMRS-Configuration                        DMRS-UplinkConfig,
    mcs-Table                                    ENUMERATED { qam256,
qam64LowSE }                                      OPTIONAL, --
Need S
    mcs-TableTransformPrecoder                   ENUMERATED { qam256,
qam64LowSE }                                      OPTIONAL, --
Need S
    uci-OnPUSCH                                  SetupRelease
{ CG-UCI-OnPUSCH }                                OPTIONAL,
```

```
-- Need M
    resourceAllocation                      ENUMERATED
{ resourceAllocationType0, resourceAllocationType1, dynamicSwitch },
    rbg-Size                                ENUMERATED { config2 }
OPTIONAL, -- Need S
    powerControlLoopToUse                   ENUMERATED { n0, n1 },
    p0-PUSCH-Alpha                          P0-PUSCH-AlphaSetId,
    transformPrecoder                       ENUMERATED { enabled,
disabled}                                       OPTIONAL, --
Need S
    nrofHARQ-Processes                      INTEGER (1 .. 16),
    repK                                    ENUMERATED { n1, n2, n4, n8 },
    repK-RV                                 ENUMERATED { s1-0231,
s2-0303, s3-0000 }                              OPTIONAL, --
Need R
    periodicity                             ENUMERATED {
                                            sym2, sym7, sym1x14,
sym2x14, sym4x14, sym5x14, sym8x14, sym10x14, sym16x14, sym20x14,
                                            sym32x14, sym40x14,
sym64x14, sym80x14, sym128x14, sym160x14, sym256x14, sym320x14,
sym512x14,
                                            sym640x14,
sym1024x14, sym1280x14, sym2560x14, sym5120x14,
                                            sym6, sym1x12,
sym2x12, sym4x12, sym5x12, sym8x12, sym10x12, sym16x12, sym20x12,
sym32x12,
                                            sym40x12, sym64x12,
sym80x12, sym128x12, sym160x12, sym256x12, sym320x12, sym512x12,
sym640x12,
                                            sym1280x12,
sym2560x12
    },
    configuredGrantTimer                    INTEGER (1 .. 64)
OPTIONAL, -- Need R
    rrc-ConfiguredUplinkGrant               SEQUENCE {
        timeDomainOffset                    INTEGER (0 .. 5119),
        timeDomainAllocation                INTEGER (0 .. 15),
        frequencyDomainAllocation           BIT STRING
(SIZE(18) ) ,
        antennaPort                         INTEGER (0 .. 31) ,
        dmrs-SeqInitialization              INTEGER (0 .. 1)
OPTIONAL, -- Need R
        precodingAndNumberOfLayers          INTEGER (0 .. 63) ,
        srs-ResourceIndicator               INTEGER (0 .. 15)
OPTIONAL, -- Need R
        mcsAndTBS                           INTEGER (0 .. 31) ,
        frequencyHoppingOffset              INTEGER (1 ..
maxNrofPhysicalResourceBlocks-1)                OPTIONAL, --
Need R
        pathlossReferenceIndex              INTEGER
(0 .. maxNrofPUSCH-PathlossReferenceRSs-1),
        ...
    }
OPTIONAL,         -- Need R
    ...
}
CG-UCI-OnPUSCH ::= CHOICE {
    dynamic                                 SEQUENCE (SIZE (1 .. 4) )
OF BetaOffsets,
    semiStatic                              BetaOffsets
}
```

In step 2g-30, when a traffic pattern for NR V2X sidelink communication is changed, the UE 2g-01 may transmit, to the base station 2g-03, a UEAssistanceInformation message including configuration information related to NR sidelink communication (2g-30). The message may include a traffic pattern information list suitable for NR V2X sidelink communication. For example, the traffic pattern information list may include one or a plurality of pieces of traffic pattern information. Each of the pieces of traffic pattern information may include traffic periodicity (trafficPeriodicity), expected timing (timingOffset) at which a packet will arrive at a sidelink logical channel, destination information (trafficDestination) related to V2X sidelink communication, etc. Alternatively, the message may include at least one of parameters included in the aforementioned SL-ConfigGrantConfigList.

In step 2g-35, the base station 2g-03 may perform the aforementioned RRC connection reconfiguration procedure along with the UE 2g-01.

FIG. 2H is a diagram describing a method of transmitting and receiving system information for supporting V2X communication in a next-generation mobile communication system according to an embodiment of the disclosure.

A UE according to an embodiment of the disclosure may be referred to as a vehicle terminal or a pedestrian terminal. The UE may support LTE V2X sidelink communication or support NR V2X sidelink communication. An NR base station according to an embodiment of the disclosure may broadcast or signal at least one of system information related to LTE V2X sidelink configuration information or system information related to NR V2X sidelink configuration information in an on-demand form. The on-demand form according to an embodiment of the disclosure may mean that an NR base station does not periodically broadcast the system information and broadcasts the system information in response to a request from a UE. The reason why the system information is broadcasted in the on-demand form is that there is an advantage in that signaling overhead can be reduced because the system information can be broadcasted only when it is necessary.

Referring to FIG. 2H, a UE 2h-01 capable of V2X sidelink communication may be configured by a higher layer to receive or transmit V2X sidelink communication in a specific frequency (2h-05). The higher layer may configure the UE 2h-01 to receive or transmit NR V2X sidelink communication in a specific frequency or may configure the UE 2h-01 to receive or transmit LTE V2X sidelink communication in a specific frequency. Alternatively, the higher layer may configure the UE 2h-01 to receive or transmit LTE V2X sidelink communication in addition to NR V2X sidelink communication in a specific frequency. Accordingly, the UE 2h-01 capable of V2X sidelink communication may determine whether to perform LTE NR V2X sidelink communication or whether to perform NR V2X sidelink communication through step 2h-05.

When the UE 2h-01 is in the RRC idle mode (RRC_IDLE) or the RRC inactive mode (RRC_INACIVE) because the UE 2h-01 has not established an RRC connection with a base station 2h-03 in step 2h-05, the UE 2h-01 may obtain system information (e.g., MD31, SIB1, SIB2, SIB3, SIB4, SIB4, SIB6, SIBy or SIBz) by finding and camping on a suitable cell in a specific frequency indicated by a higher layer through a cell selection procedure or a cell reselection procedure (2h-10). In this case, the camped-on cell may be referred to as a serving cell.

When the UE 2h-01 is in the RRC connected mode (RRC_CONNECTED) because the UE 2h-01 has established an RRC connection with the base station 2h-03 in a cell within a specific frequency indicated by a higher layer in step 2h-05, the UE 2h-01 may obtain system information (e.g., MD31, SIB1, SIB2, SIB3, SIB4, SIB5, SIB6, SIBy or SIBx) from a primary cell (hereinafter PCell) (2h-10).

In step 2h-10, the cell (serving cell/PCell) may not broadcast SIBy or SIBz in order to broadcast at least one of SIBy (system information including configuration information for NR sidelink communication) or SIBz (system information including configuration information for LTE sidelink communication) in an on-demand form. For example, in step 2h-10, if scheduling information (si-SchedulingInfo) related to system information is included in SIB1 (SystemInformationBlockType1) received from the cell (serving cell/PCell) and nontBroadcasting is indicated in si-BroadcastStatus with respect to SIBy or SIBz, this means that the cell according to according to an embodiment of the disclosure broadcasts SIBy or SIBz in an on-demand form.

There is proposed that the cell according to an embodiment of the disclosure includes, in SIB1, separate Msg1 resource configuration information (e.g., v2x-si-RequestConfig or v2x-si-RequestConfigSUL) for enabling the UE 2h-01 to request SIBy or SIBz in order to broadcast SIBy or SIBz in an on-demand form. If the separate Msg1 resource configuration information (e.g., v2x-si-RequestConfig or v2x-si-RequestConfigSUL) is included in SIB1, there is an advantage in that the UE 2h-01 can receive V2X sidelink communication configuration information more quickly because the UE 2h-01 can request, from the base station, system information including V2X sidelink communication configuration information regardless of system information not related to V2X sidelink communication. Alternatively, the separate Msg1 resource configuration information may be configured in a frequency (e.g., v2x-si-RequestConfi) for common uplink (UL), or may be configured in a frequency (e.g., v2x-si-RequestConfigSUL) for supplementary uplink (SUL). Msg1 may mean a first message transmitted from the UE 2h-01 to the cell. For example, Msg1 may mean a random access preamble. The separate Msg1 resource configuration information (e.g., v2x-si-RequestConfig or v2x-si-RequestConfigSUL) may include configuration information (rach-OccasionSI) for dedicated RACH occasions that enable the UE 2h-01 to request, from the base station, system information including V2X sidelink communication configuration information, periodicity (si-RequestPeriod), system information resource (si-RequestResources) which may be requested, etc. The v2x-si-RequestConfig or the v2x-si-RequestConfigSUL may have an ASN.1 structure of Table 5 below.

TABLE 5

```
SI-SchedulingInfo ::=                              SEQUENCE {
    schedulingInfoList                                 SEQUENCE (SIZE
(1 . .maxSI-Message) ) OF SchedulingInfo,
    si-WindowLength                                    ENUMERATED { s5, s10, s20, s40, s80
s160, s320, s640, s1280 },
    v2x-si-RequestConfig                                       V2X-SI-RequestConfig
OPTIONAL, -- Cond MSG-1
    v2x-si-RequestConfigSUL                                    V2X-SI-RequestConfig
OPTIONAL, -- Cond SUL-MSG-1
    systemInformationAreaID                            BIT STRING (SIZE (24) )
OPTIONAL, -- Need R
    . . .
}
V2X-SI-RequestConfig: :=                                   SEQUENCE {
    rach-OccasionsSI                                       SEQUENCE {
        rach-ConfigSI                                          RACH-ConfigGeneric,
        ssb-perRACH-Occasion                                   ENUMERATED { oneEighth,
oneFourth, oneHalf, one, two, four, eight, sixteen }
    }
OPTIONAL, -- Need R
    si-RequestPeriod                                   ENUMERATED { one, two, four, six,
eight, ten, twelve, sixteen }                                 OPTIONAL, -- Need R
    si-RequestResources                                SEQUENCE (SIZE
(1. . maxSI-Message) ) OF SI-RequestResources
```

TABLE 5-continued

```
}
SI-RequestResources : :=                SEQUENCE {
    ra-PreambleStart Index                  INTEGER (0 .. 63) ,
    ra-AssociationPeriodIndex               INTEGER (0 .. 15)
OPTIONAL, -- Need R
    ra-ssb-OccasionMaskIndex                INTEGER (0 .. 15)
OPTIONAL, -- Need R
}
```

In case where the UE has been configured to receive or transmit NR V2X sidelink communication in step 2h-05, if scheduling information (si-SchedulingInfo) related to system information is included in SIB1 (SystemInformationBlockType1) received from the cell (serving cell/PCell), v2x-si-RequestConfig or v2x-si-RequestConfigSUL is included in si-SchedulingInfo, and nontBroadcasting is indicated in si-BroadcastStatus with respect to SIBy, in step 2h-15, the UE 2h-01 may initiate a random access procedure by using PRACH preambles and PRACH resources included in v2x-si-RequestConfig or v2x-si-RequestConfigSUL in order to request SIBy from the cell. In step 2h-15, when acknowledgement for the SIBy request is received from the cell, the UE 2h-01 may obtain SIBy.

In case where the UE has been configured to receive or transmit NR V2X sidelink communication in step 2h-05, if scheduling information (si-SchedulingInfo) related to system information is included in SIB1 (SystemInformationBlockType1) received from the cell (serving cell/PCell), v2x-si-RequestConfig and v2x-si-RequestConfigSUL are not included in si-SchedulingInfo, and nontBroadcasting is indicated in si-BroadcastStatus with respect to SIBy, in step 2h-15, the UE 2h-01 may initiate a common random access procedure. In step 2h-15, the UE 2h-01 may select a PRACH occasion and transmit a random access preamble to the cell. Furthermore, when receiving the random access preamble, the cell may transmit a random access response message for the random access preamble to the UE 2h-01. Furthermore, the UE 2h-01 may transmit an RRCSystemInfoRequest message to the cell. The message may include an identifier for identifying SIBy so that the UE 2h-01 can request SIBy from the cell. Furthermore, when receiving acknowledgement for the SIBy request from the cell, the UE 2h-01 may obtain SIBy.

In case where the UE has been configured to receive or transmit LTE V2X sidelink communication in step 2h-05, if scheduling information (si-SchedulingInfo) related to system information is included in SIB1 (SystemInformationBlockType1) received from the cell (serving cell/PCell), v2x-si-RequestConfig or v2x-si-RequestConfigSUL is included in si-SchedulingInfo, and nontBroadcasting is indicated in si-BroadcastStatus with respect to SIBz, in step 2h-15, the UE 2h-01 may initiate a random access procedure by using PRACH preambles and PRACH resources within v2x-si-RequestConfig or v2x-si-RequestConfigSUL in order to request SIBz from the cell. When receiving acknowledgement for the SIBz request from the cell in step 2h-15, the UE 2h-01 may obtain SIBz.

In case where the UE has been configured to receive or transmit LTE V2X sidelink communication in step 2h-05, if scheduling information (si-SchedulingInfo) related to system information is included in SIB1 (SystemInformationBlockType1) received from the cell (serving cell/PCell), v2x-si-RequestConfig and v2x-si-RequestConfigSUL are not included in si-SchedulingInfo, and nontBroadcasting is indicated in si-BroadcastStatus with respect to SIBz, in step 2h-15, the UE 2h-01 may initiate a common random access procedure. In step 2h-15, the UE 2h-01 may select a PRACH occasion and transmit a random access preamble to the cell. Furthermore, when receiving the random access preamble, the cell may transmit a random access response message for the random access preamble to the UE 2h-01. Furthermore, the UE 2h-01 may transmit an RRCSystemInfoRequest message to the cell. The message may include an identifier for identifying SIBz so that the UE 2h-01 can request SIBz from the cell. Furthermore, when receiving acknowledgement for the SIBz request from the cell, the UE 2h-01 may obtain SIBz.

When the UE 2h-01 is in the RRC idle mode (RRC_IDLE) or the RRC inactive mode (RRC_INACIVE) because the UE 2h-01 has not established an RRC connection with the base station 2h-03 in step 2h-05, the UE 2h-01 may obtain system information (e.g., MD31, SIB1, SIB2, SIB3, SIB4, SIB4, SIB6, SIBy or SIBz) by finding and camping on a suitable cell within a specific frequency different from the aforementioned specific frequency in which V2X sidelink communication has been indicated to be received by a higher layer, through a cell selection procedure or a cell reselection procedure (2h-10). In this case, the camped-on cell may be referred to as a serving cell.

When the UE 2h-01 is in the RRC connected mode (RRC_CONNECTED) because the UE 2h-01 has established an RRC connection with the base station 2h-03 in a cell within a specific frequency different from the aforementioned specific frequency in which V2X sidelink communication has been indicated to be received by a higher layer in step 2h-05, the UE 2h-01 may obtain system information (e.g., MD31, SIB1, SIB2, SIB3, SIB4, SIB4, SIB6, SIBy or SIBz) from a primary cell (hereinafter PCell) (2h-10).

In step 2h-10, the cell (serving cell/PCell) may not broadcast SIBy or SIBz in order to broadcast at least one of SIBy (system information including configuration information for NR sidelink communication) or SIBz (system information including configuration information for LTE sidelink communication) in an on-demand form.

If the UE 2h-01 has been configured to receive NR V2X sidelink communication in step 2h-05, the UE 2h-01 may obtain SIBy by requesting SIBy from the cell (serving cell/PCell) based on the aforementioned contents (2h-15). If a reception resource pool corresponding to the specific frequency in which NR V2X sidelink communication has been indicated to be received by a higher layer is not included in SIBy obtained from the cell and another cell corresponding to the specific frequency satisfies S-criteria (a condition in which the UE 2h-01 needs to be satisfied for cell selection), when scheduling information (si-SchedulingInfo) related to system information is included in SIB1 (SystemInformationBlockType1) broadcasted by the another cell corresponding to the specific frequency, SIBy is indicated to be present in schedulingInfoList included in si-SchedulingInfo, and SIBy in a valid state has not been stored, the UE 2h-01 may obtain SIBy from the another cell corresponding to the specific frequency by requesting (performing step 2h-15 with another cell) SIBy based on the aforementioned contents.

In step 2h-05, if the UE 2h-01 has been configured to receive LTE V2X sidelink communication, the UE 2h-01 may obtain SIBz from the cell (serving cell/PCell) by requesting SIBz based on the aforementioned contents (2h-15). When a reception resource pool corresponding to the specific frequency in which LTE V2X sidelink communication has been indicated to be received by a higher layer is not included in SIBz received from the cell and another cell corresponding to the specific frequency satisfies S-criteria (a condition in which the UE needs to be satisfied for cell selection), if scheduling information (si-SchedulingInfo) related to system information is included in SIB1 (SystemInformationBlockType1) broadcasted by the another cell corresponding to the specific frequency, SIBz is indicated to be present in schedulingInfoList included in si-SchedulingInfo, and SIBz in a valid state has not been stored, the UE may obtain SIBz from the another cell corresponding to the specific frequency by requesting SIBz (performing step 2h-15 with another cell) based on the aforementioned contents.

In step 2h-05, when the UE is in the RRC idle mode (RRC_IDLE) or the RRC inactive mode (RRC_INACTIVE) because the UE has not established an RRC connection with the base station 2h-03, the UE may obtain system information (e.g., MD31, SIB1, SIB2, SIB3, SIB4, SIB4, SIB6, SIBy or SIBz) by finding and camping on a suitable cell within a specific frequency different from the aforementioned specific frequency in which V2X sidelink communication has been indicated to be transmitted by a higher layer through a cell selection procedure or a cell reselection procedure (2h-10). In this case, the camped-on cell may be referred to as a serving cell.

In step 2h-05, when the UE is in the RRC connected mode (RRC_CONNECTED) because the UE has established an RRC connection with the base station 2h-03 in a cell within a specific frequency different from the aforementioned specific frequency in which V2X sidelink communication has been indicated to be transmitted by a higher layer, the UE may obtain system information (e.g., MD31, SIB1, SIB2, SIB3, SIB4, SIB4, SIB6, SIBy or SIBz) from a primary cell (hereinafter PCell) (2h-10).

In step 2h-10, the cell (serving cell/PCell) may not broadcast SIBy or SIBz in order to broadcast at least one of SIBy (system information including configuration information for NR sidelink communication) or SIBz (system information including configuration information for LTE sidelink communication) in an on-demand form.

If the UE 2h-01 has been configured to transmit NR V2X sidelink communication in step 2h-05, the UE may obtain SIBy from the cell (serving cell/PCell) by requesting SIBy based on the aforementioned contents (2h-15). If information corresponding to the specific frequency in which NR V2X sidelink communication has been indicated to be transmitted by a higher layer in SIBy obtained from the cell (serving cell/PCell) is not included in v2x-InterFreqInfoList, another cell corresponding to the specific frequency satisfies S-criteria (a condition in which the UE 2h-01 needs to be satisfied for cell selection), scheduling information (si-SchedulingInfo) related to system information is included in SIB1 (SystemInformationBlockType1) broadcasted by the another cell corresponding to the specific frequency, SIBy is indicated to be broadcasted in si-BroadcastStatus, SIBy is indicated to be present in schedulingInfoList included in si-SchedulingInfo, and SIBy in a valid state has not been stored, the UE 2h-01 may obtain SIBy from the another cell corresponding to the specific frequency by requesting (performing step 2h-15 with another cell) SIBy based on the aforementioned contents.

In step 2h-05, in case that the UE 2h-01 has been configured to transmit LTE V2X sidelink communication, the UE 2h-01 may obtain SIBz from the cell (serving cell/PCell) by requesting SIBz based on the aforementioned contents (2h-15). If information corresponding to the specific frequency in which LTE V2X sidelink communication has been indicated to be transmitted by a higher layer in SIBz obtained from the cell (serving cell/PCell) is not included in v2x-InterFreqInfoList and another cell corresponding to the specific frequency satisfies S-criteria (a condition in which the UE 2h-01 needs to be satisfied for cell selection), when scheduling information (si-SchedulingInfo) related to system information is included in SIB1 (SystemInformationBlockType1) broadcasted by the another cell corresponding to the specific frequency, SIBz is indicated to be broadcasted in si-BroadcastStatus, SIBz is indicated to be present in schedulingInfoList included in si-SchedulingInfo, and SIBz in a valid state has not been stored, the UE 2h-01 may obtain SIBz from the another cell corresponding to the specific frequency by requesting (performing step 2h-15 with another cell) SIBz based on the aforementioned contents.

There is proposed that SIBy selectively includes sl-V2X-ConfigCommon when the base station 2h-03 broadcasts SIBy in step 2h-10 or 2h-15. sl-V2X-ConfigCommon may include at least one of v2x-CommRxPool, v2x-CommTxPoolNormalCommon, v2x-CommTxPoolExceptional, v2x-SyncConfig, v2x-InterFreqInfoList, v2x-ResourceSelectionConfig, zoneConfig, typeTxSync, threshSS-TxPrioritization, anchorCarrierFreqList, offsetDFN, cbr-CommonTxConfigList, cbr-pssch-TxConfigList, v2x-packetDuplicationConfig, syncFreqList, slss-TxMultiFreq, v2x-FreqSelectionConfigList, and threshS-RSSI-CBR. Additionally, SIBy may include configuration information related to an HARQ or sidelink radio bearer (SLRB) configuration information and a mapped QoS flow.

- TypeTxSync may include one of pieces of information on a UE, a gNB, and a GNSS.
- v2x-CommRxPool, v2x-CommTxPoolNormalCommon, v2x-CommTxPoolExceptional, v2x-InterFreqInfoList may include a resource pool list for NR sidelink communication. An individual resource pool included in the resource pool list may include syncAllowed. Furthermore, syncAllowed may include one of UE-Sync, gNB-Sync, and GNSS-Sync. If one of UE-Sync, gNB-Sync, and GNSS-Sync is included in syncAllowed, the UE may use preconfigured resources or configured resources if the UE has been directly or indirectly synchronized with an included value (one of UE-Sync, gNB-Sync, and GNSS-Sync).
- v2x-InterFreqInfoList may include the same v2x-CommCarrierFreq as v2x-InterFreqInfoList included in SIBz or may include another v2x-CommCarrierFreq. However, a resource allocation configuration or a synchronization configuration included in v2x-InterFreqInfoList may include information related to an NR sidelink configuration.

For an ASN.1 structure of the aforementioned SIBy, reference is made to Table

There is proposed that SIBz selectively includes sl-V2X-ConfigCommon when the base station 2h-03 broadcasts SIBz in step 2h-10 or 2h-15. sl-V2X-ConfigCommon may include at least one of v2x-CommRxPool, v2x-CommTx- PoolNormalCommon, v2x-CommTxPoolExceptional, v2x-SyncConfig, v2x-InterFreqInfoList, v2x-ResourceSelectionConfig, zoneConfig, typeTxSync, threshSS-TxPrioritization, anchorCarrierFreqList, offsetDFN, cbr-CommonTxConfigList, cbr-pssch-TxConfigList, v2x-packetDuplicationConfig, syncFreqList, slss-TxMultiFreq, v2x-FreqSelectionConfigList, and thresh S-RSSI-CBR.

TypeTxSync may include one of pieces of information on a UE, an eNB, and a GNSS.

v2x-CommRxPool, v2x-CommTxPoolNormalCommon, v2x-CommTxPoolExceptional, v2x-InterFreqInfoList may include a resource pool list for LTE sidelink communication. An individual resource pool included in the resource pool list may include syncAllowed. Furthermore, syncAllowed may include one of UE-Sync, eNB-Sync, and GNSS-Sync. If one of UE-Sync, eNB-Sync, and GNSS-Sync is included in syncAllowed, the UE may use preconfigured resources or configured resources if the UE has been directly or indirectly synchronized with an included value (one of UE-Sync, eNB-Sync, and GNSS-Sync).

v2x-InterFreqInfoList may include the same v2x-CommCarrierFreq as v2x-InterFreqInfoList included in SIBy or may include another v2x-CommCarrierFreq. However, a resource allocation configuration or a synchronization configuration included in v2x-InterFreqInfoList may include information related to an LTE sidelink configuration.

For an ASN.1 structure of the aforementioned SIBz, reference is made to Table 2.

Figure 2I:
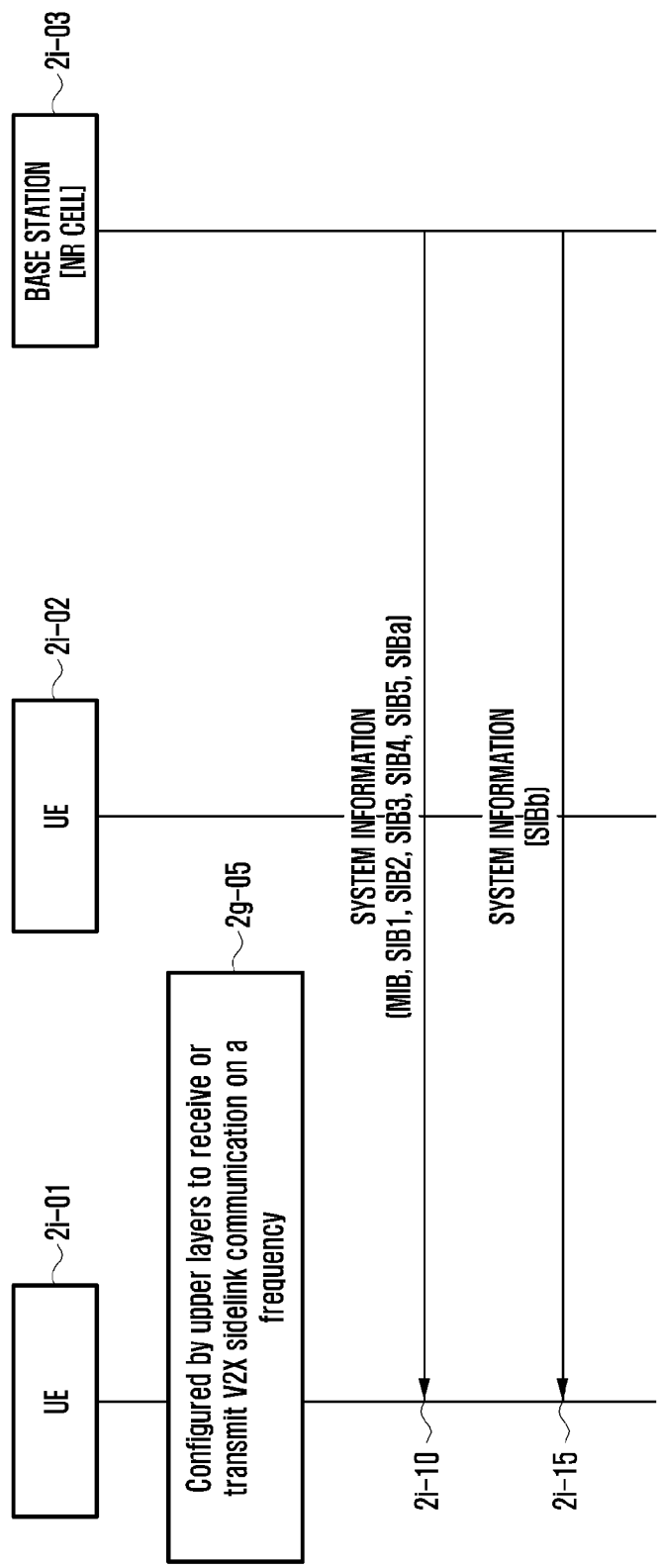
FIG. 2I is a diagram describing a method of transmitting and receiving system information for supporting V2X communication in a next-generation mobile communication system according to an embodiment of the disclosure.

FIG. 2I is a diagram describing a method of transmitting and receiving system information for supporting V2X communication in a next-generation mobile communication system according to an embodiment of the disclosure.

A base station according to an embodiment of the disclosure may broadcast a plurality of pieces of system information related to NR sidelink configuration information. For example, NR sidelink configuration information may be included in SIBa, and NR sidelink configuration information may also be included in SIBb. If a plurality of pieces of system information is broadcasted, there is an advantage in that an SIB size problem can be solved. For example, the most required NR sidelink configuration information may be included in SIBa and periodically broadcasted or may be broadcasted in an on-demand form, or not-frequently used NR sidelink configuration information may be included in SIBb and broadcasted in an on-demand form. Alternatively, if sidelink radio bearer (SLRB) configuration information and a mapped QoS flow are necessary and are not included in SIBa, the UE may request SIBb from a base station according to the aforementioned embodiment in order to request the sidelink radio bearer (SLRB) configuration information and the mapped QoS flow.

A base station according to an embodiment of the disclosure may configure SIBa according to the aforementioned embodiment when periodically broadcasting or broadcasting SIBa in an on-demand form. SIBa including NR sidelink configuration information may include v2x-InterFreqInfoList. v2x-InterFreqInfoList may include synchronization configuration information and resource allocation information for each surrounding frequency with respect to one or a plurality of surrounding frequencies for the purpose of V2X sidelink communication. That is, the v2x-InterFreqInfoList may include SL-InterFreqInfoListV2X. An ASN. 1 structure of SL-InterFreqInfoListV2X is illustrated in Table 6 below.

[Table 6]
SL-InterFreqInfoListV2X information element

```
-- ASN1START
SL-InterFreqInfoListV2X ::= SEQUENCE (SIZE (0.. maxFreqV2X-1) ) OF
SL-InterFreqInfoV2X
SL-InterFreqInfoV2X::=              SEQUENCE {
    plmn-IdentityList                   PLMN-IdentityList           OPTIONAL,
    v2x-CommCarrierFreq                 ARFCN-ValueEUTRA-r9,
    sl-MaxTx Power                      P-Max               OPTIONAL,
    sl-Bandwidth                        ENUMERATED { n6, n15, n25, n50, n75, n100 }
    OPTIONAL,
    v2x-SchedulingPool                  SL-CommResource PoolV2X     OPTIONAL,
        v2x-UE-ConfigList-r14           SL-V2X-UE-ConfigList        OPTIONAL, --
Need OR
...,
    [ [ additionalSpectrumEmissionV2X   CHOICE {
        additionalSpectrumEmission          AdditionalSpectrumEmission,
        additionalSpectrumEmission          AdditionalSpectrumEmission
    } OPTIONAL
    ] ],
    [ [ v2x-FreqSelectionConfigList SL-V2X-FreqSelectionConfigList
    OPTIONAL ] ]
}
-- ASN1STOP
```

If the SL-InterFreqInfoListV2X includes synchronization configuration information and resource allocation information for each surrounding frequency with respect to all of supportable surrounding frequencies, the size of SIBa may increase or all the pieces of information may not be included in SIBa. Accordingly, there is proposed that SIBa includes synchronization configuration information and resource allocation information for each corresponding surrounding frequency with respect to one or a plurality of surrounding frequencies, and SIBa does not include synchronization configuration information and resource allocation information with respect to the remaining surrounding frequencies, but includes only v2x-CommCarrierFreq. Furthermore, there is proposed that SIBb includes synchronization configuration information and resource allocation information for each corresponding surrounding frequency with respect to a surrounding frequency in which only v2x-CommCarrierFreq is included in SIB a.

Referring to FIG. 2I, a UE 2*i*-01 capable of V2X sidelink communication may be configured by a higher layer to receive or transmit NR V2X sidelink communication in a specific frequency (2*i*-05).

In step 2i-10, the UE 2i-01 may obtain system information (e.g., MIB1, SIB1, SIB2, SIB3, SIB4, SIB5, SIB6, SIBa) from the base station 2i-03 based on the aforementioned embodiment.

In step 2i-05, in case that the UE 2i-01 has been configured to be receive NR V2X sidelink communication, if a specific frequency indicated by a higher layer to receive NR V2X sidelink communication is included in SIBa received from the base station, but a reception resource pool corresponding to the specific frequency is not included in SIBa, the UE 2i-01 may obtain SIBb from a cell by requesting SIBb according to the aforementioned embodiment (2i-15).

In step 2i-05, in case that the UE 2i-01 has been configured to transmit NR V2X sidelink communication, if a specific frequency indicated by a higher layer to transmit NR V2X sidelink communication in SIBa obtained from a base station 2i-03 is included in v2x-InterFreqInfoList, but a transmission resource pool corresponding to the specific frequency is not included in SIBa, the UE 2i-01 may obtain SIBb from the cell by requesting SIBb according to the aforementioned embodiment.

There is proposed that SIBa selectively includes sl-V2X-ConfigCommon when the base station 2i-03 broadcasts SIBa in step 2i-10 or 2i-15. sl-V2X-ConfigCommon may include at least one of v2x-CommRxPool, v2x-CommTx-PoolNormalCommon, v2x-CommTxPoolExceptional, v2x-SyncConfig, v2x-InterFreqInfoList, v2x-ResourceSelectionConfig, zoneConfig, typeTxSync, threshSS-TxPrioritization, anchorCarrierFreqList, offsetDFN, cbr-CommonTxConfigList, cbr-pssch-TxConfigList, v2x-packetDuplicationConfig, syncFreqList, slss-TxMultiFreq, v2x-FreqSelectionConfigList, and threshS-RSSI-CBR. Additionally, SIBa may include configuration information related to an HARQ or sidelink radio bearer (SLRB) configuration information and a mapped QoS flow.

TypeTxSync may include one of pieces of information on a UE, a gNB, and a GNSS.

v2x-CommRxPool, v2x-CommTxPoolNormalCommon, v2x-CommTxPoolExceptional, v2x-InterFreqInfoList may include a resource pool list for NR sidelink communication. An individual resource pool included in the resource pool list may include syncAllowed. Furthermore, syncAllowed may include one of UE-Sync, gNB-Sync, GNSS-Sync. If one of UE-Sync, gNB-Sync, GNSS-Sync is included in syncAllowed, the UE may use preconfigured resources or configured resources if the UE has been directly or indirectly synchronized with an included value (one of UE-Sync, gNB-Sync, and GNSS-Sync).

v2x-InterFreqInfoList may include the same v2x-CommCarrierFreq as v2x-InterFreqInfoList included in SIBz or may include another v2x-CommCarrierFreq. However, a resource allocation configuration or a synchronization configuration included in v2x-InterFreqInfoList may include information related to an NR sidelink configuration.

An ASN.1 structure of the aforementioned SIBa is the same as that of Table 7 below.

[Table 7]
SystemInformationBlockTypea
The IE SystemInformationBlockTypea contains NR V2X sidelink communication configuration.
SystemInformationBlockTypea information element

```
-- ASN1START
SystemInformationBlockTypea : := SEQUENCE {
    sl-V2X-ConfigCommon           SL-V2X-ConfigCommon           OPTIONAL,
    lateNonCriticalExtension      OCTET STRING                  OPTIONAL,
    ...
}
SL-V2X-ConfigCommon : :=          SEQUENCE {
    v2x-CommRx Pool               SL-CommRxPoolListV2X          OPTIONAL,
    v2x-CommTxPoolNormal Common   SL-CommTxPoolListV2X          OPTIONAL,
    p2x-CommTxPoolNormalCommon    SL-CommTxPoolListV2X          OPTIONAL,
    v2x-CommTxPoolExceptional     SL-CommResourcePoolV2X        OPTIONAL,
    v2x-SyncConfig                SL-SyncConfigListV2X          OPTIONAL,
    v2x-InterFreqInfoList         SL-InterFreqInfoListV2X       OPTIONAL,
    v2x-ResourceSelectionConfig   SL-CommTxPoolSensingConfig    OPTIONAL,
    zoneConfig                    SL-ZoneConfig                 OPTIONAL,
    typeTxSync                    SL-TypeTxSync                 OPTIONAL,
    thresSL-TxPrioritization      SL-Priority                   OPTIONAL,
    anchorCarrierFreqList         SL-AnchorCarrierFreqList-V2X  OPTIONAL,
    offsetDFN                     INTEGER (0 . . 1000)          OPTIONAL,
    cbr-CommonTxConfigList        SL-CBR-CommonTxConfigList     OPTIONAL
    cbr-pssch-TxConfigList        SL-CBR-PPPP-TxConfigList      OPTIONAL,
    v2x-PacketDuplicationConfig     SL-V2X-PacketDuplicationConfig OPTIONAL, syncFreqList        SL-V2X-SyncFreqList
    OPTIONAL,
    slss-TxMultiFreq              ENUMERATED { true }           OPTIONAL,
    v2x-FreqSelectionConfigList       SL-V2X-FreqSelectionConfigList
    OPTIONAL,
    threshS-RSSI-CBR              INTEGER (0 . . 45)            OPTIONAL,
}
-- ASN1STOP
```

There is proposed that SIBb selectively includes sl-V2X-ConfigCommon when the base station 2*i*-03 broadcasts SIBb in step 2*i*-15. sl-V2X-ConfigCommon may include at least one of v2x-CommRxPool, v2x-CommTxPoolNormalCommon, v2x-CommTxPoolExceptional, v2x-SyncConfig, v2x-InterFreqInfoList, v2x-ResourceSelectionConfig, zoneConfig, typeTxSync, threshSS-TxPrioritization, anchorCarrierFreqList, offsetDFN, cbr-CommonTxConfigList, cbr-pssch-TxConfigList, v2x-packetDuplicationConfig, syncFreqList, slss-TxMultiFreq, v2x-FreqSelectionConfigList, and threshS-RSSI-CBR. Additionally, SIBb may include configuration information related to an HARQ or sidelink radio bearer (SLRB) configuration information and a mapped QoS flow.

TypeTxSync may include one of pieces of information on a UE, an eNB, and a GNSS.

v2x-CommRxPool, v2x-CommTxPoolNormalCommon, v2x-CommTxPoolExceptional, v2x-InterFreqInfoList may include a resource pool list for LTE sidelink communication. An individual resource pool included in the resource pool list may include syncAllowed.

Furthermore, syncAllowed may include one of UE-Sync, eNB-Sync, and GNSS-Sync. If one of UE-Sync, eNB-Sync, and GNSS-Sync is included in syncAllowed, the UE 2*i*-01 may use preconfigured resources or configured resources if the UE has been directly or indirectly synchronized with an included value (one of UE-Sync, eNB-Sync, and GNSS-Sync).

v2x-InterFreqInfoList may include the same v2x-CommCarrierFreq as v2x-InterFreqInfoList included in SIBb or may include another v2x-CommCarrierFreq. However, a resource allocation configuration or a synchronization configuration included in v2x-InterFreqInfoList may include information related to an LTE sidelink configuration.

An ASN.1 structure of the aforementioned SIBb is illustrated in Table 8.

[Table 8]

SystemInformationBlockTypeb

The IE SystemInformationBlockTypeb contains LTE V2X sidelink communication configuration SystemInformationBlockTypeb information element

```
-- ASN1START

SystemInformationBlockTypeb : := SEQUENCE {
    sl-V2X-ConfigCommon           SL-V2X-ConfigCommon         OPTIONAL,
    lateNonCriticalExtension      OCTET STRING                OPTIONAL,
    ...
}

SL-V2X-ConfigCommon ::=           SEQUENCE {
    v2x-CommRxPool                SL-CommRxPoolListV2X        OPTIONAL,
    v2x-CommTxPoolNormalCommon    SL-CommTxPoolListV2X        OPTIONAL,
    p2x-CommTxPoolNormalCommon    SL-CommTxPoolListV2X        OPTIONAL,
    v2x-CommTxPoolExceptional     SL-CommResourcePoolV2X      OPTIONAL,
    v2x-SyncConfig                SL-SyncConfigListV2X        OPTIONAL,
    v2x-InterFreqInfoList         SL-InterFreqInfoListV2X         OPTIONAL,
    v2x-ResourceSelectionConfig        SL-CommTxPoolSensingConfig
    OPTIONAL,
    zoneConfig                    SL-ZoneConfig               OPTIONAL,
    typeTxSync                    SL-TypeTxSync               OPTIONAL,
    thresSL-TxPrioritization         SL-Priority              OPTIONAL,
    anchorCarrierFreqList         SL-AnchorCarrierFreqList-V2X OPTIONAL,
    offsetDFN                     INTEGER (0 .. 1000)         OPTIONAL,
    cbr-CommonTxConfigList        SL-CBR-CommonTxConfigList        OPTIONAL
    cbr-pssch-TxConfigList        SL-CBR-PPPP-TxConfigList         OPTIONAL,
    v2x-PacketDuplicationConfig       SL-V2X-PacketDuplicationConfig
    OPTIONAL,  syncFreqList           SL-V2X-SyncFreqList
    OPTIONAL,
    slss-TxMultiFreq              ENUMERATED { true }         OPTIONAL,
    v2x-FreqSelectionConfigList        SL-V2X-FreqSelectionConfigList
    OPTIONAL,
    threshS-RSSI-CBR              INTEGER (0 .. 45)           OPTIONAL,
}
-- ASN1STOP
```

Figure 2J:
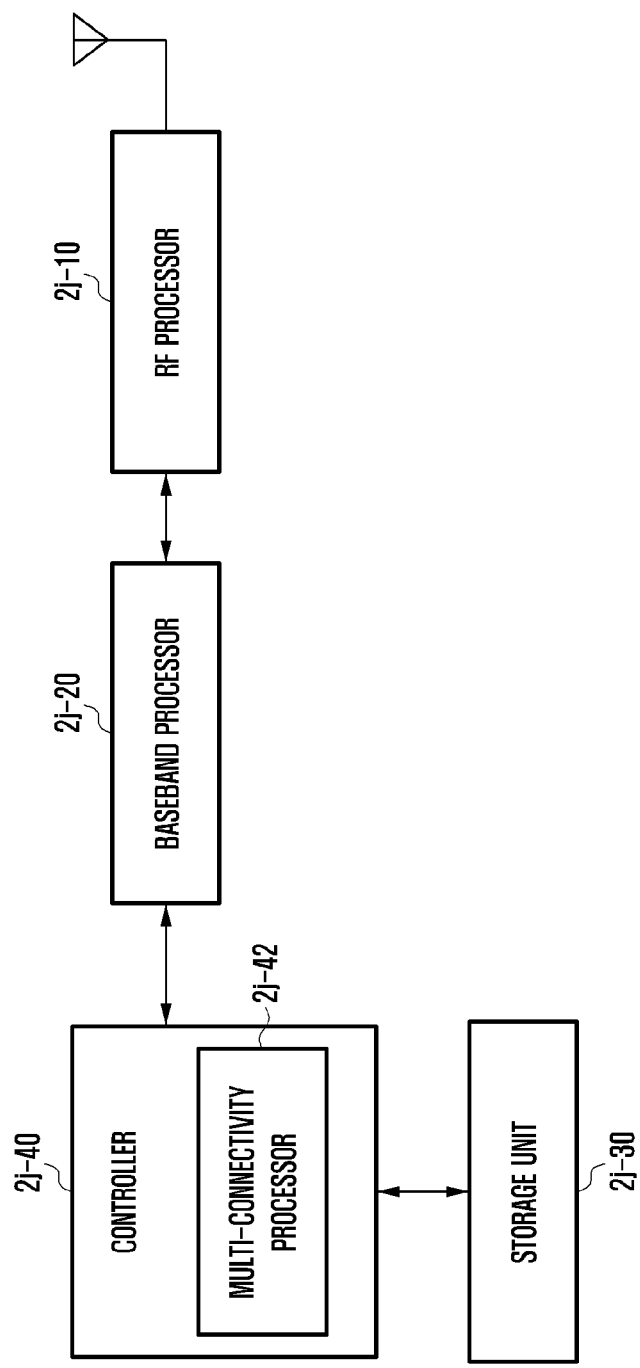
FIG. 2J is a diagram illustrating a configuration of a UE according to an embodiment of the disclosure.

FIG. 2J is a diagram illustrating a configuration of a UE according to an embodiment of the disclosure.

The UE may include a radio frequency (RF) processor 2j-10, a baseband processor 2j-20, a storage unit 2j-30, and a controller 2j-40. The controller 2j-40 may further include a multi-connectivity processor 2j-42.

The RF processor 2j-10 according to an embodiment of the disclosure may perform a function for transmitting and receiving signals through a wireless channel, such as the band conversion, amplification, etc. of a signal. That is, the RF processor 2j-10 may up-convert, into an RF band signal, a baseband signal received from the baseband processor 2j-20, may transmit the RF band signal through an antenna, and may down-convert, into a baseband signal, an RF band signal received through the antenna. For example, the RF processor 2j-10 may include a transmission filter, a reception filter, an amplifier, a mixer, an oscillator, a digital to analog convertor (DAC), an analog to digital convertor (ADC), etc.

In FIG. 2J, only one antenna has been illustrated, but the UE may include multiple antennas.

Furthermore, the RF processor 2j-10 may include multiple RF chains. Furthermore, the RF processor 2j-10 may perform beamforming. For the beamforming, the RF processor 2j-10 may adjust the phase and size of each of signals transmitted and received through multiple antennas or antenna elements. Furthermore, the RF processor 2j-10 may perform multiple-input multiple-output (MIMO). When performing an MIMO operation, the RF processor 2j-10 may receive multiple layers. The RF processor 2j-10 may perform reception beam sweeping by properly configuring multiple antennas or antenna elements under the control of the controller 2j-40, or may adjust the direction and beam width of a reception beam so that the reception beam is coordinated with a transmission beam.

The baseband processor 2j-20 may perform a conversion function between a baseband signal and a bit stream based on the physical layer standard of a system. For example, when transmitting data, the baseband processor 2j-20 may generate complex symbols by coding and modulating a transmission bit stream. Furthermore, when receiving data, the baseband processor 2j-20 may restore a reception bit stream through demodulation and decoding for a baseband signal received from the RF processor 2j-10. For example, if an orthogonal frequency division multiplexing (OFDM) scheme is applied, when transmitting data, the baseband processor 2j-20 may generate complex symbols by coding and modulating a transmission bit stream, may map the complex symbols to subcarriers, and may then configure OFDM symbols through an inverse fast Fourier transform (IFFT) operation and cyclic prefix (CP) insertion. Furthermore, when receiving data, the baseband processor 2j-20 may segment a baseband signal received from the RF processor 2j-10 in an OFDM symbol unit, may restore signals mapped to subcarriers through a fast Fourier transform (FFT) operation, and may then restore a reception bit stream through demodulation and decoding.

The baseband processor 2j-20 and the RF processor 2j-10 may transmit and receive signals as described above. Accordingly, the baseband processor 2j-20 and the RF processor 2j-10 may be called a transmitter, a receiver, a transceiver or a communication unit. Furthermore, at least one of the baseband processor 2j-20 and the RF processor 2j-10 may include multiple communication modules in order to support multiple different radio access technologies. Furthermore, at least one of the baseband processor 2j-20 and the RF processor 2j-10 may include different communication modules in order to process signals having different frequency bands. For example, the different radio access technologies may include an LTE network, an NR network, etc. Furthermore, the different frequency bands may include a super high frequency (SHF) (e.g., 2.2 gHz, 2 ghz) band and a millimeter wave (e.g., 60 GHz) band.

The storage unit 2j-30 may store data, such as a basic program, an application program, and configuration information for an operation of the UE. The storage unit 2j-30 may provide stored data in response to a request from the controller 2j-40.

The controller 2j-40 may control overall operations of the UE. For example, the controller 2j-40 transmits and receives signals through the baseband processor 2j-20 and the RF processor 2j-10. Furthermore, the controller 2j-40 may write data in the storage unit 2j-30 and read data from the storage unit 2j-30. To this end, the controller 2j-40 may include at least one processor. For example, the controller 2j-40 may include a communication processor (CP) performing control for communication and an application processor (AP) controlling a higher layer, such as an application program.

For example, according to an embodiment of the disclosure, the controller 2j-40 may control to transmit, to a base station, sidelink UE information including information related to new radio (NR) sidelink communication through the transceiver, to receive, from the base station, an RRC message including configuration information related to NR sidelink communication through the transceiver, and to perform sidelink communication based on the configuration information related to the sidelink communication. It is characterized in that the configuration information includes a sidelink grant configuration information list for each bandwidth part (BWP) and the sidelink grant configuration information list includes at least one of sidelink grant information. The sidelink grant information may include a sidelink grant information identifier, the number of hybrid automatic repeat request (HARQ) processes, sidelink time resource information, or sidelink frequency resource information. Furthermore, the sidelink UE information may include at least one of an interested frequency list, a dedicated frequency list, quality of service (QoS) information, and V2X communication type information.

Furthermore, the controller 2j-40 may be configured to periodically perform NR sidelink communication through the RRC message, and may control UE assistance information to be transmitted to the base station when a traffic pattern is changed. The UE assistance information may include at least one of traffic periodicity, a timing offset, and destination information.

Furthermore, if scheduling information related to system information is included in SIB1, a broadcast state related to NR sidelink system information is configured as broadcasting, the NR sidelink system information is present in the scheduling information, and the UE does not store the NR sidelink system information in a valid state, the controller 2j-40 may control the NR sidelink system information to be received from the base station. The controller 2j-40 may control to use a resource pool indicated in v2x-CommRx-Pool included in sl-V2X-ConfigCommon of the NR sidelink system information in order to monitor NR V2X sidelink communication if NR V2X sidelink reception has been configured in the UE, and may control a resource pool indicated in v2x-CommTxPoolNormalCommon, p2x-CommTxPoolNormalCommon, v2x-CommTxPoolNormal, p2x-CommTxPoolNormal or v2x-CommTxPoolExceptional included in the NR sidelink system information in order to transmit NR V2X sidelink communication if NR V2X sidelink transmission has been configured.

Figure 2K:
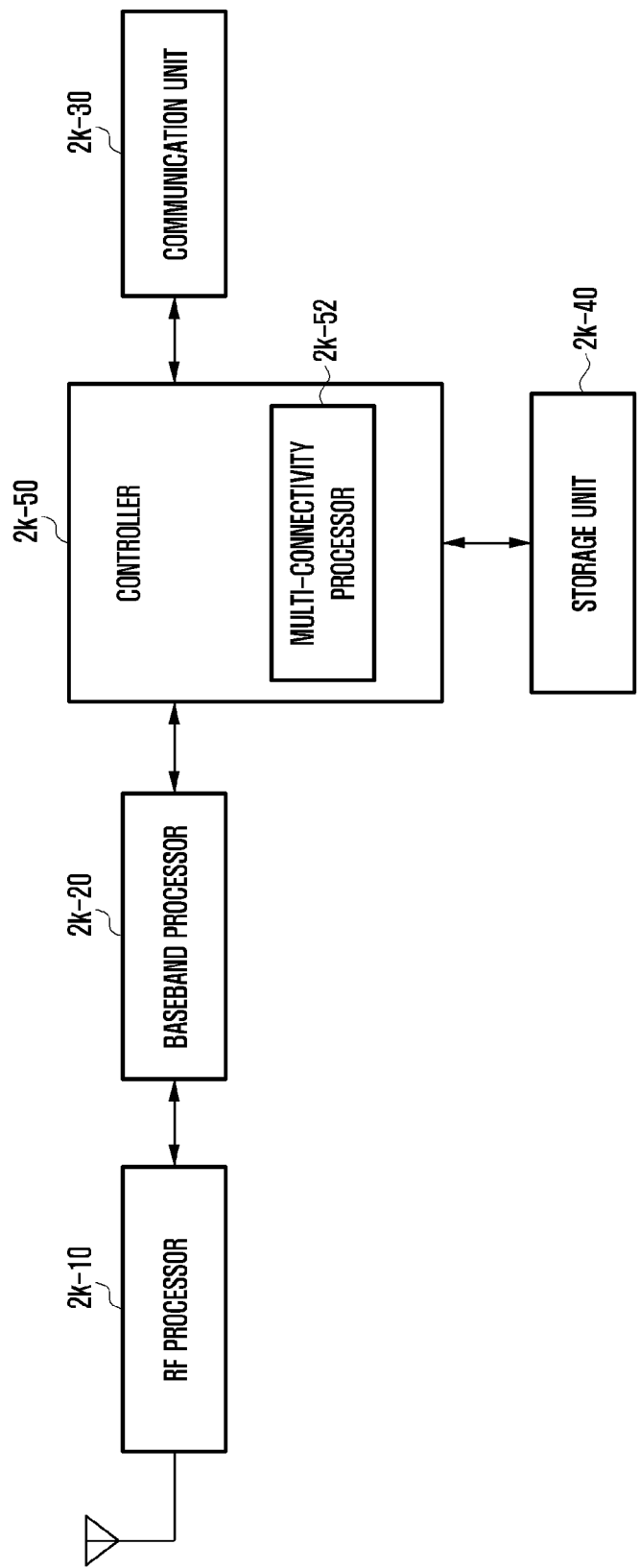
FIG. 2K is a diagram illustrating a configuration of a base station according to an embodiment of the disclosure.

FIG. 2K is a diagram illustrating a configuration of a base station according to an embodiment of the disclosure.

The base station according to an embodiment of the disclosure may include one or more transmission reception points (TRPs).

The base station according to an embodiment of the disclosure may include an RF processor 2k-10, a baseband processor 2k-20, a backhaul communication unit 2k-30, a storage unit 2k-40, and a controller 2k-50. The controller 2k-50 may further include a multi-connectivity processor 2k-52.

The RF processor 2k-10 may perform a function for transmitting and receiving signals through a wireless channel, such as the band conversion, amplification, etc. of a signal. That is, the RF processor 2k-10 may up-convert, into an RF band signal, a baseband signal received from the baseband processor 2k-20, may transmit the RF band signal through an antenna, and may down-convert, into a baseband signal, an RF band signal received through the antenna. For example, the RF processor 2k-10 may include a transmission filter, a reception filter, an amplifier, a mixer, an oscillator, a DAC, an ADC, etc.

In FIG. 2K, only one antenna has been illustrated, but the base station may include multiple antennas.

Furthermore, the RF processor 2k-10 may include multiple RF chains. Furthermore, the RF processor 2k-10 may perform beamforming. For the beamforming, the RF processor 2k-10 may adjust the phase and size of each of signals transmitted and received through multiple antennas or antenna elements. The RF processor 2k-10 may perform a downlink MIMO operation by transmitting one or more layers.

The baseband processor 2k-20 may perform a conversion function between a baseband signal and a bit stream according to the physical layer standard of a first radio access technology. For example, when transmitting data, the baseband processor 2k-20 may generate complex symbols by coding and modulating a transmission bit stream. Furthermore, when receiving data, the baseband processor 2k-20 may restore a reception bit stream through demodulation and decoding for a baseband signal received from the RF processor 2k-10. For example, if the OFDM scheme is applied, when transmitting data, the baseband processor 2k-20 may generate complex symbols by coding and modulating a transmission bit stream, may map the complex symbols to subcarriers, and may then configure OFDM symbols through an IFFT operation and CP insertion. Furthermore, when receiving data, the baseband processor 2k-20 may segment a baseband signal received from the RF processor 2k-10 in an OFDM symbol unit, may restore signals mapped to subcarriers through an FFT operation, and may then restore a reception bit stream through demodulation and decoding. The baseband processor 2k-20 and the RF processor 2k-10 may transmit and receive signals as described above.

Accordingly, the baseband processor 2k-20 and the RF processor 2k-10 may be called a transmitter, a receiver, a transceiver or a communication unit.

The communication unit 2k-30 may provide an interface for performing communication with other nodes within a network. That is, the communication unit 2k-30 may convert, into a physical signal, a bit string transmitted from a primary base station to another node, for example, a secondary base station, a core network, etc., and may convert, into a bit string, a physical signal received from another node.

The storage unit 2k-40 may store data for an operation of a primary base station, such as a basic program, an application program, and configuration information. In particular, the storage unit 2k-40 may store information on a bearer allocated to a UE accessed thereto, measurement results reported by an accessed UE, etc. Furthermore, the storage unit 2k-40 may store information, that is, a criterion for determining whether to provide multiple connections to a UE or stop multiple connections. Furthermore, the storage unit 2k-40 may provide stored data in response to a request from the controller 2k-50.

The controller 2k-50 may control overall operations of a primary base station. For example, the controller 2k-50 may transmit and receive signals through the baseband processor 2k-20 and the RF processor 2k-10 or through the communication unit 2k-30. Furthermore, the controller 2k-50 may write and read data in and from the storage unit 2k-40. To this end, the controller 2k-50 may include at least one processor.

According to an embodiment of the disclosure, the controller 2k-50 may control to receive sidelink UE information, including information related to new radio (NR) sidelink communication, from a UE, through the transceiver and to transmit an RRC message, including configuration information related to NR sidelink communication, to the UE through the transceiver. It is characterized in that the configuration information includes a sidelink grant configuration information list for each bandwidth part (BWP) and the sidelink grant configuration information list includes at least one of sidelink grant information. The sidelink grant information may include a sidelink grant information identifier, the number of hybrid automatic repeat request (HARQ) processes, sidelink time resource information, or sidelink frequency resource information. Furthermore, the sidelink UE information may include at least one of an interested frequency list, a dedicated frequency list, quality of service (QoS) information, and V2X communication type information.

Furthermore, the controller 2k-50 is configured to periodically perform NR sidelink communication through the RRC message. When a traffic pattern is changed, the controller 2k-50 may control UE assistance information to be received from the UE. The UE assistance information may include at least one of traffic periodicity, a timing offset, and destination information.

Furthermore, the controller 2k-50 may control SIB1 to be broadcasted by including scheduling information related to system information in SIB1, configuring a broadcast state related to NR sidelink system information as broadcasting, and including information related to NR sidelink system information in the scheduling information. When a UE does not store the NR sidelink system information in a valid state, the NR sidelink system information broadcasted by the base station may be obtained from the UE. If NR V2X sidelink reception has been configured in the UE, in order to monitor NR V2X sidelink communication, a resource pool indicated in v2x-CommRxPool included in sl-V2X-ConfigCommon of the NR sidelink system information may be used. If NR V2X sidelink transmission has been configured in the UE, in order to transmit NR V2X sidelink communication, a resource pool indicated in v2x-CommTxPoolNormalCommon, p2x-CommTxPoolNormalCommon, v2x-CommTxPoolNormal, p2x-CommTxPoolNormal or v2x-CommTxPoolExceptional included in the NR sidelink system information may be used.

The methods according to the embodiments described in the claims or specification of the disclosure may be implemented in the form of hardware, software or a combination of hardware and software.

If the method is implemented as software, a computer-readable storage medium in which one or more programs (software modules) are stored may be provided. The one or more programs stored in the computer-readable storage medium are configured for execution by one or more processors within an electronic device. The one or more programs include instructions that enable the electronic device to execute the methods according to the embodiments described in the claims or specification of the disclosure.

Such a program (software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical devices or a magnetic cassette. Alternatively, the program may be stored in a memory consisting of some or all of them. Furthermore, each constitution memory may be included in plural number.

Furthermore, the program may be stored in an attachable storage device which may be accessed over a communication network, such as the Internet, Intranet, a local area network (LAN), a wide LAN (WLAN) or a storage area network (SAN), or a communication network consisting of a combination of them. Such a storage device may be connected to a device which performs the embodiments of the disclosure through an external port. Furthermore, a separate storage device over a communication network may be connected to a device which performs the embodiments of the disclosure.

In the aforementioned detailed embodiments of the disclosure, the components included in the disclosure have been expressed in the singular or plural form depending on a proposed detailed embodiment. However, the singular or plural expression has been selected suitably for a situation proposed for convenience of description, and the disclosure is not limited to singular or plural components. Although a component has been expressed in the plural form, it may be configured in the singular form. Although a component has been expressed in the singular form, it may be configured in the plural form.

Although the detailed embodiments have been described in the detailed description of the disclosure, the disclosure may be modified in various ways without departing from the scope of the disclosure. Accordingly, the scope of the disclosure should not be limited to the aforementioned embodiments, but should be defined by not only the claims, but equivalents thereof.

The invention claimed is:

1. A method performed by a user equipment (UE) in a wireless communication system, the method comprising:
   acquiring system information associated with a new radio (NR) sidelink;
   transmitting, to a base station, sidelink UE information including information related to NR sidelink communication;
   receiving, from the base station, a radio resource control (RRC) message including configuration information related to the NR sidelink communication; and
   performing the NR sidelink communication based on the configuration information related to the NR sidelink communication,
   wherein, in case that the UE is configured to receive the NR sidelink communication, a resource pool indicated by sidelink Rx Pool included in a sidelink configuration common of the system information associated with the NR sidelink is used to monitor the NR sidelink communication,
   wherein, in case that the UE is configured to transmit a NR sidelink transmission, a resource pool indicated by sidelink Tx pool normal or sidelink Tx pool exceptional included in the sidelink configuration common of the system information associated with the NR sidelink is used to transmit the NR sidelink communication,
   wherein the configuration information includes a sidelink configured grant configuration information list,
   wherein the sidelink configured grant configuration information list includes at least one of sidelink configured grant information, and
   wherein the sidelink configured grant information includes a sidelink configured grant information identifier, a number of hybrid automatic repeat request (HARQ) processes, sidelink time resource information, and sidelink frequency resource information.

2. The method of claim 1, further comprising:
   transmitting UE assistance information to the base station in case that the UE is configured with the sidelink configured grant information and a traffic pattern is changed,
   wherein the UE assistance information includes at least one of traffic periodicity, or a timing offset.

3. The method of claim 1, wherein the system information associated with the NR sidelink is acquired, in case that scheduling information related to the system information associated with the NR sidelink is present in a system information block 1 and the UE does not store the system information associated with the NR sidelink in a valid state.

4. The method of claim 1, wherein the sidelink UE information includes at least one of an interested frequency list, a dedicated frequency list, quality of service (QoS) information, or sidelink communication type information.

5. The method of claim 1, wherein the sidelink configured grant configuration information list is configured per each bandwidth part.

6. A method performed by a base station in a wireless communication system, the method comprising:
   transmitting system information associated with a new radio (NR) sidelink;
   receiving, from a user equipment (UE), sidelink UE information including information related to NR sidelink communication; and
   transmitting, to the UE, a radio resource control (RRCA message including configuration information related to the NR sidelink communication,
   wherein, in case that the UE is configured to receive the NR sidelink communication, a resource pool indicated by sidelink Rx Pool included in a sidelink configuration common of the system information associated with the NR sidelink is used to monitor the NR sidelink communication,
   wherein, in case that the UE is configured to transmit a NR sidelink transmission, a resource pool indicated by sidelink Tx pool normal or sidelink Tx pool exceptional included in the sidelink configuration common of the system information associated with the NR sidelink is used to transmit NR sidelink communication,
   wherein the configuration information includes a sidelink configured grant configuration information list, wherein the sidelink configured grant configuration information list includes at least one of sidelink configured grant information, and
wherein the sidelink configured grant information includes a sidelink configured grant information identifier, a number of hybrid automatic repeat request (HARQ) processes, sidelink time resource information, and sidelink frequency resource information.

7. The method of claim 6, further comprising:
receiving UE assistance information from the UE, in case that the UE is configured with the sidelink configured grant information and a traffic pattern is changed, and
wherein the UE assistance information includes at least one of traffic periodicity, or a timing offset.

8. The method of claim 6,
wherein, in case that scheduling information related to the system information associated with the NR sidelink is present in a system information block 1 and the UE does not store the system information associated with the NR sidelink in a valid state, the system information associated with the NR sidelink is acquired by the UE.

9. The method of claim 6, wherein the sidelink UE information includes at least one of an interested frequency list, a dedicated frequency list, quality of service (QoS) information, or sidelink communication type information.

10. The method of claim 6, wherein the sidelink configured grant configuration information list is configured per each bandwidth part.

11. A user equipment (UE) of a wireless communication system, comprising:
a transceiver; and
a controller configured to:
acquire system information associated with a new radio (NR) sidelink,
transmit, to a base station via the transceiver, sidelink UE information including information related to NR sidelink communication,
receive, from the base station via the transceiver, a radio resource control (RRC) message including configuration information related to the NR sidelink communication through the transceiver, and
perform the NR sidelink communication based on the configuration information related to the NR sidelink communication,
wherein, in case that the UE is configured to receive the NR sidelink communication, a resource pool indicated by sidelink Rx Pool included in a sidelink configuration common of the system information associated with the NR sidelink is used to monitor the NR sidelink communication,
wherein, in case that the UE is configured to transmit a NR sidelink transmission, a resource pool indicated by sidelink Tx pool normal or sidelink Tx pool exceptional included in the sidelink configuration common of the system information associated with the NR sidelink is used to transmit the NR sidelink communication,
wherein the configuration information includes a sidelink configured grant configuration information list,
wherein the sidelink configured grant configuration information list includes at least one of sidelink configured grant information, and
wherein the sidelink configured grant information includes a sidelink configured grant information identifier, a number of hybrid automatic repeat request (HARQ) processes, sidelink time resource information, and sidelink frequency resource information.

12. The UE of claim 11,
wherein the controller is further configured to transmit UE assistance information to the base station in case that the UE is configured with the sidelink configured grant information and a traffic pattern is changed, and
wherein the UE assistance information includes at least one of traffic periodicity, or a timing offset.

13. The UE of claim 11,
wherein the controller is configured to acquire system information associated with the NR sidelink from the base station in case that scheduling information related to the system information associated with the NR sidelink is present in a system information block 1t and the UE does not store the information associated with the NR sidelink in a valid state.

14. The UE of claim 11, wherein the sidelink UE information includes at least one of an interested frequency list, a dedicated frequency list, quality of service (QoS) information, or sidelink communication type information.

15. The UE of claim 11, wherein the sidelink configured grant configuration information list is configured per each bandwidth part.

16. A base station of a wireless communication system comprising:
a transceiver; and
a controller configured to:
transmit system information associated with a New Radio (NR) sidelink,
receive, from a user equipment (UE) via the transceiver, sidelink UE information including information related to NR sidelink communication, and
transmit, to the UE via the transceiver, a radio resource control (RRC) message including configuration information related to the NR sidelink communication through the transceiver,
wherein, in case that the UE is configured to receive the NR sidelink communication, a resource pool indicated by sidelink Rx Pool included in a sidelink configuration common of the system information associated with the NR sidelink is used to monitor the NR sidelink communication,
wherein, in case that the UE is configured to transmit a NR sidelink transmission, a resource pool indicated by sidelink Tx pool normal or sidelink Tx pool exceptional included in the sidelink configuration common of the system information associated with the NR sidelink is used to transmit NR sidelink communication,
wherein the configuration information includes a sidelink configured grant configuration information list,
wherein the sidelink configured grant configuration information list includes at least one of sidelink configured grant information, and
wherein the sidelink configured grant information includes a sidelink configured grant information identifier, a number of hybrid automatic repeat request (HARQ) processes, sidelink time resource information, and sidelink frequency resource information.

17. The base station of claim 16, wherein:
the controller is further configured to receive UE assistance information from the UE in case that the UE is configured with the sidelink configured grant information to periodically perform NR sidelink communication through the RRC message and a traffic pattern is changed, and
the UE assistance information includes at least one of traffic periodicity, ora timing offset.

18. The base station of claim 16,
wherein, in case that scheduling information related to the system information associated with the NR sidelink is present in a system information block 1 and the UE does not store the system information associated with the NR sidelink in a valid state, the system information associated with the NR sidelink is acquired by the UE.

19. The base station of claim 16, wherein the sidelink UE information includes at least one of an interested frequency list, a dedicated frequency list, quality of service (QoS) information, or sidelink communication type information.

20. The base station of claim 16, wherein the sidelink configured grant configuration information list is configured per each bandwidth part.

* * * * *